US010891701B2

(12) United States Patent
Jessen et al.

(10) Patent No.: US 10,891,701 B2
(45) Date of Patent: Jan. 12, 2021

(54) METHOD AND SYSTEM FOR EVALUATING INTELLECTUAL PROPERTY

(71) Applicant: TurboPatent Corp., Seattle, WA (US)

(72) Inventors: Carl Reed Jessen, Spokane, WA (US); Lewis C. Lee, Spokane, WA (US); Michael Howard Ebinger, Spokane, WA (US); Ryan Glenn Roemer, Washington, DC (US); Chad Eberle, Seattle, WA (US)

(73) Assignee: Rowan TELS Corp., Seattle, WA (US)

( * ) Notice: Subject to any disclaimer, the term of this patent is extended or adjusted under 35 U.S.C. 154(b) by 1188 days.

(21) Appl. No.: 15/208,428

(22) Filed: Jul. 12, 2016

(65) Prior Publication Data

US 2016/0350886 A1    Dec. 1, 2016

Related U.S. Application Data

(63) Continuation-in-part of application No. 13/447,256, filed on Apr. 15, 2012, now abandoned.

(60) Provisional application No. 61/607,416, filed on Mar. 6, 2012, provisional application No. 61/521,706, filed on Aug. 9, 2011, provisional application No. 61/476,223, filed on Apr. 15, 2011.

(51) Int. Cl.
*G06Q 50/18* (2012.01)
*G06Q 10/10* (2012.01)

(52) U.S. Cl.
CPC .......... *G06Q 50/184* (2013.01); *G06Q 10/10* (2013.01)

(58) Field of Classification Search
CPC .................................................. G06Q 50/184
See application file for complete search history.

(56) References Cited

U.S. PATENT DOCUMENTS 5,696,963 A    12/1997 Ahn
5,748,878 A    5/1998 Rees et al.
(Continued)

FOREIGN PATENT DOCUMENTS

JP    2005004797    1/2005
JP    2006155151    6/2006
(Continued)

OTHER PUBLICATIONS

Final Office Action for the U.S. Appl. No. 12/759,619, dated Jun. 3, 2015, Lewis C. Lee, "Processing and Presenting Intellectual Property and Other Information", 36 pages.
(Continued)

*Primary Examiner* — Aryan E Weisenfeld
(74) *Attorney, Agent, or Firm* — Rowan TELS LLC

(57) ABSTRACT

Computer processor generated analysis and presentation of patent and business data in a common interface is described. The aggregation and analysis includes a method and system for evaluating a patent or patent application and proposed claim text by examining claim related information maintained in databases as well as image related information maintained in databases. The method includes deriving unique signatures of individual claims and ascertaining scope of individual claims relative to other claims in a collection, such as claims found in a classification schema and also deriving unique characteristics from images and ascertaining the scope of similarity between the images. A signature and scope of the patent claims and images may be graphically depicted to a user using various graphic elements in a user interface.

19 Claims, 30 Drawing Sheets

(56) References Cited

U.S. PATENT DOCUMENTS

| | | | |
|---|---|---|---|
| 5,832,494 | A | 11/1998 | Egger et al. |
| 6,339,767 | B1 | 1/2002 | Rivette et al. |
| 6,629,097 | B1 | 9/2003 | Keith |
| 6,959,280 | B1 | 10/2005 | Risen, Jr. et al. |
| 7,117,198 | B1 | 10/2006 | Cronin et al. |
| 7,269,566 | B2 | 9/2007 | Elliott |
| 7,823,061 | B2 | 10/2010 | Chan et al. |
| 7,881,937 | B2 | 2/2011 | Hasan et al. |
| 7,962,511 | B2 | 6/2011 | Barney |
| 8,099,319 | B2 | 1/2012 | Mathews et al. |
| 8,108,282 | B2 | 1/2012 | Salzhauer |
| 8,122,043 | B2 | 2/2012 | Buckley et al. |
| 8,346,764 | B1 | 1/2013 | Rosenoff et al. |
| 8,589,269 | B1 | 11/2013 | Bendel |
| 8,620,747 | B2 | 12/2013 | Graham et al. |
| 8,630,931 | B2 | 1/2014 | Bendel |
| 2002/0082778 | A1 | 6/2002 | Barnett et al. |
| 2002/0103799 | A1 | 8/2002 | Bradford et al. |
| 2002/0143742 | A1 | 10/2002 | Nonomura et al. |
| 2002/0178029 | A1 | 11/2002 | Nutter et al. |
| 2003/0026459 | A1 | 2/2003 | Won et al. |
| 2003/0061243 | A1 | 3/2003 | Kim et al. |
| 2003/0172020 | A1 | 9/2003 | Davies et al. |
| 2003/0229470 | A1 | 12/2003 | Pejic |
| 2004/0015481 | A1 | 1/2004 | Zinda |
| 2004/0220842 | A1 | 11/2004 | Barney |
| 2004/0230570 | A1 | 11/2004 | Hatta et al. |
| 2005/0071367 | A1 | 3/2005 | He et al. |
| 2006/0036635 | A1 | 2/2006 | Williams |
| 2006/0225000 | A1 | 10/2006 | Albrecht |
| 2006/0271379 | A1 | 11/2006 | Resnick et al. |
| 2007/0088743 | A1 | 4/2007 | Kikuchi et al. |
| 2007/0198578 | A1 | 8/2007 | Lundberg et al. |
| 2007/0294232 | A1 | 12/2007 | Gibbs et al. |
| 2008/0114668 | A1 | 5/2008 | Peters et al. |
| 2008/0301138 | A1 | 12/2008 | Hasan et al. |
| 2009/0055721 | A1 | 2/2009 | Kahn |
| 2009/0070101 | A1 | 3/2009 | Masuyama et al. |
| 2009/0234781 | A1 | 9/2009 | Malackowski et al. |
| 2010/0131513 | A1 | 5/2010 | Lundberg et al. |
| 2010/0191564 | A1 | 7/2010 | Lee et al. |
| 2010/0250340 | A1 | 9/2010 | Lee et al. |
| 2010/0262512 | A1 | 10/2010 | Lee et al. |
| 2010/0287478 | A1 | 11/2010 | Avasarala et al. |
| 2010/0332503 | A1 | 12/2010 | Buckley et al. |
| 2010/0332511 | A1 | 12/2010 | Stockton et al. |
| 2011/0191310 | A1 | 8/2011 | Liao et al. |
| 2012/0102427 | A1 | 4/2012 | Fenster et al. |
| 2014/0195403 | A1 | 7/2014 | Lee et al. |
| 2014/0279584 | A1 | 9/2014 | Lee et al. |

FOREIGN PATENT DOCUMENTS

| | | |
|---|---|---|
| WO | WO2006126409 | 11/2006 |
| WO | WO2010111351 | 9/2010 |

OTHER PUBLICATIONS

Bass, et al., "Discovery of factors influencing patent value based on machine learning in patents in the field of nannotechnology", Scientometrics, vol. 82, Published Online 2009, 2010, pp. 217-241.

Bergmann, et al., "Evaluating the risk of patent infringement by means of semantic patent analysis: the case of DNA chips", R&D Management 38, 5, Blackwell Publishing, 2008, pp. 550-563.

Chang, "Quantum Computation Patent Mapping—a strategic View for the Information Technique of Tomorrow", IEEE, 2005, pp. 1177-1181.

Chinese Office Action dated Feb. 28, 2015 for Chinese patent application No. 2010800140492, a counterpart foreign application of U.S. Appl. No. 12/730,098, 14 pages.

Crouch, "Dropping: Average Number of Claims Per Patent", retrieved on Feb. 12, 2015 at «http://patentlyo.com/patent/2010/01/dropping-average-number-of-claims-per-patent.html», Jan. 2010, 1 page.

Information Today, "IT Intervierw: A Ton of Patents Behind Him: Au rig in Systems CEO Kevin Rivette talks about his company's products and competitors", Information Today, vol. 18, Issue 11, Dec. 2001, pp. 1 and 47-48.

Moehrle, "Measures for textual patent similarities: a guided way to select appropriate approaches", Scientometrics, Published on line May 29, 2010, vol. 85, 2010, pp. 95-109.

Moehrle, et al., "Patent-based inventor profiles as a basis for human resource decisions in research and development", R&D Management 35, 5, Blackwell Publishing, 2005, pp. 513-525.

Office Action for U.S. Appl. No. 13/447,260, dated Feb. 26, 2015, Lewis C. Lee, "Evaluating Intellectual Property", 60 pages.

Final Office Action for U.S. Appl. No. 12/730,098, dated Mar. 18, 2015, Lewis C. Lee, "Processing and Presenting Intellectual Property and Other Information", 40 pages.

Final Office Action for U.S. Appl. No. 12/751,833, dated Mar. 6, 2015, Lewis C. Lee, "Presentation and Analysis of Patent Information and Other Information", 37 pages.

Final Office Action for U.S. Appl. No. 14/100,980, dated Apr. 17, 2015, Lewis C. Lee, "Presentation and Analysis of Docket Information and Financial Information", 7 pages.

Office Action for U.S. Appl. No. 13/447,258, dated Apr. 3, 2015, Lewis C. Lee, "Evaluating Intellectual Property", 29 pp.

Rivette, et al., "Discovering New Value in Intellectual Property", Harvard Business Review, Jan. 2000, 10 pages.

Extended European Search Report dated Dec. 2, 2013 for European patent application No. 10756766.1, 5 pages.

Final Office Action for U.S. Appl. No. 13/447,258, dated Jan. 16, 2014, Lewis C. Lee, "Evaluating Intellectual Property", 30 pages.

WIPO—Search International and National Patent Collections, retrieved on Apr. 25, 2011 at «http://www.wipo.inUpatentscope/search/en/searchjsf», 1 page.

PCT Search Report dated Jul. 24, 2012 for PCT application No. PCT/US12/33716, 11 pages.

Scott, "IP Street Starts to See Traffic", retrieved Feb. 10, 2015 at «http://www.spokanejournal.com/local-news/ip-street-starts-to-see-traffic/», Spokane Journal of Business, Nov. 2011, pp. 1-4.

Stephens, "The Growing Importance of Patinformatics", presentation slides from keynote given at the National Convention for the Society for Information Science, Pune, India, Dec. 9, 2009, pp. 1-29.

Tiwari, et al., "Patinformatics—An Emerging Scientific Discipline", retrieved Feb. 2015 at «http://ssrn.com/abstract=1566067», SSRN, Mar. 6, 2010, pp. 1-35.

Trippe, "Patinformatics: Identifying Haystacks from Space", retrieved on Feb. 11, 2015 at «http://www.infotoday.com/searcher/oct02/trippe.htm»Searcher, vol. 10, No. 9, Oct. 2002, pp. 1-15.

Trippe, "Patinformatics: Tasks to tools", World Patent Information 25, Elsavier, 2003, pp. 211-221.

USPTO, "Patent Statistics Reports Available for Viewing", retrieved on Feb. 19, 2015 at «https://web.archive.org/web/20071001215834/http://www.uspto.gov/web/offices/ad/ido/oeip/taf/tafp.html», archived Oct.-Dec. 2007, pp. 1-35.

Wikipedia, "Histogram", retrieved on Feb. 11, 2015 at «https://web.archive.org/web/20100213042128/http:/len.wikipedia.org/wiki/Histogram», archived Feb. 2010, pp. 1-5.

Wikipedia, "Tag cloud", retrieved on Feb. 11, 2015 at «https://web.archive.org/web/20100118042711/http:/len.wikipedia.org/wiki/Tag_cloud», archived Jan. 2010, pp. 1-5.

Wikipedia, "tf-idf (term frequency—inverse document frequency)", retrieved on Feb. 20, 2015 at «https://web.archive.org/web/20100216083848/http://en.wikipedia.org/wifi/Tf%E2%80%93idf», archived Feb. 2010, pp. 1-3.

Wolters Kluwer, "IFI Patent Intelligence Partners with IPB Corporation to Offer Customized Patent-Analysis Service", retrieved on Feb. 10, 2015 at «http://www.wolterskluwerhealth.com/News/Pages/IFIPatentIntelligencePartnerswithIPBCorporationtoOfferCustomizedPatent-AnalysisService.aspx», Jun. 2007, 2 pages.

Chinese Office Action dated Sep. 11, 2014 for Chinese patent application No. 201080014049.2, a counterpart foreign application of U.S. Appl. No. 12/730,098, 16 pages.

(56) References Cited

OTHER PUBLICATIONS

Office Action for U.S. Appl. No. 12/730,098, dated Oct. 22, 2014, Lewis C. Lee, "Processing and Presenting Intellectual Property and Other Information", 33 pages.

European Office Action dated Aug. 21, 2014 for European patent application No. 10756766.1, a counterpart foreign application of U.S. Appl. No. 12/730,098, 6 pages.

Japanese Office Action dated Jul. 8, 2014 for Japanese patent application No. 2013-178460, a counterpart foreign application of U.S. Appl. No. 12/751,833, 8 pages.

Non-Final Office Action for U.S. Appl. No. 13/447,258, dated May 9, 2013, Lewis C. Lee et al., "Evaluating Intellectual Property", 24 pages.

European Office Action dated Sep. 5, 2014 for European patent application No. 08835134.1, a counterpart foreign application of U.S. Appl. No. 12/751,833, 19 pages.

Extended European Search Report dated Sep. 5, 2014 for European patent application No. 12770686.9, 7 pages.

Office action for U.S. Appl. No. 12/759,619, dated Sep. 11, 2014, Lee et al., "Processing and Presenting Intellectual Property and Other Information", 31 pages.

Chinese Office Action dated Feb. 14, 2014 for Chinese patent application No. 201080014049.2, a counterpart foreign application of U.S. Appl. No. 12/730,098, 15 pages.

METHOD AND SYSTEM FOR EVALUATING INTELLECTUAL PROPERTY

RELATED APPLICATIONS

This application claims the benefit of U.S. Provisional Application No. 61/476,223, filed Apr. 15, 2011, U.S. Provisional Application No. 61/521,706, filed Aug. 9, 2011, and U.S. Provisional Application No. 61/607,416, filed Mar. 6, 2012, all of which are incorporated herein by reference.

This application is also related to U.S. patent application Ser. No. 12/730,098, filed Mar. 23, 2010, which claimed benefit to U.S. Provisional Application No. 61/162,998, filed Mar. 24, 2009. This application is also related to PCT Application No. PCT/US2008/78861, filed Oct. 3, 2008 and U.S. patent application Ser. No. 12/245,680, filed Oct. 3, 2008, both of which claim priority to U.S. Provisional Application No. 60/977,629, filed Oct. 4, 2007, and to U.S. Provisional Application No. 60/978,088, filed Oct. 5, 2007.

This application is also a Continuation in Part application (CIP) of U.S. application Ser. No. 13/447,256 filed on Apr. 15, 2012 and names at least one joint inventor named therein. The entire contents of parent U.S. patent application Ser. No. 13/447,256 is expressly incorporated herein by this reference. All of the above referenced patent applications are hereby incorporated by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Innovation is a key factor for many companies to succeed in a globally competitive world. Protection of innovation via intellectual property (IP) helps those companies convert innovation into business assets. Today, intangible assets represent a significant share of the market capitalizations of many of the most successful and innovative companies. Yet, to the business community and many professionals who are not IP legal experts, intellectual property including but not limited to patents (utility, design, plant, business methods), trademarks and copyrights remain somewhat of a mystery to fully understand, assess, and value.

Policing of intellectual property rights including, but not limited to, patent rights and trademark rights and the identification of infringers of design patents is currently a difficult and manual task. Searching for infringers typically comprises creating lists of key words and phrases describing the trademarked image or the patented object. A practitioner may sit down as a computer, enter one or more of the keywords or phrases as query parameters, and then review the results one at a time. This manual process is prohibitively difficult and expensive for most IP asset owners to deploy in any meaningful way.

BRIEF DESCRIPTION OF THE DRAWINGS

The detailed description is described with reference to the accompanying figures which are briefly described as follows. The use of the same reference numbers in different figures indicates similar or identical items.

FIG. 19 shows the claim landscape pane as a two dimensional graph in which one or more individual claims of a patent or patent application are plotted relative to other claims in a common technology area (e.g., class, subclass, industry segment, etc.).

FIG. 25 shows a graphical representation of results from a collection of analysis tools, some or all of which can be represented on a computer display or printed on a physical medium. The graphical representation contains several of the images and graphs discussed in this document, all generated for a common input, such as a IP property number, owner, inventor, or the like.

DETAILED DESCRIPTION

Described herein is an architecture that aggregates intellectual property data including but not limited to patent data (utility patents, design patents, plant patents, business method patents, and applications therefore); trademarks (registered work marks, registered designation marks, and registered combination marks and applications therefore [both pending or "dead"]); and copyrights, and financial data, analyzes that data, and presents it in user defined ways that are intuitive to non-IP professionals, such as inventors, product managers, executives, analysts, and financial professionals.

The architecture may be implemented in many ways. The following disclosure provides several illustrative examples.

Example Architecture

In this disclosure, patents, and more particularly utility patents and applications therefore are principally discussed, however it is to be understood that the architecture, processes, methods, systems, examples and steps disclosed herein are equally applicable to the evaluation of design patents, design patent applications, registered trademarks, applications for trademark registration, copyrights and for the drafting of patent claims.

Figure 1:
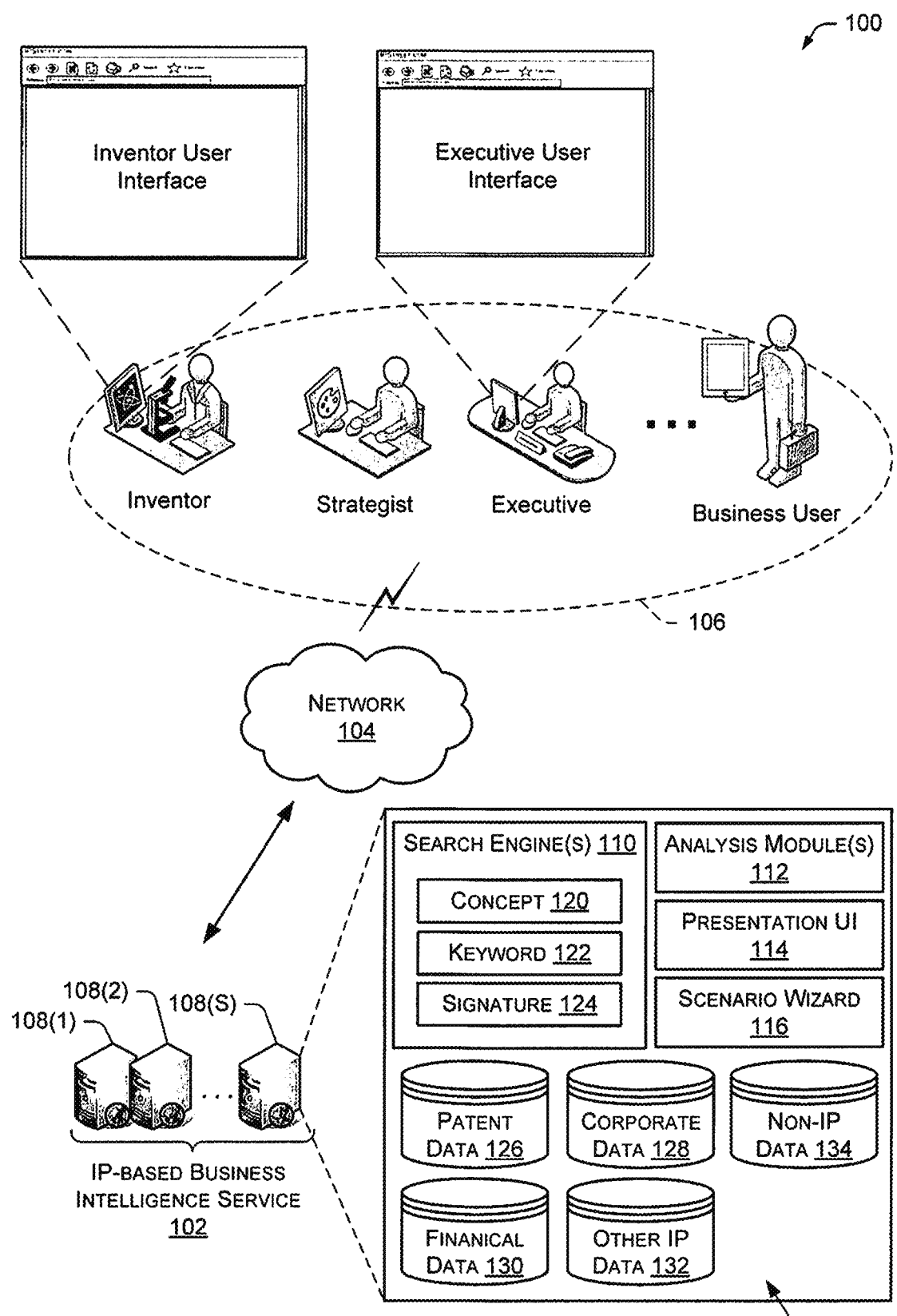
FIG. 1 shows an illustrative architecture for aggregating, analyzing, and presenting intellectual property (patent) and business data.

FIG. 1 shows an example architecture 100 for aggregating, analyzing, and presenting intellectual property and business data. The architecture 100 includes an IP-based business intelligence service 102 which aggregates patent, corporate, financial, and other IP data, analyzes that data, and serves that data over a network 104 to a community of users 106. Representative users include inventors, strategists, executives, and business users. Many other types of users may access the IP-based business intelligence service 102, including attorneys, accountants, investment bankers, venture capitalists, financial analysts, and so forth. The IP-based business intelligence service 102 is implemented as a cloud service that is accessible over the Internet. Cloud services do not require end user knowledge of the physical location or configuration of the physical system that delivers the services. Common names associated with cloud services include "software as a service" or "SaaS", "platform computer", "on-dash demand computing", and so on. Nearly any number of users 106 in the community may access the IP-based business intelligence service 102 at any time through web browsers (e.g., Internet Explorer®, Firefox®, Safari®, Google Chrome®, etc.) resident on their local computing devices. Examples of the computing devices may include a server, a desktop PC (personal computer), a notebook or portable computer, a workstation, a mainframe computer, a handheld device, a netbook, an Internet appliance, a portable reading device, an electronic book reader device, a tablet or slate computer, a game console, a mobile device (e.g., a mobile phone, a personal digital assistant, a smart phone, etc.), or a combination thereof. Although web browsers are a common form for accessing cloud services, other resident applications on the users' computing devices may be employed. The network 104 may be a wireless or a wired network, or a combination thereof.

The IP-based intelligence service 102 includes processing capabilities, as represented by servers 108(1), 108(2), . . . , 108(s), that include both processing and storage capabilities. In one implementation, the IP-based business intelligence service 102 provides a plurality of functional components including, for example, one or more search engines 110, one or more analysis modules 112, one or more presentation user interfaces 114, one or more scenario wizards 116, and one or more databases 118. Three search engines 110 including a concept search engine 120, a keyword search engine 122, and a claim signature search engine 124, are illustrated in FIG. 1.

Representative databases 118 are illustrated in FIG. 1. The databases include a patent database 126, a corporate database 128, a financial database 130, and a database for other types of intellectual property IP 132 (trademarks, copyrights). The patent database 126 stores various patent documents, such as patent applications, granted patents, and file wrapper histories. The patent data from these various documents can be aggregated and stored in various schemas to promote search efficiency and effectiveness. The corporate database 128 includes corporate data of various corporations and companies. The corporate data includes information such as number of employees, list of subsidiaries, functions or types of business, executive teams, corporate financial data (such as revenue, profits, etc.), and financial regulation filings. The financial database 130 includes information contained in financial markets, which may include, for example, stock price information, various metrics to measure a company's (e.g., P-E ratios, margin metrics, turnover ratios, etc.), and other data. The database 132 for other IP includes data including other forms of intellectual property and assets in addition to parents, such as but not limited to trademarks, including registered trademarks (word marks, designation marks, combination marks); "dead" or otherwise abandoned trademarks (word marks, designation marks, combination marks) and pending applications for (word marks, designation marks and combination marks), know-how and copyrights. In some implementations, the databases 118 may further include a database for non-IP data 134. The non-IP database 134 may include, for example, information of non-patent literature or documents, such as journal articles, conference articles, manuals, brochures, and other publications, etc. The information may include the entire data of the non-patent document. While in the illustrated example the databases are shown to be part of the IP-based business intelligence service 102, in other examples one or more of the databases 118 may be separate from the IP-based business intelligence service 102 and may be administered by another entity.

Users 106 access the IP-based business intelligence service 102 via their computing devices and conduct any number of types of analysis related to intellectual property. Representative types of analysis are described in more detail below, and include, for example, searching, validity, infringement, freedom-to-operate, licensing, inventorship review, benchmarking, competitive portfolio analysis, portfolio metrics, and scoring/ranking. For example, an inventor may access the IP-based business intelligence service 102 to conduct patent searching with respect to the patentability of an invention and receive various results pertaining to that patentability search. Simultaneously, an executive may review a competitor's IP portfolio for benchmarking purposes, access the IP-based business intelligence service 102 and see results pertaining to that review. In another example, a strategist may evaluate licensing opportunities, while another business user may ascertain the quality of a patent using one or more scoring tools provided by the IP-based business intelligence service 102. These and numerous other uses of the IP-based business intelligence service 102 are provided.

The IP-Based Business Intelligence Service 102 may be used to perform computer based market surveillance to identify infringers of patents or other intellectual property rights. In such an implementation of the IP-Based Business Intelligence Service 102, the Service 102 uses its Search Engine 110 and Analysis Module 112 as well as Patent Data 126 such as patent figures and Other IP data 132 as well as data acquired over an internet network connection 104. The market surveillance search engine 206 is used to identify products and/or services offered for sale on the internet which may contain proprietary technology, ornamental design, copyrighted material or trademarked material.

Figure 2:
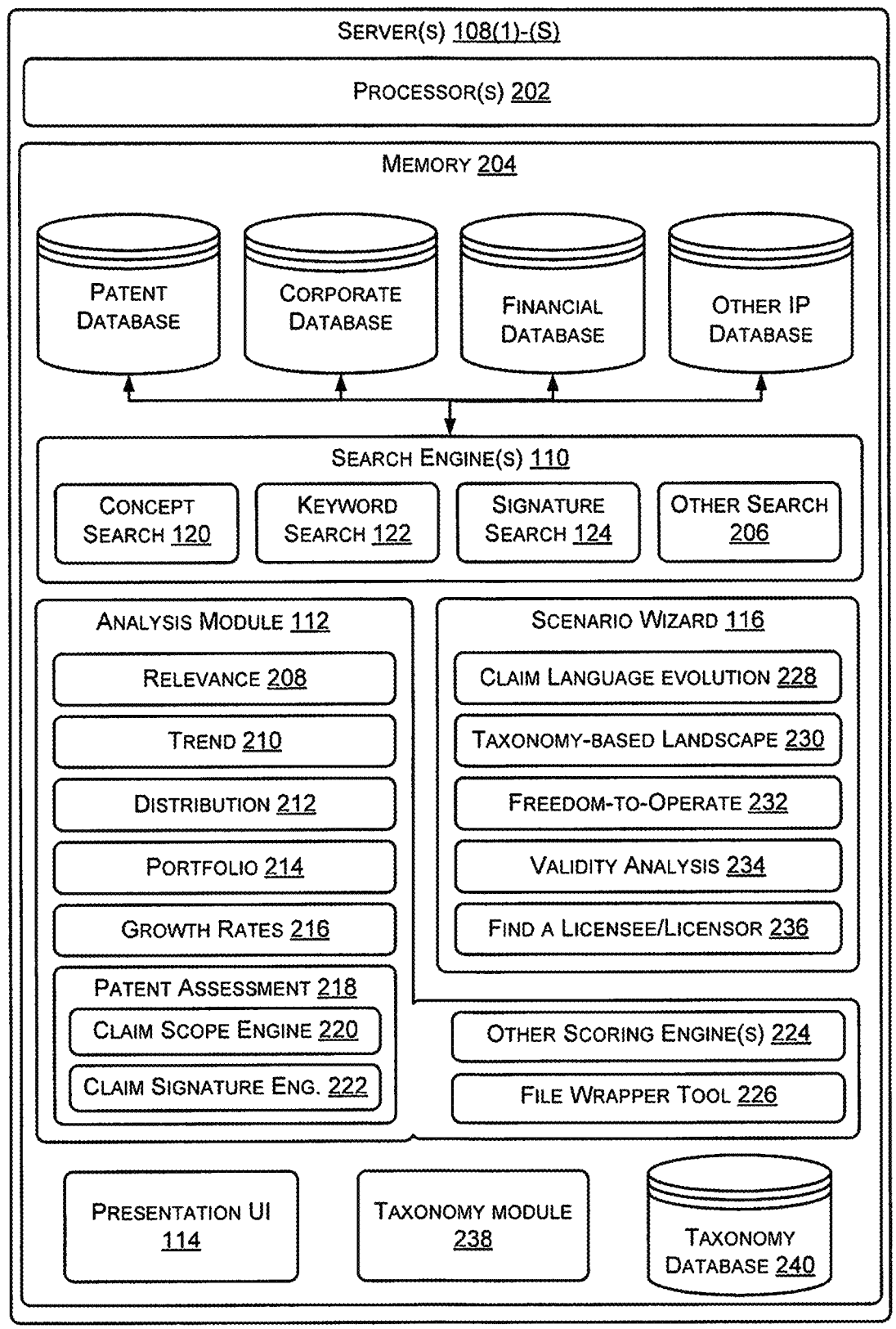
FIG. 2 shows one example implementation of a server configuration and selected modules and components for implementing the architecture of FIG. 1.

As shown in FIG. 2, a server 108 may include processing capabilities as represented by one or more processors 202 and storage capabilities as represented by memory 204. The memory 204 is representative of any number of forms of memory including both persistent and non-persistent memory. In one implementation, the memory 204 may include computer-readable media in the form of volatile memory, such as Random Access Memory (RAM) and/or non-volatile memory, such as read only memory (ROM) or flash RAM. The memory 204 is an example of computer-readable media. Computer-readable media includes volatile and non-volatile, removable and non-removable media implemented in any method or technology for storage of information such as computer readable instructions, data structures, program modules, or other data. Computer-readable media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer readable media does not include transitory media such as modulated data signals and carrier waves.

The memory 204 includes a plurality of databases 118. However, as noted above, in other examples the databases 118 may be separate and apart from the memory 204. By way of example and not limitation, the memory 204 may include the patent database 126, the corporate database 128, the financial database 130, and the database for other IP 132 as shown in FIG. 1. In some implementations, the memory 204 may further include one or more search engines 110 that are configured to discover various pieces of information from the databases 118. The search engines 110 may include the concept search engine 120. The concept search engine 120 identifies relevant documents based on a concept included in or derived from a search query. For example, a user 106 may provide a long textual description (such as a paragraph or page, or even a document, etc.) as an input query to the concept search engine 120. The concept search engine 120 may then determine or identify a concept from the input query, and search across one or more datasets in the databases 118 for concepts that are the same as or similar to the identified concept according to one or more predetermined metrics. As one particular implementation, the concept search engine 120 may be configured to employ a metric given by Latent Semantic Indexing (LSI) in which indexes of the data are pre-built to aid in the concept search.

Other types of searches are also employed by the service 102 using a variety of search methods and protocols including, but not limited to; "Edge Detection" which is a computer processor driven method that identifies points in a digital image at which the subject image changes sharply, or has discontinuities, and such changes/discontinuities are used for processing and comparing images and features; "Recognition by Components" which is a process for object recognition wherein objects are separated by the computer processor into Geon's (the object's main component parts) which are based upon three-dimensional shapes such as cylinders, scones, cubes that can be assembled into various arrangements to form virtually unlimited numbers of objects; "Geon Recognition" which is the theory that there are only a certain number of primary shapes (fewer than 36) which may be combined to create nearly all the objects humans see in day-to-day life and the computer processors principally focus upon edges and concavity's of the object being examined; "Outline of Object Recognition" which is a process wherein the computer processors identify and thereafter separate an object from a surrounding background using edges and light differentiation; and "Speeded Up Robust Features" which is a computer driven method for images that uses three-dimensional reconstruction of the object from a two-dimensional image so that other "views" may be anticipated and evaluated/compared.

A large number and variety of computational methods may be employed to identity intellectual property rights. The following are some further examples of methods but a wider variety of alternative methods would be known to one skilled in the art.

Mean Squared Error (MSE) statistic is used to compare differences in shape, color, texture, opacity, among other characteristics between a target image and a candidate image. To derive the MSE statistic, both a target image (which is an image that describes the scope of an intellectual property right which may be, but is not limited to, a figure, a photo, a logo, a design, etc. and which may be provided by the user 106 or by the processor) and a candidate image (which are images generally located on and downloaded from the internet which may show/feature/describe the target image) are converted to from 8-bit integers to "floating point" data types. The difference(s) between the target image and the candidate image is then calculated by taking the difference between the pixel intensities of the images. The derived difference between pixels is then squared to, summed up, and then divided by the total number of pixels in the target image. The result is a Mean Squared Error score which tends to increase as the difference between the target image and the candidate image increase. An MSE of 0 indicates two images are perfectly similar. The Mean Squared Error may be calculated using the following formula:

$$\text{Mean Squared Error} = \frac{1}{mn}\Sigma_{i=0}^{m-1}\Sigma_{j=0}^{n-1}[I(i,j)-K(i,j)]^2$$

A Structural Similarity Index (SSIM) statistic is used to estimate perceived differences in structure between a target image and a candidate image. As opposed to calculating the difference between to entire images, SSIM calculates the difference between locally defined "windows" and is computed on a window-by-window basis which can mitigate significant differences in light intensity or contrast between the target image and the candidate image. The Mean Squared Error may be calculated using the following formula:

$$SSIM(x,y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

Machine learning algorithms may also be implemented to enable object identification within a candidate image. For example, supervised Convolutional Neural Networks (CNN) are used to develop an object classifier model for a given object. For example, if Tesla® Motors was interested in identifying images of their design patented shifter handle, Tesla® might gather a corpus of target images of the shifter handle from many different view angles and under many different light conditions. The target images could be used as training data set for the training of a Tesla® Motor's shifter handle-specific classifier model. The shifter handle specific model is then be applied to one or more candidate images to derive a score indicating the likelihood that the candidate image contains a Tesla® Motors shift handle and possibly an infringement thereof.

Target images are images describing the scope of an intellectual property asset right and may relate to logos, objects, or designs depending on the type of intellectual property asset right being targeted. For example, the images may be the figures associated with a utility or design patent or patent application, the figures associated with a trademark, a wordmark, a distinctive logo, or a figurative mark of any kind. The target images may be words or images associated with copyrighted material.

Target images are typically two dimensional images in digital file formats like JPG, PNG, VSD, GIF, or any other file format suitable for storing two dimensional image information. The target images may also comprise 3D images or objects in various digital file formats such as OBJ, STL, VRML, X3G, PLY, FBX, or any other file format suitable for storing 3D object or image information.

In some instances, more than one target image may related to a given logo, object or design. For example, a US design patent typically requires the applicant to provide patent figures showing the six standard orthographic views (front, rear, left side, right side, top and bottom) as well as an isometric or perspective view of the ornamental design being patented.

Target images may be submitted to the Search Engine 110 by the user 106 by way of a graphical user interface 400. Target images may also be submitted to the Search Engine 110 programmatically without the need for direct human interaction by way of an public or private Application Program Interface (API) 104.

Candidate images are images downloaded from the internet. They may be both two dimensional or three dimensional and in any digital file format suitable for storing image data.

In some cases, a 3rd party search engine like Google® Images, Bing® Images, or the like maybe used to identify candidate images. In other instances, the search engine 110 may index all images hosted on a given website such as Amazon® or eBay®. Images may also be acquired from social media sites such as Facebook® or Twitter®, product review sites like Amazon® or Consumer Reports®, etc.

The candidate images may be acquired and stored on a local memory 204 prior to a search being conducted. In other embodiment, the location of images on 3rd party websites may be indexed and downloaded only as needed by the search engine 110.

When a target image is submitted to the search engine 110 or sometime after, a set of one or more query parameters can be defined which instruct search engine 110 regarding what limitations or filters should be applied to the results. For example, these limitations may include a minimum confidence metric, a set of URLs to be excluded from a search, types of file formats to exclude, etc. The defined search parameters may also direct the analysis to perform a pre-processing review of the candidate image so that only identified portions of candidate images, such as, but not limited to, logos on a jacket or sweater which might be an infringement of a trademark.

In the pre-processing stage, a variety of basic operations are performed by the processors to eliminate known distortions from the images being compared. For example distorted and reference signals are properly scaled and aligned. The signal might be transformed into a color space that is more appropriate for the statistical algorithms applied during the later stages of analysis—for example, a black and white only copy of the candidate image may be derived from the original candidate image. In other instances a two dimensional image is derived from a three dimensional image file. One way to accomplish this is to render a three dimensional image from a three dimensional image files and then take a two dimensional snapshot from one or more view angles.

All of the described computational image analysis methods used by the Search Engine 110 returns to the user 106 at least a metric describing the method's confidence that the target image and the candidate image are similar. The scores are analyzed individually or combined into a composite similarity score. The advantage of a composite similarity score is that biases in any one method can be mitigated by the combination with another method which suffers less from the given bias.

The similarity scoring is any real number. In some instances it can be a normalized number, for example on a scale of 0% to 100%.

The Search Engine 110 may store a predetermined similarity score threshold against which it may compare the candidate image's similarity score. The Search Engine 110 may provide a user 106 notice/alert if the predetermined similarity score threshold is matched or surpassed. Further, the Search Engine 110 may store more than one predetermined threshold score. In some instances, a first action may be taken if a candidate image's score surpasses a first similarity score threshold and, additionally, take a second action if a candidate image's score surpasses a second similarity score threshold. The image similarity score may be defined by the user 106 or through an automated machine learning methodology.

If a candidate image's similarity score, as generated by the search engine 110 matches or surpasses a predetermined similarity score threshold, the Search Engine 110 will alert the user 106. The user 106 may receive these alerts via a graphical user interface 400 or by another means such as email, text message, phone call, etc.

An alert from the search engine 110 may contain any number of data points of a variety of types. For example, the alert may contain target images, candidate images, URL addresses, hyperlinks, date/time stamps, videos files, file attachments, audio files, confidence scores, etc.

In a further contemplated embodiment, if the Search Engine 110 determines that a candidate image's similarity score has matched or surpassed a predetermined similarity score threshold, the Search Engine 110 may send a message to a 3rd party or to the website hosting the candidate image, the email comprising a properly formatted Digital Millennium Copyright Act (DMCA) Take-Down Request. In another example, the Search Engine 110 may purchase the infringing object or service from the website hosting the candidate image.

These additional search protocols are implemented by the search engines 110 and provide additional means for the search engines 110 to evaluate shapes, patterns, surface configurations, three-dimensional orientations, ornamental designs, textures and the like which allows the search engines 110 to search, evaluate, compare and provide recommendations to users 106 for evaluations such as novelty, patentability, infringement, registerability and the like. Such additional search protocols are particularly important for searching design patents, design patent applications, and designation trademarks (logos) that may not be accurately/adequately described textually. Further, the additional protocols provide an additional search methodology for the computer-based marketplace surveillance system for intellectual property described in FIG. 30 and for infringement searches.

The search engines 110 enable various types of sophisticated searches, including but not limited to patentability searches, validity searches, freedom-to-operate searches, registerability searches and the computer-based market place surveillance searches. For example, to perform a patentability search, the user 106 inputs a description of a potentially patentable invention, which may be a sentence, one or more paragraphs, or even a document. The concept search engine 120 deduces a concept from that input and searches the concept across a collection of documents, which might include patents, applications, technology literature, research white papers, foreign documents, and so forth. In one implementation, the concept search engine 120 may identify and return results which include information of the most relevant documents in a rank order of relevancy. The results may be presented graphically, or in a list form on a display of the computing device of the user 106. In the case of validity searching, the user 106 can enter all or part of a claim of a patent to be evaluated. The concept search engine 120 returns the most relevant documents from the databases 118, which can then be presented graphically, e.g., along a time line (or sorted by priority date), so that the user 106 can quickly identify references that may be relevant and predate the priority date of the invention being evaluated. In the case of freedom-to-operate searching, the user 106 can enter a description of a product or service being prepared for launch. The concept search engine 120 may then evaluate this description of the product (or determine and evaluate a concept included in this description) against patent claims in granted US patents and published patent applications. Specifically, the concept search engine 120 may maintain multiple latent semantically indexed collections, with the collections including entire patents and applications, or just portions thereof (e.g., just the claims, just the independent claims, just the abstract, etc.). In the freedom-to-operate case, the concept in the product/service description is searched relative to the claims and results are ordered according to relevancy with respect to the concept in the product/service description. Similarly, a textual description of the invention, or even a digital image of the invention may be input into the concept search engine 120 so that the textual description and/or image may be searched through the various databases 118, the protocols, and the Internet.

The actions performed by the Search Engine 110 cannot be accomplished by a human within a reasonable time frame. For example, deriving a candidate image's similarity score may take trillions of calculations to accomplish, and cannot be accomplished within the life span of a normal human. This time constraint is made more problematic because there are millions and perhaps trillions of candidate images on the internet and, therefore, nearly infinite number of regional proposals to be derived from each candidate image. To be able to search a meaningful number of images for potentially infringing products in the vast number of candidate images, this system must be computerized and electronically optimized.

There are methods for optimizing the kinds of calculations performed by the Search Engine 110. It is anticipated the Search Engine 110 comprises graphical processor units (GPU's) which have an advantage over traditional central processor units (CPU) because the highly parallelized nature of the GPU make GPU's more efficient at image processing tasks. In some instances, the Search Engine 110 may comprise a cluster of computing resources rather than a single computer resource. Memory caching is also an effective way to increase the speed the various calculations performed by Search Engine 110 in order to make operation a sufficiently practical.

Additionally or alternatively, the search engines 110 includes a keyword search engine 122, in which a user 106 may enter one or more keywords to search across the databases 118. Depending on implementation details, the keyword search engine 122 looks for exact matches or approximate matches using fuzzy matching algorithms. The keyword search engine 122 employees Boolean operatives such as "AND", "OR", and "NOT", and/or implement proximity algorithms (e.g., finding a specific word that is separated from another specific word within a predetermined number of words, etc.) and weighting (e.g., giving varying weights to one or more words in a search query). One example implementation of the keyword search engine 122 employs SOLR technology of Apache Software Foundation.

Additionally, the search engines 110 include a claim signature search engine 124, which identifies claims having similar signatures. One analysis tool provided is to derive a unique signature for a claim (e.g., an independent claim, a dependent claim, etc.) in a patent or patent application. A claim signature of a claim may be a function of each unique word and/or phrase found in the claim, relative to respective occurrence frequency of each unique word and/or phrase in a collection of patents and/or applications. For example, the collection of patents and/or applications may be gathered from a common and/or same technology area as the patent or patent application for which a claim signature of the claim is to be determined. This allows the words and/or phrases to share a common ontology, vocabulary and/or taxonomy. In one implementation, the collection may be obtained based on classification codes, such as the U.S. Patent and Trademark Office (USPTO) classes and subclasses, or the International Patent Codes (IPC).

Prior to determining a claim signature of a claim, the claim signature search engine 124 filters from the claim certain types of words and/or phrases that are not helpful in distinguishing the claim from other claims. By way of example and not limitation, the types of words and/or phrases filtered out may include, for example, adjectives, adverbs, conjunctions, pronouns, articles, determiners, prepositions, etc. Additionally or alternatively, prior to determining a claim signature of a claim, the claim signature search engine 124 may retain only certain types of words and/or phrases including, for example, verbs, nouns, etc., that may describe acts and/or subjects (or objects) involved or included in a product or service protected by the claim. The claim signature search engine 124 ignores words and/or phrases that indicate statutory classes (e.g., a process such as "method", a machine such as a device, an article of manufacture such as computer readable media, a composition of matter such as a chemical compound, etc.) in determining a claim signature of a claim. Additionally the claim signature search engine 124 ignores the preamble of the claim and ignores tenses of verbs in the claim.

When a unique signature for a claim is found/determined, the claim signature search engine 124 identifies other claims having a substantially similar signature for the claim. The claim signature search engine 124 will find other claims using the same words/phrases or essentially similar words through the use of synonym or thesaurus libraries, stemming, truncating, or the like. The use of such thesaurus libraries, stemming, truncation, fuzzy logic, fuzzy algorithms and the like may be especially useful when searching for descriptions, designs and logotype trademarks.

Additionally or alternatively, the search engines 110 may include other types of search engines 206 in addition to or alternative to the above three example search engines. For example, the search engines 110 may include an image search engine. An inventor may be interested in knowing whether a design, shape or pattern may be eligible for obtaining a design patent application or designation/combination trademark protection. The inventor may provide a pictorial or graphical image of that design, shape or pattern with or without a textual description as an input query, and the image search engine may recognize and/or match the provided image using conventional image recognition and/or matching algorithms to determine a design, shape or pattern and/or concept in the image. Based on the determined design, shape or pattern and/or concept, the image search engine 110 may identify one or more design patents and/or design patent applications (or registered trademarks, or pending trademark applications) that include this determined design, shape or pattern and/or concept that is the same as or similar to the pictorial or graphical image. Additionally or alternatively, the image search engine may further search the Internet to determine if anyone and/or any company has published a similar design, shape or pattern on the Internet. The image search engine 110 returns search results including the most relevant results (e.g., design patents, design patent applications, trademarks (word marks, designation marks, combination marks), Internet-published images, etc. to the inventor.

The search engines 110 perform multiple types of searches concurrently (e.g., simultaneously, overlapping, etc.) and sequentially, with each type of search returning a results set. For example, the concept search engine 120, the keyword search engine 122, and/or the claim signature search engine 124 all function relative to one or more inputs pertaining to a common search strategy. For instance, a user 106 might be interested in finding patents relevant to a particular patent or patent application. The user 106 provides the particular patent or patent application (e.g., an electronic copy of the particular patent or patent application, an identified number such as application number or publication number of the particular patent or patent application, a registration number of a registered trademark or a serial number of a trademark application, or a digital image of a product, etc.) to the search engines 110. An excerpt from the particular document may be provided to the concept search engine 120. Additionally or alternatively, one or more keywords from the particular patent or application may be provided to the keyword search engine 122. One or more claim signatures pertaining to one or more claims in the patent or application may also be input to the claim signature search engine 124. Each search engine 110 performs respective searches and generates results sets. The results sets are compared with each other to determine whether one or more documents are found in two or more of the results sets. When a document is identified by multiple searches, a higher confidence is applied to that document that it is relevant to the patent or application of interest. The combined results sets are graphically presented to the user 106 such as in a Venn diagram, for example, where sets of circles or other shaped enclosures each encircling respective results sets, with the results sets overlapping at documents common to any combination of two or more results sets.

The search engines 110 cooperatively perform the searches in a way that part or all of the search results from a search engine 110 may be provided to one or more other search engines 110 as an input and/or as a pool from which search results are retrieved. By way of example and not limitation, the user 106 provides a claim of a patent or patent application for an invalidity search. Upon submitting a textual description of the claim to be invalidated to the search engines 110, the IP-based intelligence business service 102 directs the claim signature search engine 124 to find one or more patents and/or patent applications that include claims having claim signatures that are similar to, or the same as, a claim signature of the claim to be invalidated. Upon finding one or more patents and/or patent applications that includes claims having claim signatures being similar to or the same as a claim signature of the claim to be invalidated, the keyword engine 122, extracts one or more keywords from the top N (where N is a positive integer and selectable by the user 106 or predefined by the IP-based intelligence business service 102) patents and/or patent applications that include claims having claim signatures that are most similar to the claim signature of the claim to be invalidated. The keyword engine 122 then uses these extracted keywords to find additional patents and/or patent applications that are relevant to the extracted keywords. Additionally, the concept search engine 120 extracts excerpts (e.g., text corresponding to abstract, background, summary, overview, a portion of detailed description, etc.) from the top M (where M is a positive integer and selectable by the user 106 or predefined by the IP-based intelligence business service 102) patents and/or patent applications that include claims having claim signatures that are most similar to the claim signature of the claim to be invalidated. The concept search engine 120 then determines concepts from the excerpts and performs an invalidity search using the determined concepts. The search results obtained from the one or more search engines 110 are compared, and are ranked in a way that a higher ranking is given to a patent or patent application having been found by more than one search engine 110.

The concept search engine 120, the keyword search engine 122, and/or the claim signature search engine 124 may also support a regular search for the user 106. For example, the search engines 110 may receive, from the user 106 information associated with a patent document such as a filing date, an application number, a publication number, a classification, etc., and retrieve or return a list of patent documents or patent information that corresponds to the information received from the user 106. For example, the user 106 can input a classification (e.g., a patent classification adopted by the United State Patent and Trademark Office (USPTO)). In response to receiving the inputted classification, the search engines 110 retrieve and return a list of patent documents classified under the inputted classification. The search engines 110 may also present the list of patent documents graphically, for example, as cumulative line graph(s), trend(s) and/or rate(s) of change of number of granted patents and/or number of filed patent applications over a predetermined period of time.

Additionally, the search engines 110 may receive from a user 106 a textual description of a patent claim or a textual description that substantially describes a patent, an application or an invention. The identification information may include an application number, a publication number, a patent number, and/or a combination of information associated with the patent document that may uniquely identify the patent document (such as a combination of a name of an inventor and a filing date, etc.). For trademarks it may be a registrant name, a registration number, a registration date, the trademark, the assignee, etc. For a copyright it may be an author name and a copyright registration number. The search engines 110 access the patent document and extract the textual description of the patent claim from the patent document. The search engines 110 may also access a prosecution history or file wrapper associated with the patent document and extract the textual description of the patent claim from the prosecution history or file wrapper associated with the patent document. The search engines 110 may determine a document in the prosecution history or file wrapper that includes a latest version of the patent claim and extract the textual description of the patent claim from the determined document.

In response to receiving the textual description of the patent claim or the textual description that substantially describes the patent claim or the invention, the search engines 110 obtain and retrieve a ranked list of search results across a library of documents or from a database 204, for example. The database 204 includes, but is not limited to, a patent database provided and/or supported by a Patent Office of a particular country (e.g., a USPTO (United States Patent and Trademark Office) database, a PAIR (Patent Application Information Retrieval) database, EPO (European Patent Office) database, WIPO (World Intellectual Property Organization) database, SIPO (State Intellectual Property Office of the P.R.C.) database, etc., and any other databases that are provided by public and/or private institutions. In one implementation, the ranked list may include documents ranked in a predetermined order (e.g., a decreasing order or an increasing order) of likelihood of rendering the patent claim unpatentable. Additionally or alternatively, the ranked list may include links of patent documents ranked in a predetermined order. In some implementations, the search engines 110 may further receive a date from the user 106. In an event that a date is received from the user 106, the search engines 110 may retrieve or return a ranked list of results including patent documents that have a filing date or a priority date prior to the date received from the user 106 in a predetermined order. The search engines 110 can also perform a latent semantic-based concept search across a library of documents using the textual description of the patent claim as an input. The search engines 110 present the ranked list of results graphically. By way of example and not limitation, the search engines 110 present the ranked list as a scatter plot (FIG. 16) having a first axis of time to represent dates of the retrieved patent documents and a second axis of relevancy to represent the likelihood of rendering the patent claim unpatentable.

The search engines 110 can also receive a query related to an invalidity search in a form of identification information of a patent document including a patent claim to be invalidated, a document including a patent claim to be invalidated and/or a textual description of a patent claim. When the search engine 110 receives identification information of a patent document, search engines 110 access the patent document and extract the patent claim to be invalidated from the patent document. The search engines 110 formulate the query based on the patent claim, for example, using the claim language of the patent claim. The search engines 110 perform a search using any of the above described search engines 110 such as the concept search engine 120, the keyword engine 122 and the claim signature search engine 124. The search engines 110 search a library of documents or a database (e.g., USPTO database, etc.) using the formulated query.

Figure 16:
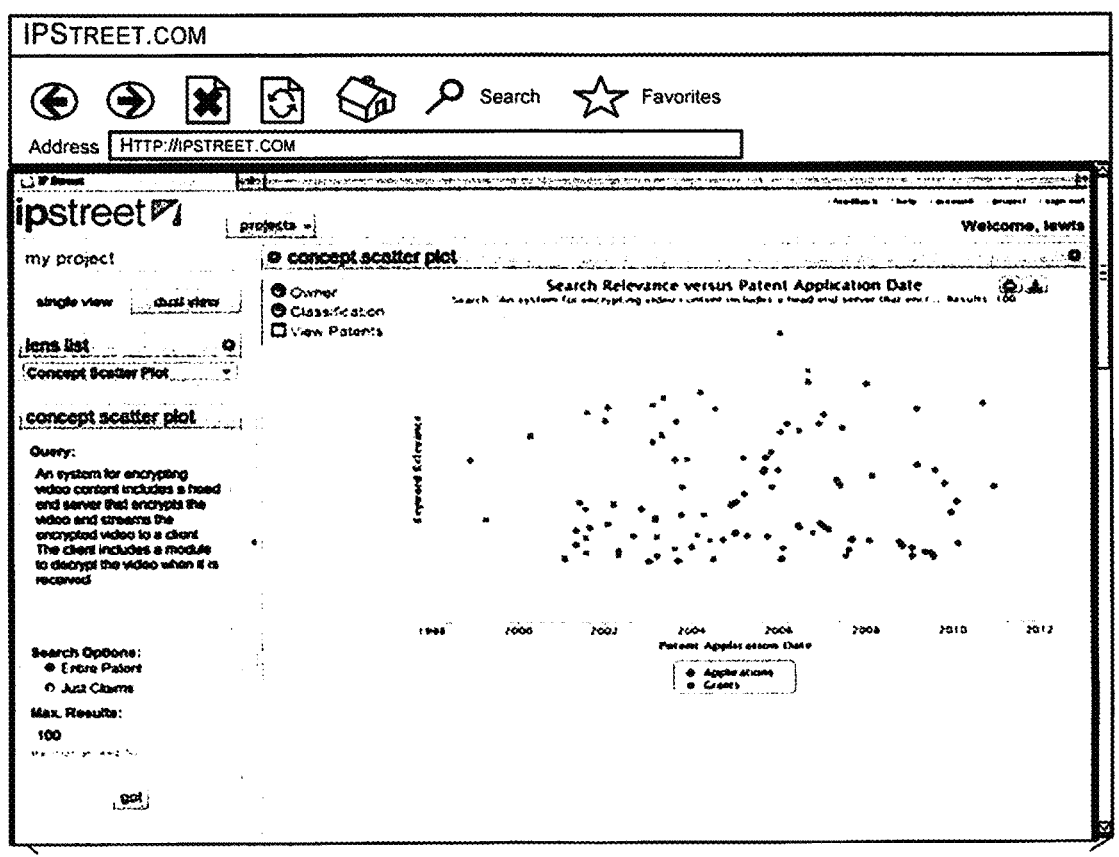
FIG. 16 illustrates a concept search results page in which results from a concept search engine are presented on a scatter plot having relevance plotted along one axis and time plotted along a second axis. The results may be designated (e.g., color-coded, shaded, sized, shaped, etc.) according to whether they are an issued patent or a patent application.

The search engines 110 obtain a ranked list of results based on the executed query. For example, the search engines 110 obtain or retrieve one or more references that include one or more claim features or claim limitations of the patent claim. The one or more references may include, but are not limited to, one or more issued patents, published patent applications and/or non-patent literature such as journal articles, news, etc. Additionally, the search engines 110 may rank the one or more references based on respective one or more claim features or claim limitations included in or found in the one or more references. By way of example and not limitation, the search engines 110 may rank the one or more references based on number of claim features or claim limitations of the patent claim that are included or found in the corresponding one or more references. A feature or claim limitation of a patent claim may include, but is not limited to, a group of words between any two delimiters, a group of words between two semicolons, a group of words between a semicolon and a full stop, etc. Additionally, search engines 110 may further propose one or more combinations of the one or more references that may combine to invalidate the patent claim (e.g., to render the patent claim obvious). For example, the search engines 110 can propose a combination of two or more references that, in combination, include all claim features or claim limitations of the patent claim. In response to obtaining or retrieving the ranked list of results, the search engines 110 returns the ranked list to a computing device of the user 106 for display. The results of the ranked list will include patent documents having associated dates that are presented as a scatter plot having a first axis of time to represent the dates of the patent documents and a second axis of relevancy within the invalidity search. (FIG. 16).

The search engines 110 may also receive a search query related to a freedom-to-operate search from the user 106. The user 106 may use any of the described search methodologies and protocols to prepare and submit the search query to the search engines 110. The search engines 110 may receive a date in the search query. Additionally or alternatively, the search query may include, but is not limited to, a country name or code, a classification of a taxonomy, a name of an assignee, a number of an inventor, a keyword, a textual description of a concept and/or any patent-related information of a patent document. In response to receiving the search query, the search engines 110 retrieve and return a plurality of expired patents based on the received search query and the search engines 110 retrieve and return one or more patent applications that are published and abandoned based on the received search query. In an event that a date is received in the search query, the search engines 110 retrieve or return expired patents that have an expiration date prior to and/or on the received date. By finding patents that have been or will be expired after a particular date, for example, the search engines 110 allows the user 106 to determine whether and when the user 106 may make, sell and/or import products and/or services that are potentially protected by these patents. In some implementations, the search engines 110 may receive an input query including a textual description of a product or service that is proposed or planned to be made, sold and/or imported. Additionally, the input query may include a country name or code for a country in which the product or service is proposed or planned to be made, sold and/or imported. Upon receiving the input query, one or more of the search engines 110 (e.g., the claim signature search engine 124) looks for one or more patents and/or patent applications that include claims that may read on the proposed product or service, and returns search results of these patents and/or patent applications in an order of relevancy.

The search engines 110 also allow the user 106 to submit a query for an infringement search (i.e., search for potential infringing products or services). By way of example and not limitation, the search engines 110 will receive a textual description of a patent claim of a patent or patent application from the user 106. The search engines 110 receive the query in a form of identification information of a patent document including a patent claim for infringement search, a document including a patent claim for infringement search and/or a textual description of a patent claim for infringement search. In an event that the search engines 110 receive identification information of a patent document, the search engines 110 access the patent document and extract the patent claim for infringement search from the patent document. In either case, the search engines 110 may formulate the query based on the patent claim, using the claim language of the patent claim. In some implementations, the query further includes a technological or industrial field that a potentially infringing product or service is being looked for. Additionally, the search engines 110 determine a technological classification for the patent claim based on a classification described in the patent document, and limit the infringement search to the determined technological classification. The search engines 110 perform a search using any of the above described search engines 110. The search engines 110 may search a library of documents, the databases 118, or a publicly available database (e.g., USPTO database, etc.) using the formulated query.

The search engines 110 will search for all patents and patent applications that include a claim that is relevant or similar to, and has a later effective filing date than, the received patent claim for which the infringement search is being conducted. This approach takes into account that companies with patents having similar claims but with later priority dates are likely to be producing products covered by the claims and are, therefore, likely candidates for infringement. By way of example and not limitation, a relevancy or similarity between two claims may be determined based on number of claim features or claim limitations that are common in the two claims. Additionally or alternatively, the search engines 110 will examine prosecution histories of granted patents and/or filed patent applications with later effective filing dates and determine which granted patents and/or filed patent applications include a prosecution history in which a patent or a patent application for which the infringement search is being conducted has been cited to reject claims of the granted patents and/or filed patent applications.

The search engines 110 will return a ranked list of results to the client device 108 for presentation to the user 106. The search engines 110 rank the results based on relevancy or similarity to the patent claim for infringement search. Additionally, the search engines 110 rank the results based on types of rejections (§ 102 rejections, § 103 rejections, etc.) used for rejecting claims of patents or patents applications found in the results. The ranked list of results includes owners of patent documents (i.e., granted patents and/or filed patent applications) and information (such as products that are launched within a predetermined period of time before and/or after filing dates or publication dates of the patent documents, etc.) associated with the owners of the patent documents. The search engines 110 present the ranked list of results graphically, for example, as a scatter plot having a first axis of time to represent dates (such as filing dates or priority dates) and a second axis of relevancy or similarity within the infringement search. The search engines 110 may further allow the user 106 to input a date. In response to receiving the date, the search engines 110 retrieve patent documents having a filing date or a priority date after the received date, and return a ranked list of results to the computing device for presentation to the user 106.

Additionally, the search engines 110 may search the Internet, online retailers, online shopping services, etc., for any product or service that may infringe the claim. This is especially important when searching for products protected with design patents and for trademarks or logos. Additionally or alternatively, the user 106 may indicate a specific industrial or technological field that the user 106 is interested in finding any potential infringement product or service. The search engines 110 determine an industrial or technological field to look for any potential infringing products or services based on the technological classification given to the search engines 110. The search engines 110 may also determine the industrial or technological sector to which that patent owner belongs to based upon, for example, company information stored in the corporate database 128, the financial database 130, national or international database storing company directories such as New York Stock Exchange, NYSE Amex Equities, etc. Additionally, the search engines 110 will search websites of individual companies that are found to be within the same industrial or technological sector, field or classification as the claim, the patent or patent application that includes the claim, and/or the patent owner of the patent or patent application that includes the claim.

The memory 204 may also include an analysis module 112 that is executable by processors 202. The analysis module 112 is configured to analyze the results returned by one or more of the search engines 110 or to analyze patents/applications that are identified by the user 106. The analysis module 112 provides various analysis tools to return results in text, or as graphs, depending upon the information/data to be conveyed. One type of analysis provided by the analysis module 112 includes a relevance analysis 208, in which results from one or more search engines 110 are returned and organized according to their relevance to the input query. A determination of how relevant documents are to a query may depend on a type of search being performed (concept search 120, keyword 122, both, etc.), a determination to be made based on the search (patentability, validity, freedom-to-operate, infringement, etc.), a taxonomy being employed (public, private, etc.), and the like. For example, the concept search engine 120 and the keyword search engine 122 may provide relevance values for the returned documents, and outputs may be provided in many forms, including in list form and/or on graphical presentations.

The analysis module 112 may include a trend analysis 210 that is used to determine how patents (and/or patent applications) and other data evolve over time. Associations among the data from the various databases 118 is applied in the trend analysis for identification of associations and patterns. For example, the trend analysis 210 determines macro filing trends of one or more intellectual property (or patent) owners or inventors, accumulation trends of patents or patent applications of the one or more intellectual property (or patent) owners or inventors in various categories or taxonomy levels, micro filing trends of the one or more intellectual property (or patent) owners or inventors among associated technologies, portfolio drift, and so forth.

The analysis module 112 may further include a distribution analysis 212 that may be used to determine patterns in the aggregated data. For instance, patent data results may be pivoted among any number of factors to discover distribution information. Following a search, the user 106 may wish to know the top owners in the results sets, or the top inventors.

The analysis module 112 may also include a portfolio analysis tool 214. The portfolio analysis tool 214 employs a taxonomical approach to define various levels and sublevels of technologies and then mapping patent documents (e.g., grants, applications, pre-filed invention disclosure documents, etc.) against the taxonomy. The portfolio analysis tool 214 supports various public taxonomies, such as the USPTO classification system of classes and subclasses, as well as private or customized taxonomies.

A growth rate analysis tool 216 may further be included in the analysis module 112, and may be employed to evaluate not only how patent assets are accumulated over time, but also various growth rates such as filing rates and acceleration rates. The growth rate analysis tool 216 may be able to compute a filing rate based on the number of filings period over period (e.g., year over year, quarter over quarter, etc.) or by computing a first derivative of the accumulation curve. In one implementation, the growth rate analysis tool 216 is able to compute an acceleration rate based on an increase or decrease in filings for a period over period, or by computing a second derivative of the accumulation curve.

The analysis module 112 also includes a patent assessment component 218, which analyzes patents and/or patent applications based on quality metrics that evaluates patent quality based upon the strength or breadth of the claims in the patent and/or patent application. The patent assessment component 218 may include a claim scope engine 220 and a claim signature engine 222. The claim scope engine 220 is configured to evaluate a patent and/or patent application based on the claim language and terms used in the claim. The claim scope engine 220 evaluates a patent and/or patent application based on the claim language and terms used in the claim relative to all the other claims against which the claim is to be compared. For example, a claim from a particular patent or application is compared to all the claims in all the patents and/or patent applications in a particular class or subclass of a classification or taxonomy system (such as USPTO classification, for example). Alternatively, a collection of patents and/or applications could be a result of a search, such as the claim signature search 124, the keyword search 122 and/or the concept search 120. The claim scope engine 220 computes a scope of a particular patent claim as a function of a count of words and/or phrases used in the particular claim and a frequency count of the words and/or phrases from the particular patent claim as found in the plurality of patent claims. More particularly, the claim scope engine 220 first identifies each and every word and/or phrase used in the claims in all patents and/or applications against which the claim is to be compared. The claim scope engine 220 employees a variety of language processing techniques to identify individual words, such as use of synonym libraries, removal of stop words, use of stemming, and so forth. For design patents and trademarks the analysis module 112 uses known descriptors/descriptions of geometrical shapes, textures, curves, surfaces and further employs additional search protocols including but not limited to edge detection, recognition by components theory, Geon recognition, outline of object recognition and speeded up robust features to identify shapes, configurations, textures, patterns and the like. Further still, the analysis module 112 uses fuzzy logic and fuzzy algorithms and thesauruses and the like to expand/broaden the textual terms used to describe the objects of interest.

The claim scope engine 220 may filter from the claim certain types of words and/or phrases that are useless in distinguishing the scope of the claim. By way of example and not limitation, the types of words and/or phrases to be filtered out may include, for example, adjectives, adverbs, conjunctions, pronouns, articles, determiners, prepositions, etc. Additionally, the claim scope engine 224 may retain only certain types of words and/or phrases including, for example, verbs, nouns, etc., that may describe acts and/or subjects (or objects) involved or included in a product or service protected by the claim. Once each unique word is identified, that word is counted in each claim in the collection of patents/applications to discover its frequency of occurrence.

Each claim can then be assigned a first dimensional value (e.g., a y-value) based on the number or count of unique words in the claim and a second dimensional value (e.g., an x-value) based on the commonness of the words used in the claims as governed by the frequency counts throughout the entire collection. That is, words are said to be more common if they have relatively higher frequency values within the collection and less common if they have relatively lower frequency values within the collection. In one implementation, the y-value is a function of the count of unique words in a claim, such as the inverse of the unique word count (i.e., 1/UWcount), so that a larger y-value is assigned to claims with fewer unique words and a smaller y-value is assigned to claims with more unique words. In this manner, this first value or coordinate represents an underlying assumption or premise that claims with fewer unique words tend to be broader than claims with more unique words. Said more simply, shorter claims tend to be broader than longer claims. This is not always the case, particularly when considering claims in life sciences or chemical arts, but is considered to be a correct generalization.

The x-value may be a function of the collection-based frequency counts associated with each of the words in the claim. One particular implementation employs an algorithm of one divided by the sum of the inverse of each word's associated frequency count (i.e., 1/sum (1/Freq $wd_1$+1/Freq $wd_2$+ . . . +1/Freq $wd_n$), where "Freq $wd_1$" is the count of a number of occurrences of unique word 1 in the claims from the collection of patents/applications). Less common terms result in larger denominator values (i.e., 1/low_freq_value>1/high_freq_value), thus making the overall result smaller. A larger x-value is thus assigned to claims that use relatively more common words for the collection of patents/applications being evaluated and a smaller x-value is assigned to claims that use relatively less common words. In this manner, this second value or coordinate represents an underlying assumption or premise that claims with more common words tend to be broader than claims with less common words. Once again, this may not always be the case, but is considered to be a correct generalization.

With the x-value and y-value, each claim can then be plotted in a two-dimensional graph which visually reveals how a particular claim compares in terms of word count and commonness to all of the other claims in the collection of patents being reviewed. Thus, for a given patent having "m" claims, the plot may show "m" designators or marks in a two-dimensional area. The location of the designators or marks indicates whether the claims are relatively broader or narrower within the collection. Claims with x- and y-values closer to the origin (i.e., claim has many words and the words contain uncommon words) are said to be narrower than claims farther from the origin (i.e., claims with fewer words and the words are more common).

Depending upon of the computer processing speed available to the user 106, it is anticipated that all of the described searches, calculations, and generation of the user 106 viewable results will take less than 1½ minute (90 seconds) each. As such, the searches, the calculations, and the generation of the results is believed to be beyond the capacity of human without computer processor assistance.

By using two vectors, the claim scope engine 220 also moderates each of the underlying assumptions or premises. For example, if a claim is relatively shorter, but uses very uncommon terms, a patent practitioner might still consider the claim to be narrow due to the restrictive language in the claim. Accordingly, the first vector or word count (i.e., y-value) may receive a relatively higher value, but the second vector or commonness value (i.e., x-value) would receive a relatively lower value. This would move the point back closer to the origin than had the claim been short and used very common words for that technology sector or collection.

With the x- and y-values, the claim scope engine 220 also computes a distance value from the origin. In this manner, each claim in a patent or patent application has a unique distance value based on these two values or coordinates. The distance value is then used to rank or otherwise order any results from the search engines 110 and analysis tools or modules 112. Further, the distance value is used to alter visual appearances in various graphical outputs, to convey to the user which assets in a given view is broader than others. For instance, in a portfolio view or concept scatter plot, the distance value is employed to alter sizes, the color intensities or color frequencies of designators or marks in results shown in the portfolio view or concept scatter plot to visually convey relative quality or breadth of corresponding claims in patents and/or patent applications.

The claim signature engine 222 is configured to evaluate a patent and/or patent application by identifying a unique signature of one or more claims (e.g., one or more independent claims, dependent claims, etc.) contained in the patent or application. More particularly, the claim signature engine 222 computes a signature of a particular claim as a function of the words and/or phrases used in the particular claim and a frequency count of the words and/or phrases in a large collection of claims from multiple patents and/or patent applications. The unique signature for a claim is presented in a graphical user interface that identifies the words in a claim and how common those words are to a collection of claims in a similar technology space. Examples of the graphical outputs of the claim scope engine 220 and the claim signature engine 222 are described in more detail below with reference to FIG. 19 through 25.

The analysis module 112 further includes other types of scoring algorithms 224 that are used to assess patents or patent applications. Whereas the claim scope engine 220 and the claim signature engine 222 represent scoring engines that assess the actual claim language, other scoring engines assess quality, value, innovativeness, or other characteristics of a patent or patent application based on other factors. Examples of other types of scoring algorithms include forward citation algorithms, backward citation algorithms, a combination of forward and backward citation algorithms, maintenance fee payment algorithms, and file wrapper history algorithms. Each of these scoring algorithms assess a quality of a patent and/or patent application based on these various factors or characteristics of the patent or patent application.

For example, a forward citation algorithm assesses quality of a patent or patent application of interest by determining a number of times the patent or application is cited or referenced by other patents and/or patent applications, and assigns a higher score to the patent or application if the number of times that patent or application is cited or referenced by other patents and/or patent applications is larger.

A backward citation algorithm assesses quality of a patent or application by determining number (and/or recentness) of references that the patent or application is cited or referenced during its prosecution. The backward citation algorithm may give a higher or same weight to non-patent literature than patents (and/or patent applications) and/or assign a higher score to the patent or patent application if the number (and/or recentness) of references that the patent or patent application cited during its prosecution is lower.

A maintenance fee algorithm assesses quality of a patent or application by determining whether one or more maintenance or annuity fees have been paid in time or failed to be paid for the patent or application, and assigns a higher score to the patent or application the longer it is maintained. The rational for this algorithm is that companies will not maintain patents or applications that are of low quality, low value, and/or are out dated, but companies likely will maintain patents or applications that are of high quality, high value, and/or are of continued commercial significance.

A file wrapper history algorithm assesses quality of a patent or application by determining its prosecution history before a patent office, giving a higher score to the patent or application if the prosecution history is shorter in time, involved fewer claim amendments and/or office actions. In some implementations, the analysis module 112 normalizes the scores returned by the above scaring algorithms for the patent or application based on respective predetermined thresholds or respective average numbers for patents or applications in the same technological field or classification (e.g., USPTO classification), before the same patent examiner, or the like.

By implementing multiple and various engines, the analysis module 112 is capable of evaluating patents and/or patent applications through a combination of multiple scoring algorithms. For instance, a user can assess a single patent using one or more of the claim scope engine 220, the claim signature engine 222, and one or more of the other scoring engines, such as forward and backward citation algorithms, maintenance fee algorithms, and so forth. The multiple scoring algorithms for evaluating a patent or patent application are presented via a user interface 100 that enables the user 106 to select one or more combinations of scoring algorithms with which to rank or sort a collection of patents or applications. For example, the analysis module 112 may select a number of scoring algorithms from the scoring engines (e.g., the claim scope engine 220 and the claim signature engine 222) and/or other scoring algorithms, and use these selected scoring algorithms to assess the quality of a patent or application. In one implementation, the analysis module 112 may generate a composite score, e.g., a combination of weighted scores returned from the selected scoring algorithms. In some implementations, the analysis module 112 may individually return scores from the scoring algorithms to enable representing various quality metrics (such as claim scope, etc.) for the patent or application.

The analysis module 112 may further implement a file wrapper tool 226 that determines a change in claim scope that resulted from prosecution of a patent application to issuance. The file wrapper tool 226 examines independent claims in a published application and identifies the broadest claim. The file wrapper tool 226 retrieves distance values calculated by the claim scope engine 220 for each claim in the patent application, and selects the claim with the largest distance value, which is representative of the broadest claim.

The file wrapper tool 226 next examines independent claims in the corresponding issued patent and identifies its broadest claim. Once again, the file wrapper tool 226 retrieves distance values calculated by the claim scope engine 220 for each claim in the granted patent, and selects the claim with the largest distance value.

The file wrapper tool 226 then computes a change value representing a change in scope from the broadest claim in a patent application relative to the broadest claim in the granted patent. The file wrapper tool 226 computes a percentage change from a first distance for an application claim to a second distance of a granted claim. This percentage serves as a proxy for the change in scope of the patent as a result of amendments made during prosecution. This change-in-scope approximation is very useful to a practitioner as it provides insights as to how much activity occurred during prosecution without having to review the file wrapper history. Additionally, the file wrapper tool 226 computes a change value representing a change in scope for a particular claim (e.g., an independent claim) in a patent application from a particular stage (e.g., at the time of filing the patent application, at the time of filing a response to an Office Action, etc.) to the time when the particular claim (possibly with claim amendments) is allowed. The file wrapper tool 226 identifies and follows that particular claim throughout the prosecution of the patent application based on its claim number, similarity or correlation between claims in responses for two consecutive Office Action, etc. The file wrapper tool 226 computes a change value for each change in scope for that particular claim between two Office Actions or between responses filed for two Office Actions, etc. The file wrapper tools 226 graphically or textually (e.g., in tabular or list form, etc.) present each change value to the user 106. This allows the user 106 to quickly and easily identify a particular stage or point in time that an activity substantially affected the scope of the claim. Moreover, this also allows the user 106 to focus on activities that occurred at that particular stage or point in time to determine whether claims of one or more patents and/or patent applications cited for rejecting the claim at that particular stage or point in time are related to a product or service covered by the claim at issue and whether a subset of the one or more patents and/or patent applications should be acquired or a license thereof should be obtained.

Furthermore, results from two or more analysis tools included in the analysis module 112 may be combined to provide even greater insights. For instance, a user can use the portfolio tool 214 to illustrate patent assets of a particular owner or inventor. In these views, the graphical elements used to represent the assets may be modified (e.g., size, color, intensity, etc.) based on the claim scope score. That is, assets deemed relatively broader (i.e., higher distance value) will be enlarged or changed in color or otherwise modified relative to other assets. As another example, results from search engines may be sorted or graphically represented according to claim scope.

One or more scenario wizards 116 are stored in memory 204 and executed by the processors 202. Each scenario wizard guides a user through a set of questions or requests that form inputs to the various analysis tools. In this manner, the user 106 need not be an IP specialist or even familiar with IP. Instead, the scenario wizards 116 extract appropriate information, initiate proper tools, and present results that are intuitive and actionable.

One scenario wizard 116 is a claim language evolution wizard 228 in which a user 106 is guided through a set of analytical tools to view how particular claim language in a patent document has evolved over time. A certain phrase or keyword is input and tracked through various patent documents over a period of time to help the user ascertain how that claim language has evolved in taxonomy. As an example, the user may be asked to input a word or phrase, and all claims containing that word or phrase are presented along a time line.

Another scenario wizard 116 employed is a taxonomy-based landscape wizard 230 in which patent landscapes are plotted according to a technology-relevant taxonomy that classifies patent documents according to particular technology classifications. The taxonomy-based landscape wizard 230 asks the user 106 for entry of some information that helps identify a set of patent assets, such as a company name, inventor, technology area, search query, and so forth. The taxonomy-based landscape wizard 230 further asks for time constraints or date ranges and whether the user 106 would like to apply a patent assessment score, such as claim scope to the results. The landscape-based wizard 230 also inquires as to whether the user would like to consider comparing the results to another company, inventor, and so forth.

The taxonomy-based landscape wizard 230 takes an input, such as an owner name, and maps relevant patent documents to the technology taxonomy. The patent documents are arranged according to priority date so that the user 106 can see how the assets "align" relative to both the technology classification as well as the timeframe within which the asset was procured. Additionally, graphical elements representing assets are scaled, colored, or otherwise visually varied to represent assessment scores applied to the patent assets. The taxonomy-based landscape wizard 230 allows the user to view landscapes at high level and iteratively "drill" into lower and lower levels to see how those assets are grouped. From such taxonomy-based landscapes, users can identify risk areas and opportunities as well as white space in which very little patent activity has taken place to date.

A freedom to operate wizard 232 prompts the user to enter a description of a technology that is about to be released, and an identification of which geographical markets it is to be released. This description is entered as a query into the concept search engine 120, and the limiting parameter of "claims only" is automatically selected and the corresponding patent territories are selected. In this manner, the description is searched against all claims in the patent database pertaining to the selected patent territories. The returned results provide a listing of relevant patent claims that may then be evaluated against the description of the product to inform the user of any potential risk of infringement were the user to launch a product of that description.

A validity analysis wizard 234 allows a user 106 to evaluate the validity of a patent claim. The user 106 is prompted to enter a patent or application number and if known, to identify one or more claims in the patent to be evaluated for validity. In response, the validity analysis wizard 234 accesses the patent records for the entered patent number, extracts the identified claim and any priority data, and enters the claim as a query to the concept search engine 120. The claim is then searched against all of the patent documents in the patent database (regardless of territory or country) and/or the database for non IP data including printed publications such as non-patent literature, journals, brochures, etc. Documents that pre-date the priority data associated with the patent claim may then be analyzed to determine whether or not the claim, as issued or published, is likely valid or not.

Another scenario offered by the IP-based business intelligence service 102 is a find a licensee/licensor scenario 236. In this particular scenario, a user 106 is prompted to enter a description of relevant technology, or identify a patent number. This input is then fed into the concept and/or keyword search engines, and the results are analyzed to identify current companies that have the most relevant assets. After the user 106 has identified a collection of potential companies with similar interests, additional analysis can be used with the growth rate analysis modules to identify which of this collection of companies may be actively patenting or otherwise protecting property in this particular area as evidenced by acceleration trends in that particular technology area. This list is then be ranked and organized and presented back to the user to help the user identify a potential licensee or licensor.

The presentation User Interface (UI) 114 is also shown stored in memory 204 for execution on the processors 202. The presentation user interface 114 lays out the various results from the searches, as analyzed by their various analysis modules, for presentation back to the users 106. The presentation user interface 114 relies on a number of visual graphics. The specific visual graphics employed in any given analysis or scenario wizard are configured to convey intuitively the results of the search and analysis.

The memory 204 further includes a taxonomy module 238 that enables a user 106 to select a taxonomy from a plurality of taxonomies that are stored in a taxonomy database 240. The plurality of taxonomies includes, for example, publicly available taxonomies and private taxonomies. Publicly available taxonomies include, but are not limited to, taxonomies provided and/or supported by government agencies such as patent offices of various countries (such as USPTO, SIPO, etc.) and/or organization (such as PCT, EPO, etc.), taxonomies defined by standards setting organizations, etc. Private taxonomies include, for example, a taxonomy defined by a private company. Additionally the plurality of taxonomies may include one or more customized taxonomies including, for example, a taxonomy customized for a particular technology, a taxonomy customized for a particular company, a taxonomy customized for a particular industry, etc.

The taxonomy module 238 provides the plurality of taxonomies to the user 106 for selecting a taxonomy therefrom. The user 106 can select a particular taxonomy from one or more taxonomies available, and provide a search query to one or more of the search engines 110 (e.g., the concept search engine 120, the keyword search engine 122, and/or the claim signature search engine 124). The search engines 110 then perform a search for patents and/or applications based on the search query and the selected taxonomy. The search engines 110 return search results to the user 106 in a graphical form, a tabular form and/or a list form. The search results are arranged based on relevancy of the returned patents and/or applications to the search query. Additionally or alternatively, the search results are arranged based on classifications or categories of the selected taxonomy to which respective patents and/or applications belong. In one implementation, the search results include number of hits (i.e., number(s) of patents and/or applications) for each classification or sub-classification. The user 106 then selects a particular classification which may be expanded to show information of the patents and/or applications under that particular classification.

In some implementations, the user 106 may desire to find one or more patents and/or applications within a particular classification or category such as electronic commerce. The user 106 would select a particular taxonomy. The user 106 may further input one or more particular classifications or categories (e.g., "electronic commerce", etc.) under the selected taxonomy to find related patents and/or applications. Alternatively, the user 106 can input one or more specific classification codes (e.g., a specific classification code for "electronic commerce" in this example) to the service 102. The service 102 or the search engines 110 provided by the service 102 performs a search for the user 106 based on a search query provided by the user 106 and the one or more particular classifications of the taxonomy selected by the user 106. The search engines 110 return search results that are displayed to the user 106 as described above.

The service 102 and the search engines 110 enable the user 106 to change or switch the taxonomy to another taxonomy from the taxonomies available to the user 106. In response to receiving a selection of a new taxonomy, the service 102 or the search engines retrieve new search results based on the new search query and the newly selected taxonomy, and return the new search results to the computing device of the user 106 for display to the user 106. Additionally or alternatively, the service 102 or the search engines 110 enables the user 106 to change the order and/or the way of displaying the search results to him/her. By way of example and not limitation, the service 102 or the search engines may provide display options to the user 106 through the presentation user interface 114.

In one implementation, the taxonomy module 238 allocates a memory space for the user 106 to store any taxonomy submitted by the user 106. The taxonomy module 238 first authenticates or validates the user 106 (e.g., by examining a password and/or username submitted from the user 106) prior to allowing the user 106 to submit a new taxonomy. The new taxonomy submitted by the user 106 is viewable and/or usable by the user 106 only. In an alternative implementation, the new taxonomy submitted by the user 106 may be viewable and/or usable by other users 106 and/or the service 102 with or without knowledge or permission of the user 106 who submitted the new taxonomy. For example, after the user 106 has submitted the new taxonomy to the taxonomy database 240, the search engines 110 will enable the computing device of the user 106 to display this new taxonomy together with any previous taxonomies provided by the search engines 110 for performing a search.

One or more of the search engines 110 (and/or the portfolio analysis tool 214 or the taxonomy-based landscape wizard 230) are further configured to perform a patent search for a given taxonomy or list of keywords or concepts. By way of example and not limitation, a user 106 provides a taxonomy including a hierarchy (e.g., a hierarchical tree or forest, etc.) of classifications as an input query. Each classification is represented by a keyword or a concept. In some implementations, the provided taxonomy further includes a respective index for each classification. The user 106 provides this taxonomy by various input methods including, for example, typing, copying and pasting, uploading a file including the taxonomy, etc. In some implementations, the search engines 110 further allows the user 106 to provide a name (e.g., an inventor, owner or assignee, etc.) and allow the user 106 determine a patent portfolio of the inventor, owner or assignee under the provided taxonomy or other taxonomy provided by the search engines 110. The search engines 110 allows the user 106 to provide multiple names (e.g., one or more inventors, owners and/or assignees, etc.) and allows the user 106 to compare patent portfolios between inventors, owners and/or assignees under the provided taxonomy or other taxonomy provided by the search engines 110.

Upon receiving the taxonomy, one or more of the search engines 110 (e.g., the keyword search engine 122, etc.) performs a patent search for each classification of the taxonomy to obtain a plurality of related patent documents for each classification. The search engines 110 then compare patent documents obtained for two classifications which are of parent-and-child relationship. For example, the search engines 110 compare patent documents obtained for a first classification with patent documents obtained for a second classification, where the first classification is an intermediate child of the second classification. The search engines 110 filter any patent document that is not included in the patent documents for the second classification from the patent documents associated with the first classification. Furthermore, the search engines 110 compare patent documents associated with a classification with all patent documents obtained for classifications that are its immediate children of that classification, and retain only patent documents for that classification if these patent documents are found in the patent documents obtained for its immediate child classifications. When a patent document is filtered from patent documents associated with a particular classification, the search engines 110 propagate this information upward and/or downward in order to perform corresponding filtering for patent documents associated with its parents and children. Upon completing searching and filtering for each classification of the taxonomy, the search engines return search results to the computing device of the user 106 for presentation. The search results include, for example, number and information of patents and/or applications found for each classification of the taxonomy, etc.

The search engines 110 perform this type of taxonomy search in a top-down manner. By way of example and not limitation, the search engines 110 identify a classification at the top (e.g., the first level) of the hierarchy (e.g., a hierarchical tree), and perform a keyword or concept search for a keyword or concept associated with that classification at the first level of the hierarchical tree. Upon obtaining or retrieving a plurality of related patent documents for that top classification, the search engines 110 perform a new keyword or concept search for a keyword or concept provided in each classification that is an immediate child of the top classification, i.e., classifications at the second level of the hierarchical tree. In response to obtaining a plurality of related patent documents for each child classification, the search engines 110 aggregate all the related patent documents obtained for the second-level classifications having the same immediate parent classification (i.e., the top classification in this case). The search engines 110 then compare the aggregated patent documents obtained for the child classifications with the patent documents obtained for their immediate parent classification, and retain patent documents that are common thereto. Specifically, a patent document is filtered or removed from the patent documents associated with the parent classification (i.e., the top classification in this case) if that patent document is not found in the aggregated patent documents for all the child classifications of the parent classification. Furthermore, a patent document is filtered or removed from the patent documents associated with an immediate child classification if that patent document is not found in the patent documents for the parent classification. The search engines 110 repeat searching, aggregating, comparing and filtering for subsequent levels of the hierarchy of the taxonomy until the lowest level is reached. Moreover, when a patent document is filtered from patent documents associated with a particular classification, the search engines 110 propagate this information upward in order to perform corresponding filtering for patent documents associated with its parents. Upon completing searching and filtering for each classification of the taxonomy, the search engines return search results to the computing device of the user 106 for presentation. The search results include, for example, number and information of patents and/or applications found for each classification of the taxonomy, etc.

The search engines 110 perform this type of taxonomy search in a bottom-up manner. For example, the search engines 110 identify one or more classifications at the lowest level of the hierarchy, and perform a keyword or concept search for a keyword or concept associated with each of the one or more classifications at the lowest level. Upon obtaining or retrieving a plurality of related patent documents for each of these one or more classifications at the lowest level, the search engines 110 perform a new keyword or concept search for a keyword or concept provided in each classification at the next higher level. In response to obtaining a plurality of related patent documents for each classification at the next higher level, the search engines 110 aggregate all the related patent documents obtained for the lowest-level classifications having a same immediate parent classification. The search engines 110 then compare the aggregated patent documents obtained for the child classifications with the patent documents obtained for their immediate parent classification, and retain patent documents that are common thereto. Specifically, a patent document is filtered or removed from the patent documents associated with the parent classification if that patent document is not found in the aggregated patent documents for all the child classifications of the parent classification. Furthermore, a patent document is filtered or removed from the patent documents associated with an immediate child classification if that patent document is not found in the patent documents for the parent classification. The search engines 110 repeat searching, aggregating, comparing and filtering for subsequent levels of the hierarchy of the taxonomy until the highest level is reached, for example. Moreover, when a patent document is filtered from patent documents associated with a particular classification, the search engines 110 propagate this information downward in order to perform corresponding filtering for patent documents associated with its children. Upon completing searching and filtering for each classification of the taxonomy, the search engines return search results to the computing device of the user 106 for presentation. The search results include, for example, number and information of patents and/or applications found for each classification of the taxonomy, etc.

Illustrative User Interfaces

Figure 3:
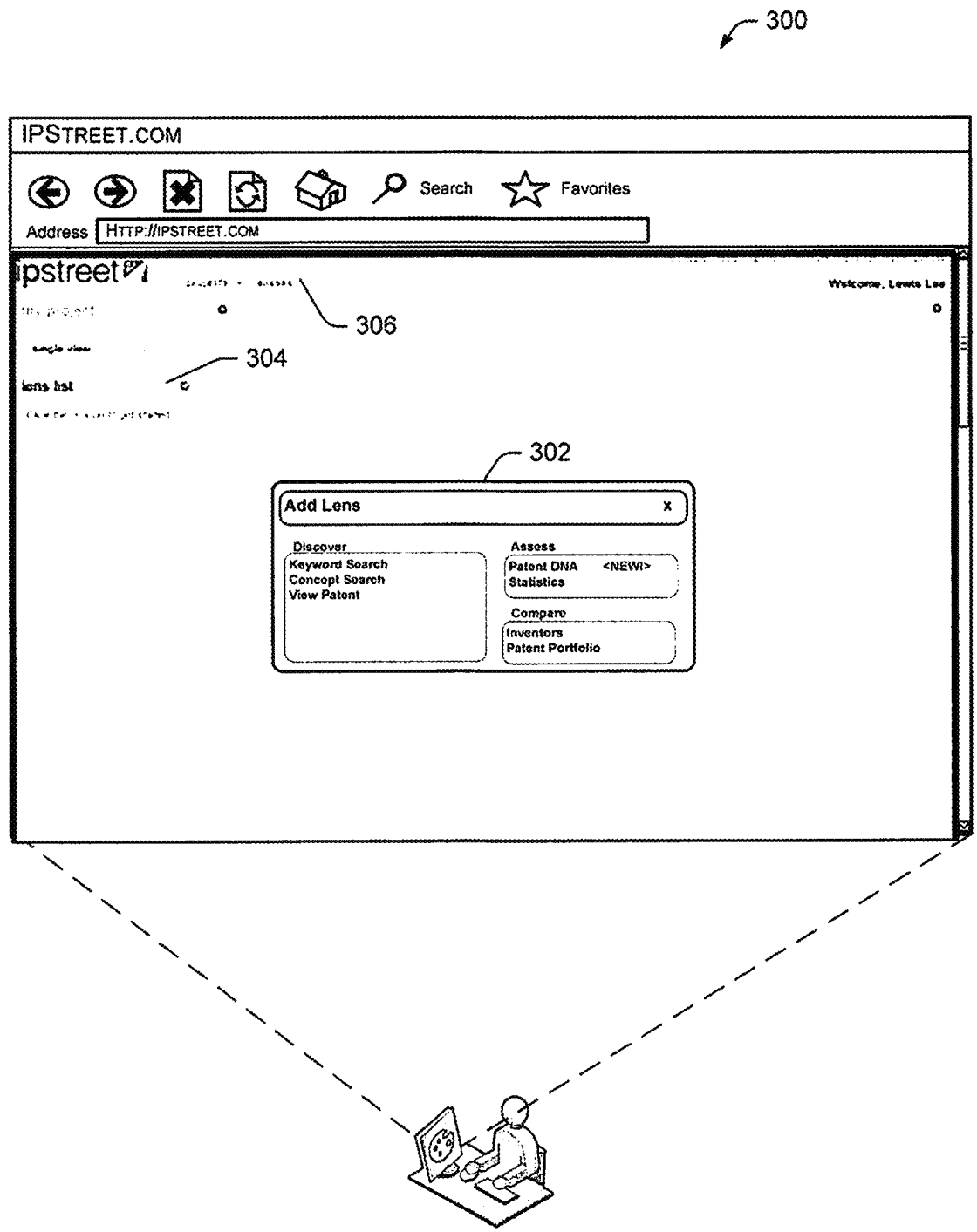
FIG. 3 illustrates an example user interface rendered by a browser on a computer. The first screen rendering shows a project page with a menu of possible lenses.

FIG. 3 shows a user interface 300 rendered on a browser of a user device. User interface 300 represents a main page that is presented after the user securely logs on to the IP-based business intelligence service 102. The service 102 is designed around a project metaphor in which users 106 can define multiple projects and within each project may analyze data through any number of lenses. At the center of the main page 300 is an "add lens" menu 302 with a list of lenses. The lenses are grouped according to their functional purposes. In FIG. 3, three categories of lenses are illustrated: discover, assess, and compare. In other implementations, there may be more or less than these categories. For instance, in other implementations, four categories of lenses may be used: discover, measure, compare, and connect.

The "discover" category of lenses is designed to allow users to search and explore the various databases (e.g., the databases 118) to discover items of interest. Within this category, three lenses are illustrated: keyword search, concept search, and view patent. As will be described below in more detail, the keyword search lens allows users to search the databases based on keyword queries. The concept search lens allows users to search the databases according to concepts defined in the query. Individual concepts may include sentences, paragraphs, or documents. Typically the query entered into a concept search contains far more words than are found in a common keyword search. The view patent lens allows the user to pull up individual patents or patent applications and view them. The data contained in the patents are laid out according to various data fields and the user is also given the option to view the patent or application as published by a patent office, e.g., the United States Patent and Trademark Office.

The "assess" category of lenses allows users to measure individual assets or a portfolio of assets. In this example, a patent DNA lens provides a way to examine the quality of a patent or patent application by assessing the claim language. The patent DNA includes a claim signature that uniquely identifies individual claims in a database of patents/applications, and a claim landscape that evaluates claim scope of individual claims relative to other claims. Another lens in the "assess" category is a statistics lens, which provides projected metrics that measure the calculated breadth and quality of a patent portfolio or individual patent.

The "compare" category of lenses permits a user to compare various assets or portfolios to one another. The compare category allows, for example, executives to benchmark their own portfolios against those of others. In the "compare" category, an inventor lens is shown to help users identify key inventors in particular companies or technology areas. A patent portfolio lens is also found in the "compare" category to examine patent portfolios of individual companies to ascertain a patent landscape of those companies, or of technology areas to evaluate top companies in the space.

The main page 300 also has a project management area 304 arranged along one side (e.g., the left hand side) of the user interface. Within this project management area 304, users can select lenses and those lenses will be tracked. The user has the ability to rename lenses, add, or delete lenses as desired. The user can also add, delete, or rename projects. Also shown as part of the user interface, the main page 300 and subsequent pages throughout allow the user to see lenses presented in a single view with just a single lens being depicted, as well as in a dual view in which two lenses may be presented side by side.

The main page 300 (FIG. 3) may also have an alias tab 306 that enables users to define super groups for purposes of searches. For instance, the user may define an alias for a company that includes all the various entities owned or partially owned by the company. These entities are aggregated and results depicted as if it were a single company.

For example a user may select the keyword search lens in the "discover" category. The user can select (e.g., touch, mouse to, etc.) that item, select (e.g., touch, click, etc.) and open an instance of that lens.

Figure 4:
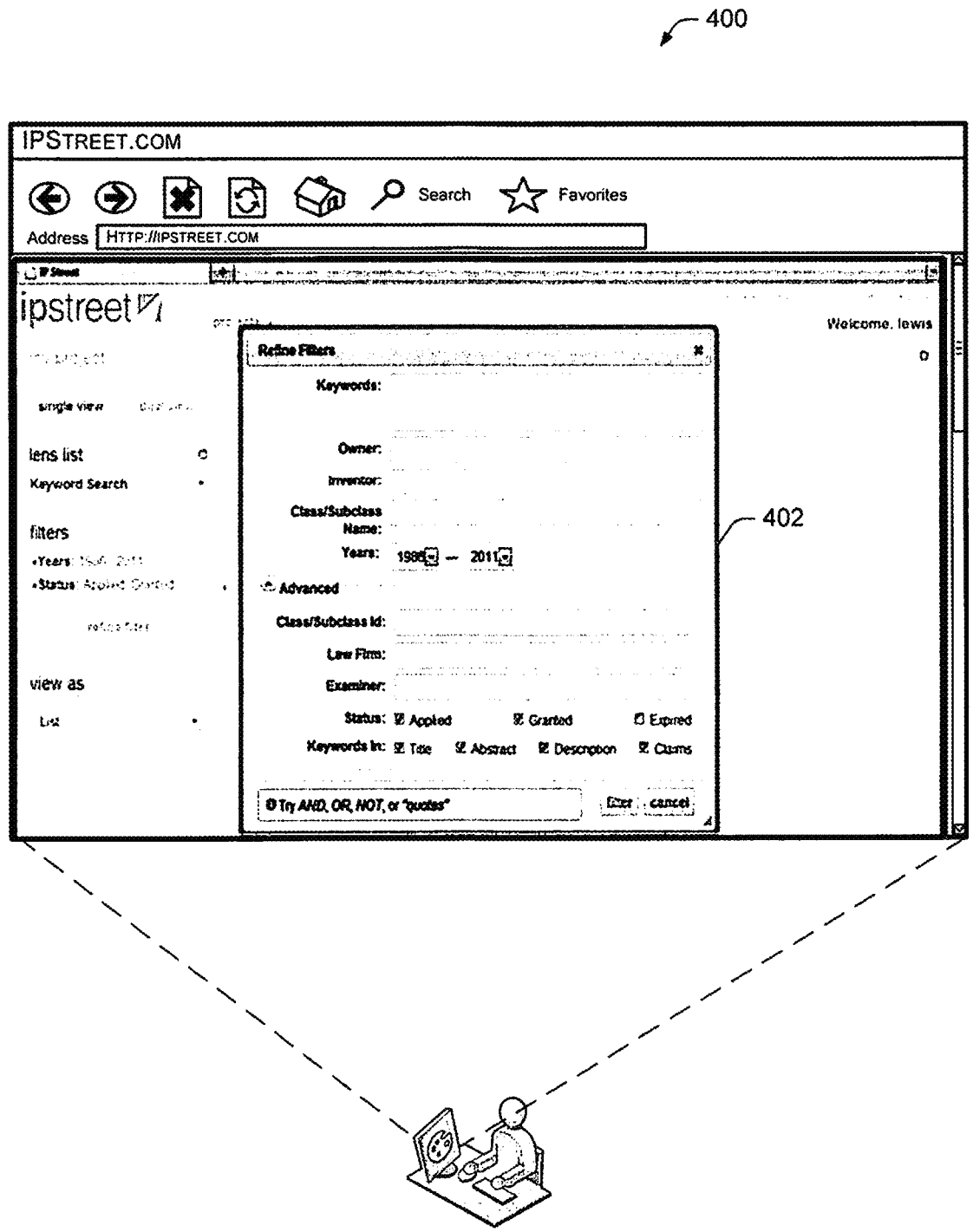
FIG. 4 illustrates a keyword search user interface having a filter menu that enables users to enter various search terms.

FIG. 4 shows a screen rendering 400 that is provided in response to a user selecting the keyword search from the menu on the home page 300 in FIG. 3. In this user interface, the keyword search is added to the lens list in area 304 and a set of filters is provided to allow user entry of a particular search. A "refine filter" input box 402 is presented at the center of the user interface 400. The user can enter any number of items to initiate a search. In this particular example, the input box 402 includes a keyword entry field to enable users to enter one or more keywords to be searched across the various patent documents. An owner entry field allows the user to enter one or more owners or assignees of the patent documents. An inventor entry field is provided to allow entry of one or more inventors who are named on various patents. A class/subclass name entry field is provided to allow users to enter search terms associated with particular technology areas. A user is not expected to know the particular classification identifiers (IDs) and hence this entry field allows users to enter the technologies by keyword. For example, rather than knowing that software is classified in a particular numerical class at the U.S. Patent and Trademark Office, for example, the user may simply enter the term "software" or a particular version of software such as "word processing", into the class/subclass name field. The search engine will then match the entered item against all possible classes and subclasses at the U.S. Patent and Trademark Office. The "years" input field allows the user to specify a year range for which results are desired.

Many additional fields are also employed as represented by the advanced portion of the refine filters menu that can be selected to expand the search options. Within this area is a class/subclass ID entry field that allows users to enter the exact class and/or subclass numbers. A law firm entry field allows the user to input one or more law firms of interest. An examiner entry field allows users to enter the names of one or more examiners. A status entry field provides a list of the type of assets that the user may be interested in, including pending applications, granted patents, and expired patents. The last entry field shown in this example is an entry field that allows the user to select what part of the patent document is to be used for the searching of the keywords. For instance, the search engine allows the user to determine whether to search for keywords in the title, abstract, detailed description, and/or claims sections of the patent documents. Boolean operations such as "AND", "OR", "NOT", and "EXACT MATCH" may be applied or used in any one of the entry fields.

For discussion purposes, suppose the user decides to enter keywords into the keyword entry field at the top of the refine filter popup menu. As one example, suppose the user enters the phrase "online shopping cart" in an effort to identify an exact match where the phrase "online shopping cart" is used in various patent documents. When the user is satisfied with the search query, the user may actuate the filter button to initiate the search.

At this point, the keyword search engine 122 searches all of the documents in the database 204 (e.g., patents, patent applications, other printed or electronic publications such as non-patent literature, etc.) for any documents that contain a match of the input query. The keyword search engine 122 identifies a set of documents that satisfy the search query. The results are presented in any number of ways, including list views, graphical views, and so forth.

Figure 5:
FIG. 5 illustrates a results page presented in a list format from the keyword search input.

FIG. 5 shows a screen rendering 500 that results from the search of the phrase "online shopping cart" entered into the input box on FIG. 4. The results are presented in a list format that rank orders the patents according to a relevancy score returned by the keyword search engine 122. Any number of data items for each patent document may be returned, including but not limited to an owner, a list of inventors, the class and subclass in which the document is classified, serial numbers, publication numbers, grant numbers, abstract, one or more claims, and so forth. Any matches of the input query may also be highlighted to quickly convey relevant portions and why the item was selected. As shown in FIG. 5, a lens entitled "keyword search" has been added to the lens list to show that the user has created a new lens.

The list view of the results is one possible way to view the various patent documents that were identified as satisfying the search query. Depending on the extent of analysis, the search results may be presented in many other ways. In the lower left hand side of the user interface 500, the user has the option of selecting various ways to view this data. Several representative examples will be described below in more detail.

Figure 6:
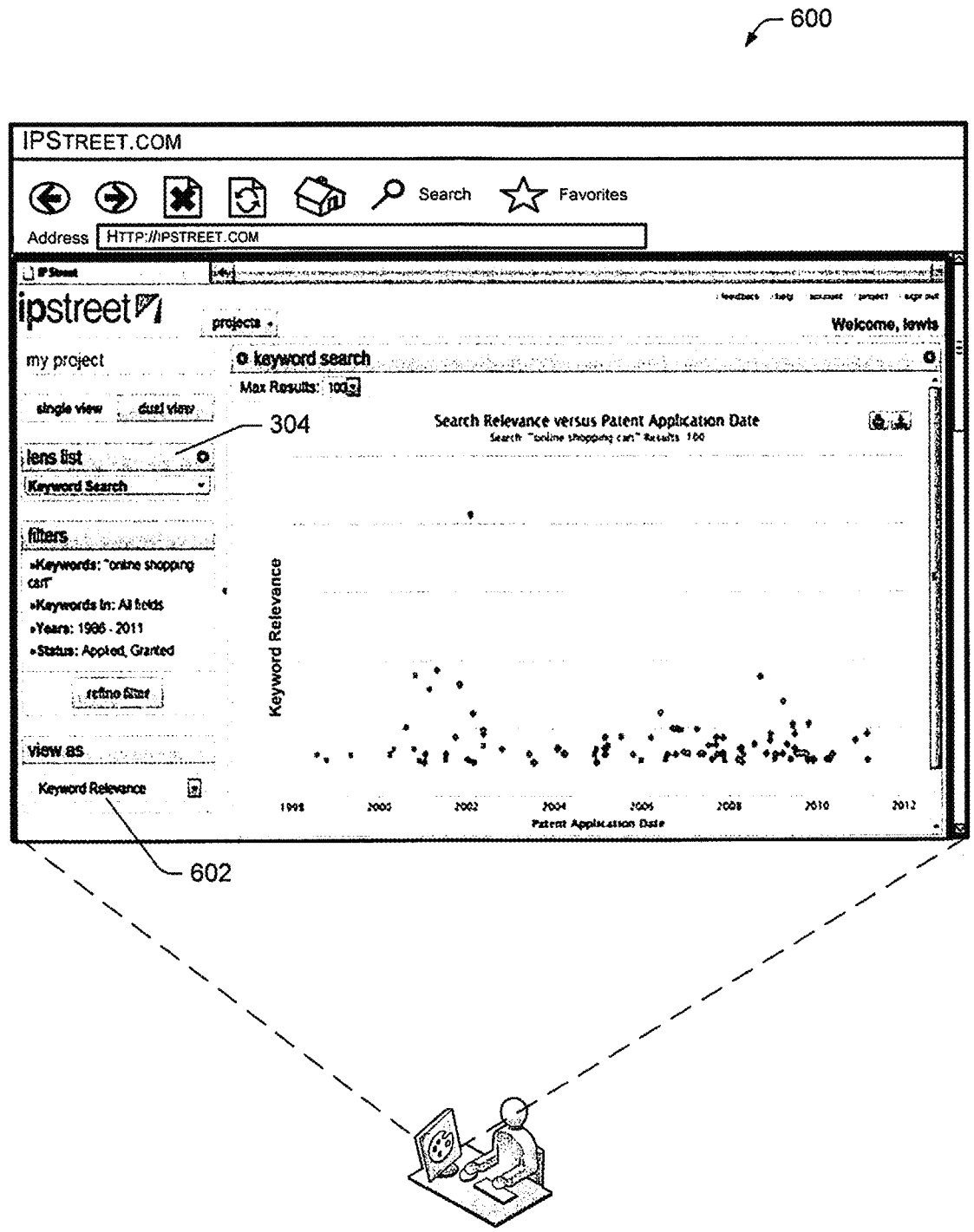
FIG. 6 illustrates a keyword relevance results page that shows in scatter plot format the results of a keyword search.

FIG. 6 shows a screen rendering 600. In this example, the user has selected to view the results according to keyword relevance. Upon selection of keyword relevance in the drop down menu 602 in the navigation area 304 of FIG. 5, the relevance analysis module 208 (FIG. 2) processes the results and depicts the results according to a scatter plot as shown. In this view, each patent or patent application is represented by a graphical element or symbol of a same or different color. In this example, applications are represented by orange-colored diamonds, while granted patents are represented by blue-colored squares. The various patents and patent applications are plotted according to their relevance along the y-axis and according to their application dates along the x-axis. The user may select how many results to plot, with one hundred items being a representative default.

As shown in FIG. 6, a scatter plot of various patent documents that are considered most relevant to the keyword input of "online shopping cart" are distributed across the graph. The user may hover a pointer (e.g., a mouse) or finger (if the computing device of the user includes a touchscreen functionality) over any one of the diamond or square elements on the plot to identify specifics about the underlying asset. Moreover, each graphical element is itself actionable and upon selection by the user will allow the user to see the patent document in full. That is, selection of a graphical element on the plot invokes the view patent lens to show a particular patent or patent application.

Figure 7:
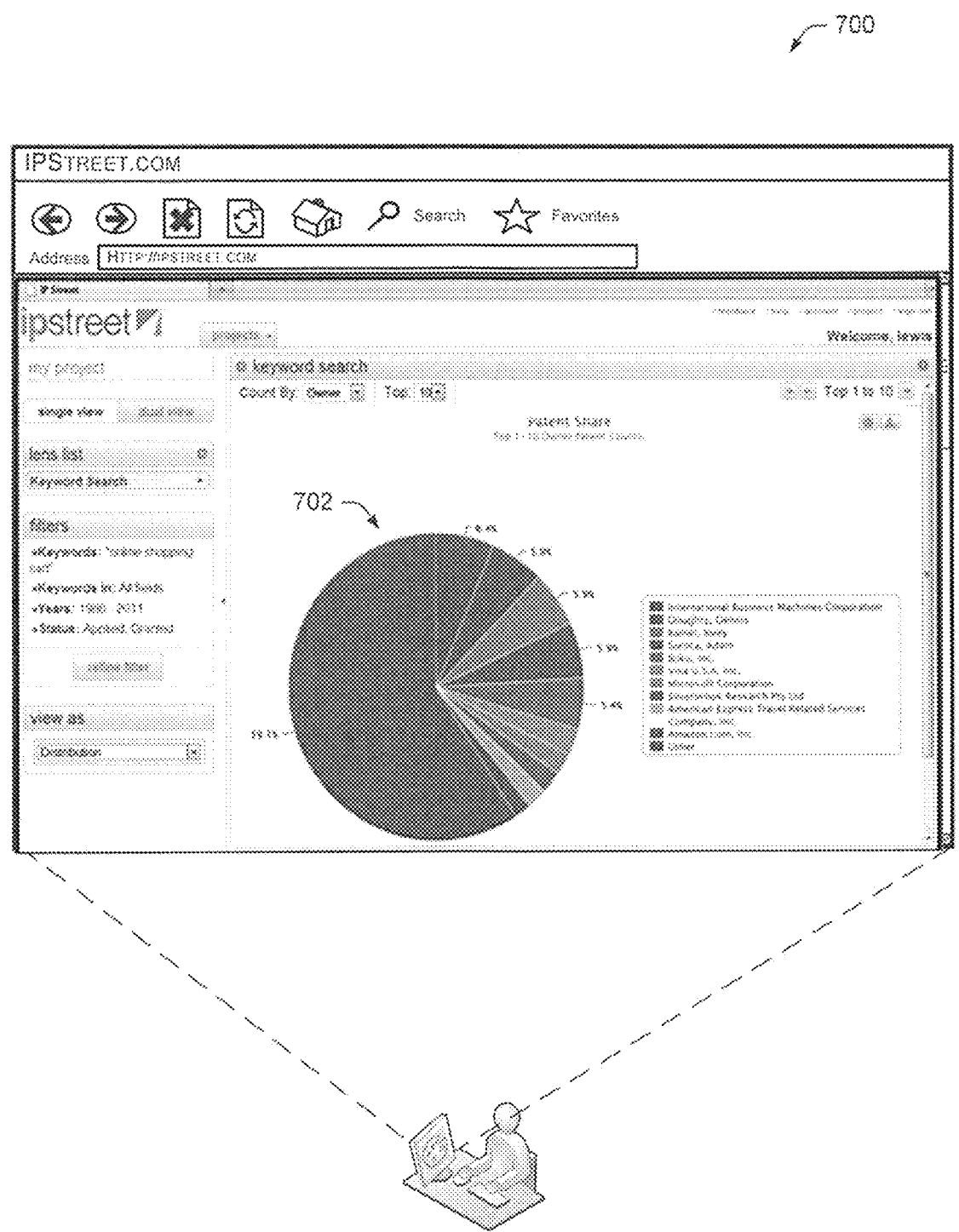
FIG. 7 shows a results page from a keyword search, wherein the results are organized according to a distribution presentation in a pie chart.

FIG. 7 shows a screen rendering 700 that is presented in response to the user selecting the distribution option for viewing the search results data. In this example, the distribution analysis module 212 (FIG. 2) processes the results and the distribution of the results about select features is graphically presented as a graph 702 (in this case, a pie chart). The distributions may be computed in any number of ways. In this example, the distribution shows the top ten owners that have patents or patent applications that contain the keyword search phrase "online shopping cart". These parameters are also user selectable as shown by the two drop down menus above the pie chart. The user may count by other data factors, as will be described below in more detail, or can select different numbers of results to display. At the right hand portion of the results screen, item navigation is provided to allow the user to view next and previous results. For instance, the top ten results are initially illustrated but the navigation allows users to see the next ten results and then the next ten results, and so on. Although a pie chart is illustrated in FIG. 7, other graphical types such as a bar chart may be deployed as well.

Figure 8:
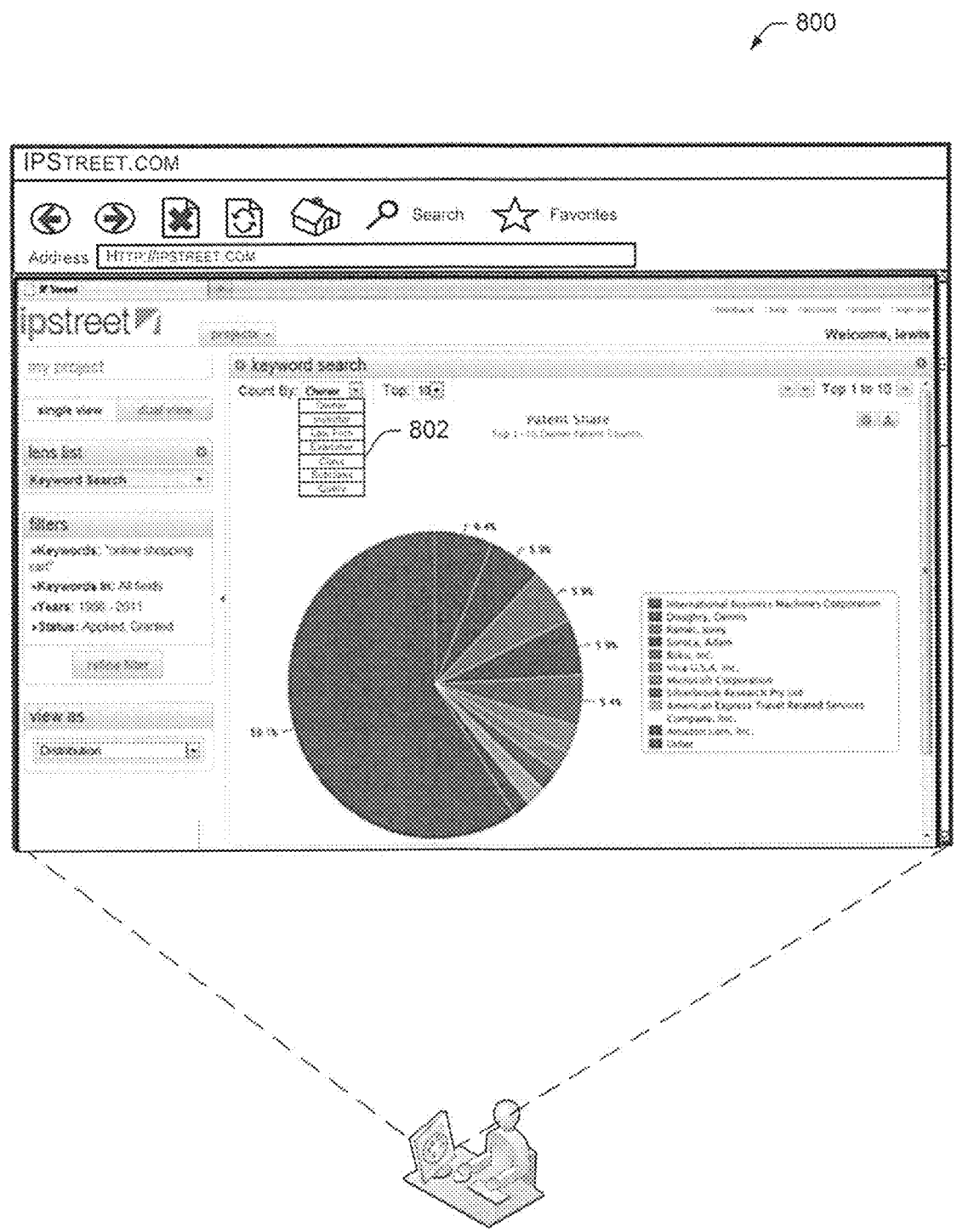
FIG. 8 shows the same user interface of FIG. 7, but also illustrates a drop down menu showing various ways to pivot the data results (e.g., by owner, inventor, law firm, examiner, class, subclass, or query).

FIG. 8 shows a screen rendering 800 that appears in response to the user selecting the drop down menu 802 to sort the results by other data items to change the results. In this example, other data items that may be used in this distribution view include sorting by inventor, law firm, examiner, class, subclass, and query. It is to be recognized however, these fields are merely representative and many other types of data items may be used.

Figure 9:
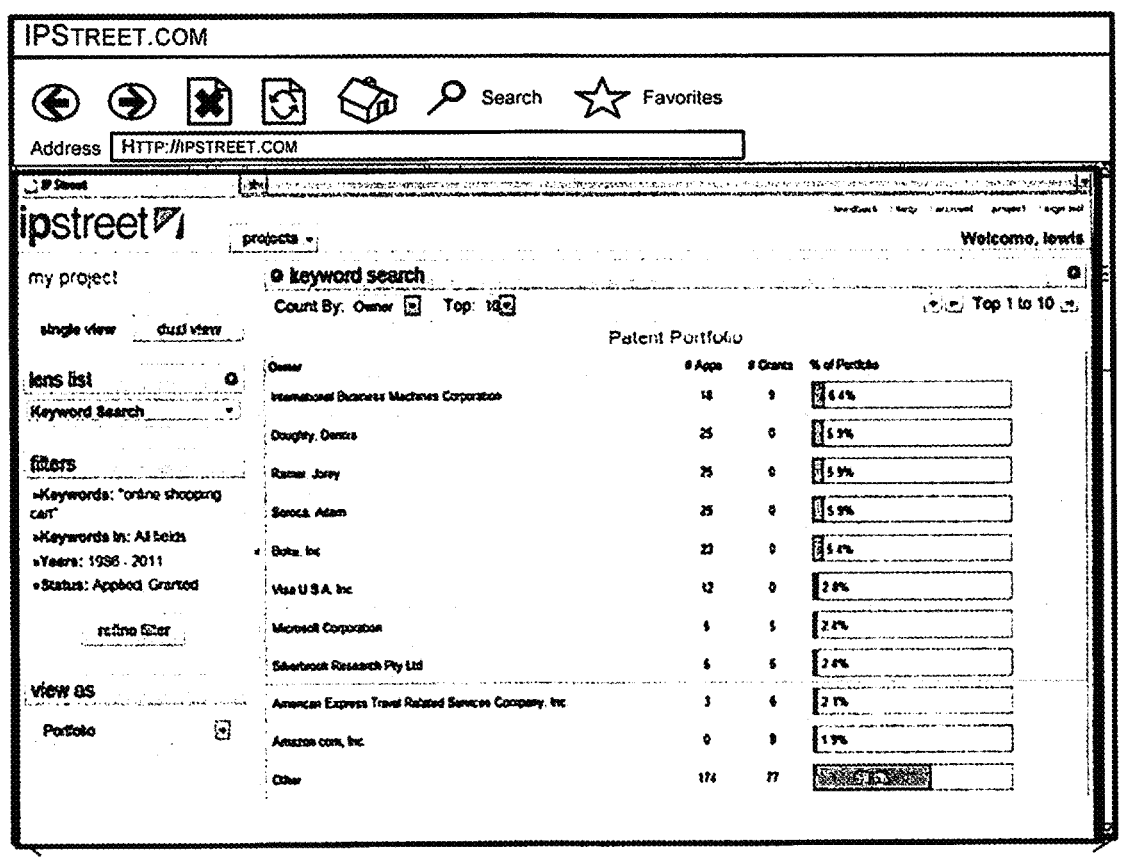
FIG. 9 illustrates a results page from a keyword search and illustrates the data presented according to a portfolio layout.
Figure 9:

FIG. 9 shows a screen rendering 900 that is presented in response to user selection of the portfolio view in the project navigation space in FIG. 5. The portfolio analysis module 214 (FIG. 2) processes the results and the portfolio user interface 900 shows data items arranged according to a histogram in which particular counts and percentages of the overall portfolio are shown. In this example, IBM Corporation is identified as the top intellectual property owner of patents and applications that include the phrase "online shopping cart". IBM is shown to have eighteen applications and nine granted patents that contain this phrase and holds 64% of the set of patents and applications that contain that keyword phrase. Once again, the user may use the item navigation to see the next ten owners and the following ten owners, etc.

Figure 10:
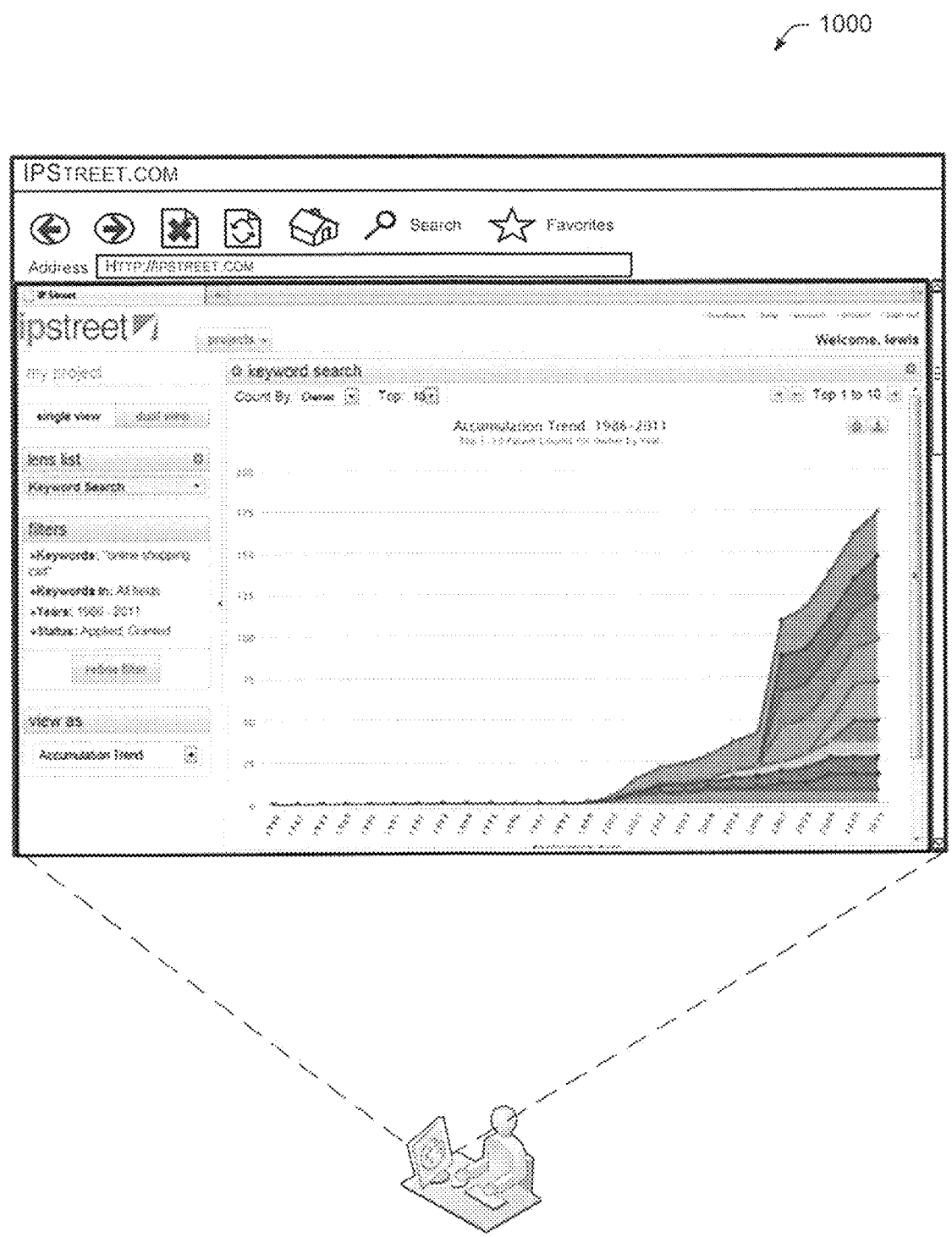
FIG. 10 shows a results screen from a keyword search, in which the results are presented according to an accumulation trend layout showing the trend of asset creation/accumulation over time.

FIG. 10 shows a screen rendering 1000 that is presented in response to the user's selection of the accumulation. In response to the user selecting this option, the trend analysis module 210 (FIG. 2) is used to compute a trend analysis of the patents having a keyword phrase "online shopping cart".

The trend user interface 1000 shows how the patents and applications which include the keyword phrase were accumulated over time. The trend chart illustrated in this user interface 1000 includes a timeline along the X axis and a count of assets along the Y axis. The results may be visually coded to represent the various holders or owners of those assets. For example, the results may be color-coded or pattern-coded (such as each holder or owner is represented by a different pattern or shading, for example), etc. If the user chooses a different data item to count by, the color-coded sections (as illustrated as an example in FIG. 10) represent the various items under analysis, such as different inventors, different examiners, different law firms, and so forth. As shown in the example therein, the phrase was first used in approximately 1999 and has gone on to be used many times over the years. In this chart showing the accumulation of assets by the top ten owners, by 2011, nearly 175 assets contain that phrase. Another option available to the user is to examine all of the owner records rather than just cycling through the various owner items. In this case, the results would show that the phrase was first used in 1998 with three patent applications including that phrase and by 2011, 425 of the publicly available patents and patent applications contained that phrase.

Figure 11:
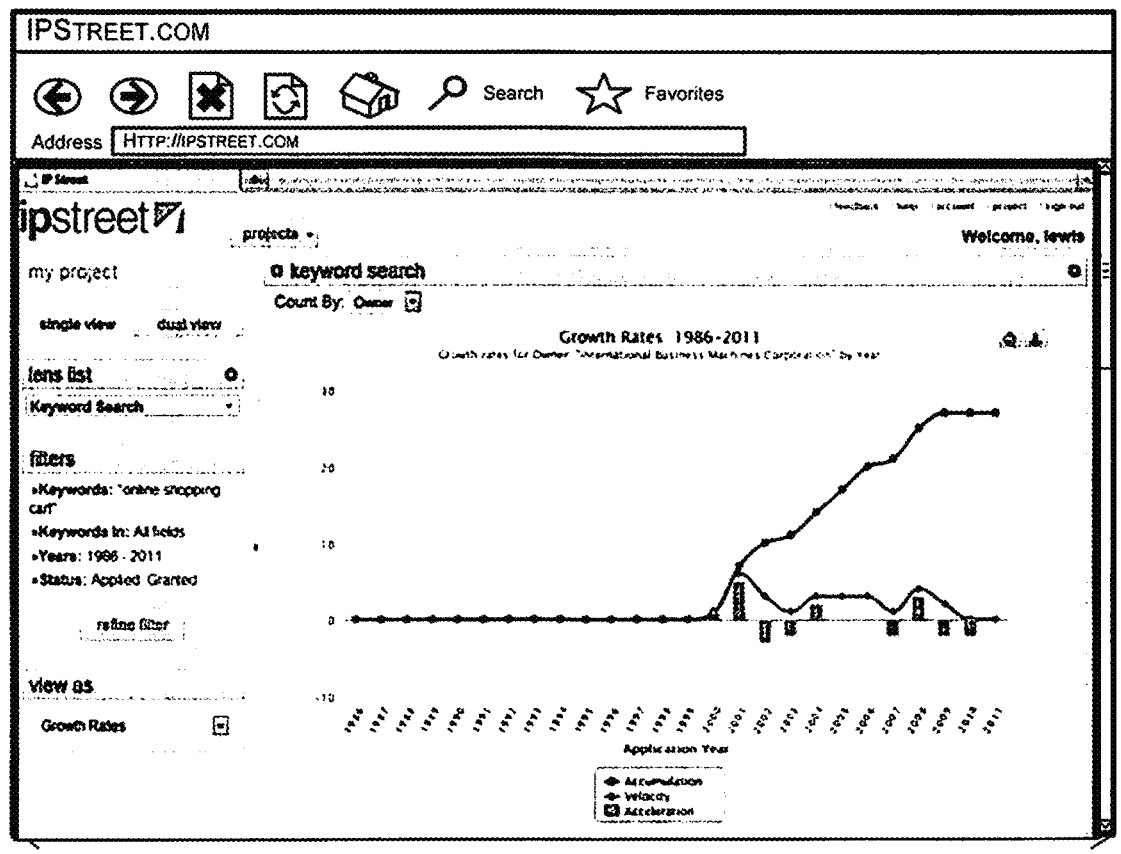
FIG. 11 illustrates a results screen from keyword search showing data presented in a growth rate trend that illustrates accumulation, velocity and acceleration components in the construction of a patent portfolio.
Figure 11:

FIG. 11 shows a screen rendering 1100 that is presented in response to the user selecting to view the results according to growth rates. Upon user selection of this view, the growth rate analysis module 216 (FIG. 2) computes velocity and acceleration metrics associated with the patents and patent applications that contain the keyword phrase "online shopping cart". In this illustrative example, a blue line (designated by circles) represents the accumulation of the top owner, which in this case is IBM®, along with the velocity and acceleration rates associated with accumulating IBM's portfolio of patents and patent applications as defined as having the key phrase, Thus, we can learn from this view that IBM has approximately 27 patents and patent applications that have been accumulated since 2000 with bursts of activity happening in 2001, 2004 and 2008. The red line (designated by diamonds) on the chart illustrates the filing velocity, which represents the number of patents filed year over year. The green bars illustrate the acceleration or deceleration of filings in a year over year. The time periods are an implementation detail and may be configured on shorter time periods or longer time periods.

Returning to FIG. 3, the user has the option to select the statistics lens underneath the "measure" category on the lens list. In response to this selection, the user is once again permitted to define various search ranges in which to measure one or more assets.

Figure 12:
FIG. 12 illustrates a statistics screen that compares metrics of various patent portfolios.

FIG. 12 shows an example screen rendering 1200 that is presented in response to the user selecting the statistics lens on the lens menu of FIG. 3. In the left hand navigation area, the user is permitted to enter nearly any number of items for which to initiate a search. The user can enter a query of one or more keywords, one or more owner names, one or more inventor names, one or more law firm names, one or more examiner names, and/or one or more class/subclass IDs. In this example, the user was interested in exploring portfolios in the software Class 705. Upon entry of Class 705, the analysis module 112 (FIG. 2) computes many different metrics used to measure patent and applications whose primary classification is Class 705. In this illustration, the top five owners of patents in Class 705 are presented in a table. (IBM®, Microsoft®, Fujitsu®, Yahoo®, and American Express®). The portions of these companies' portfolios that are found in Class 705 are then measured according to various objective metrics. Among the metrics shown in FIG. 12 are revenue of the company, total employees of the company, a NAICS ID, and a NAICS description. These data items are retrieved from the corporate database 204 and used in this statistics analysis. In addition to this corporate data, data items from the patent database 204 are also extracted and used in various metric computations. An example shown here includes the total applications that the companies have in this particular class, the total number of granted patents that these companies have in this particular class, the average number of the granted patents in this class, the total number of unexpired granted patents in this class, the average age of unexpired granted patents, and patents that are expected to expire within a user-defined or system-defined time period (e.g., within next three years). Further metrics include whether or not this portion of the company's portfolio is growing over a user-defined or system-defined time period (e.g., the last five year trend) and whether its patent applications are growing over the user-defined or system-defined time period (e.g., the last five years). Metrics pertaining to the portfolio itself are also computed, such as the number of independent claims on average or the number of total claims on average that these companies' portfolios exhibit. As one example, IBM® is shown to have on average 3.4 independent claims per patent application or patent whose primary class is 705, and on average nearly 20 total claims. Other metrics might include average number of words in independent claims, the average number of words used in the entire patent, the average number of references cited by the patent application or patent, and so on. Other types of statistical metrics can also be generated from a combination of business data and patent data. The examples contained herein are not exhaustive.

The statistics lens is powerful and robust because portfolios of patents may be defined in any number of ways. For instance, the same metrics can be computed for various portfolios that contain the ongoing example keyword phrase of "online shopping cart". For example, users may enter two or more owners into the owner entry field and then further define that according to a particular class or according to a particular query and compare various metrics around that portion of their portfolio.

With reference again to FIG. 3, the user can also elect to open a patent portfolio lens under the compare category. Upon selection of this lens, the portfolio analysis module

214 presents a query entry area to allow the user to define what patent portfolio is of interest.

Figure 13:
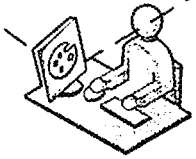
FIG. 13 illustrates a portfolio page showing a taxonomy-based portfolio view of a patent portfolio of a company or a particular technology area.

FIG. 13 illustrates a screen rendering 1300 that is presented in response to the user selecting the patent portfolio lens in the compare category. In the left hand navigation panel, the user is permitted to define the patent portfolio in terms of an owner or a particular technology area. In this example, the technology area is defined by the technology classification of the Patent and Trademark Office, for example. It is noted that this is just one example of inputs, and other entry fields may be used to define the patent portfolio.

Continuing with this example, suppose the user is interested in examining the patent portfolio of an intellectual property owner (in this example, Cree™, Inc.). The user enters the information of the intellectual property owner of interest, i.e., Cree™, Inc., into the owner entry field as a search query. Upon actuating the "go" button, the portfolio analysis module 214 may expand the search query to include additional information. By way of example and not limitation, the additional information may include, but is not limited to, common misspellings of the intellectual property owner, abbreviations of the intellectual property owner, divisions of the intellectual property owner, subsidiaries of the intellectual property owner, a parent entity of the intellectual property owner, acquisitions by the intellectual property owner, and/or alternative names of the intellectual property owner. The portfolio analysis module 214 can perform a search and/or present information of an intellectual property portfolio of the intellectual property owner based on the information of the intellectual property owner and the additional information. For example, the portfolio analysis module 214 computes the patent and application data that names Cree™, Inc. as the assignee. Screen rendering 1300 shows Cree's portfolio broken down by various classes. As shown in this example, Cree™ has 55% of its portfolio in the Active Solid State Device Class 257. The next largest technology class is 438, or Semiconductor Device Manufacturing, in which Cree™ has 13.9% of its portfolio. While the example illustrates use of the USPTO classification system for the taxonomy, other taxonomies may be used, including proprietary taxonomies that might be developed by Cree™ itself. In essence, this view shows a top level or first tier look at Cree's™ patent landscape. However, the user 106 may "drill down" and see a second tier of the patent landscape through use of this patent portfolio tool. In particular, the user 106 may identify a particular class of interest and enter that classification number into the classification entry field in the left hand panel. For example, suppose the user 106 is interested in the illumination technology currently in Class 362. The user may enter Class 362 into the classification entry field and then sort the results by subclass.

Figure 14:
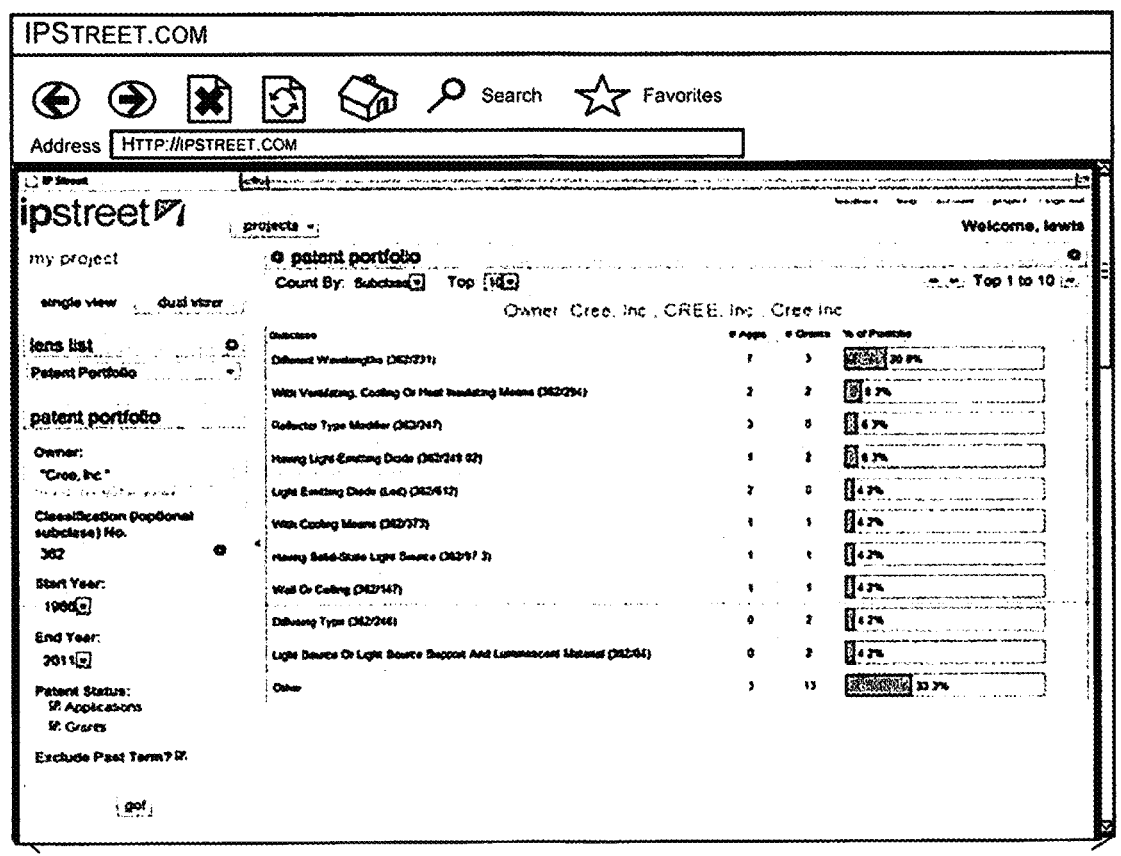
FIG. 14 shows a second tier of the taxonomy-based portfolio layout in which assets are grouped according to a secondary classification (e.g., subclass) beneath the primary classification shown in FIG. 13.
Figure 14:
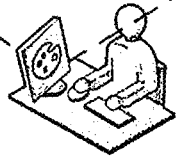

FIG. 14 shows a screen rendering 1400 that is presented in response to entry of a particular class and then sorting by a subclass to reveal a second level of a taxonomy-based landscape. In this example, Cree™ has ten assets in the class of "illumination" and subclass of "different wavelengths." Accordingly, through this patent portfolio lens, the user is able to get a high overview of the company's portfolio followed by the ability to "drill down" into portions of that portfolio for a more detailed or granular view. With multi-tier taxonomies, the patent portfolio lens allows users to drill as deep as desired.

With reference again to FIG. 3, the user can also elect to open the inventor's lens from the "connect" category. In response to this selection, the analysis module presents a query entry field for the user to define a collection of assets across which to analyze key inventors.

Figure 15:
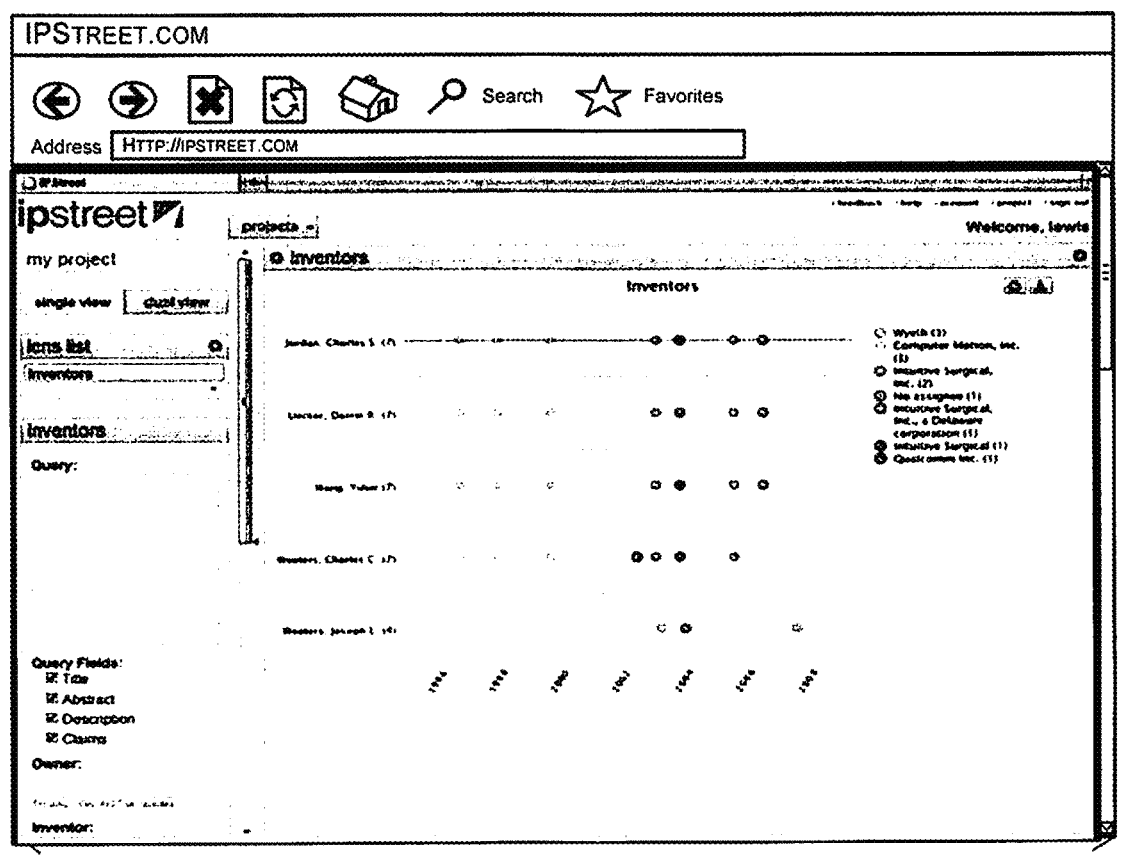
FIG. 15 shows an inventor screen in which certain inventors (e.g., historically most prolific for a company/class/subclass, increased recent activity trend, most recent inventors for company/class/subclass, first time inventors for company/class/subclass, etc.) and their associated patents for a particular query are illustrated. The patents may be designated (e.g., color-coded, shaded, sized, shaped, etc.) to identify assignee and are arranged along a time axis to show when the assets were originally sought.
Figure 15:
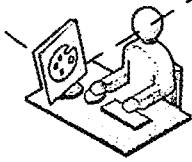

FIG. 15 illustrates a screen rendering 1500 that is presented in response to user selection of the inventor lens in the project menu 300 of FIG. 3. The user enters a query, such as an owner name, an inventor name, or any number of parameters to narrow a selection of assets from which key inventors can be analyzed. In response to the user input, the analysis module computes the records to identify the top inventors in those records and then presents a view in which inventors are organized along a Y axis and a timeline is arranged along an X axis. Each asset associated with a particular inventor is then plotted to show the entire inventive history of that inventor. In this example, the inventor Charles S. Jordan is shown to have seven patents and/or applications with the first application being filed in 1996 and the last one being filed sometime around 2007. Each circle associated with an inventor represents a patent or patent application. Each circle is visually coded (e.g., color-coded or pattern-coded, etc.) to identify a corresponding assignee for that particular patent or patent application. In some implementations, the size of each circle may also be adjusted based on the scope of the broadest claim of that particular patent or patent application as determined by the claim scope engine 220, for example. By arranging the assets according to timeline, a user 106 can also glean intelligence as to whether any of these inventors have worked together across these inventions. For instance, it appears that the inventors Charles S. Jordan, Darrin R. Uecker, Yulun Wang, and Charles C. Wooters were all named on a number of patents as co-inventors, as evidenced by the same assets being vertically arranged at the same time. The inventor lens may be used for a number of different scenarios, including being able to identify other people for potential collaboration, for due diligence in many situations, or even for recruiting purposes.

The user can also elect other lenses in the "discovery" category. For instance, the user can elect the concept scatter plot or concept search lenses to conduct concept searches of the patent and business data.

FIG. 16 shows a screen rendering 1600 that is presented in response to the user selecting a concept scatter plot search lens from the lens menu in FIG. 3. Upon selection of concept scatter plot, the user is prompted to enter a concept into the query space. As opposed to entering one or more keywords, the user is allowed to enter a much more detailed explanation of a concept. In fact, the user may be encouraged to enter an entire paragraph or page or more of content in order to define the concept of interest. In this example, a short paragraph of multiple sentences is entered into the query space. Once the query is entered, the user actuates the "go" button or other control to initiate the concept search engine to query the database based on the input concept.

The concept results page 1600 illustrates the result of this concept search. Individual symbols or graphics of a same or different color may be used to identify individual patents and/or applications. As an example shown in FIG. 16, orange diamonds are used to represent corresponding patent applications and blue squares are used to represent granted patents. These assets are distributed in a two dimensional plot having relevance along the Y axis and filing date along the X axis. The concept search engine returns a relevance score used in this visualization. In one particular implementation in which an LSI-based concept search engine is used, the relevancy scores are between 0 and 1 with 1 representing 100% relevance and 0 representing no relevance. The number of results returned is a user configurable parameter.

The user 106 can also point (using a mouse or finger, for example) over various items in the plot to view individual documents. (See FIG. 30) As before, each item is itself actionable, and upon selection by the user 106 will present the corresponding patent document. In addition, the concept scatter lens includes a local menu in the upper left hand corner of the results panel which may be used to pivot some of the data. In this example, the user 106 can identify the top owners of the patents and/or patent applications that were returned identify what classifications most of these assets are classified in, or view a full list of all the patents and/or patent applications that were returned by the concept search engine. Assume for discussion purposes that the user 106 would like to see what other companies are interested in this technology by selecting the ownership link.

Figure 17:
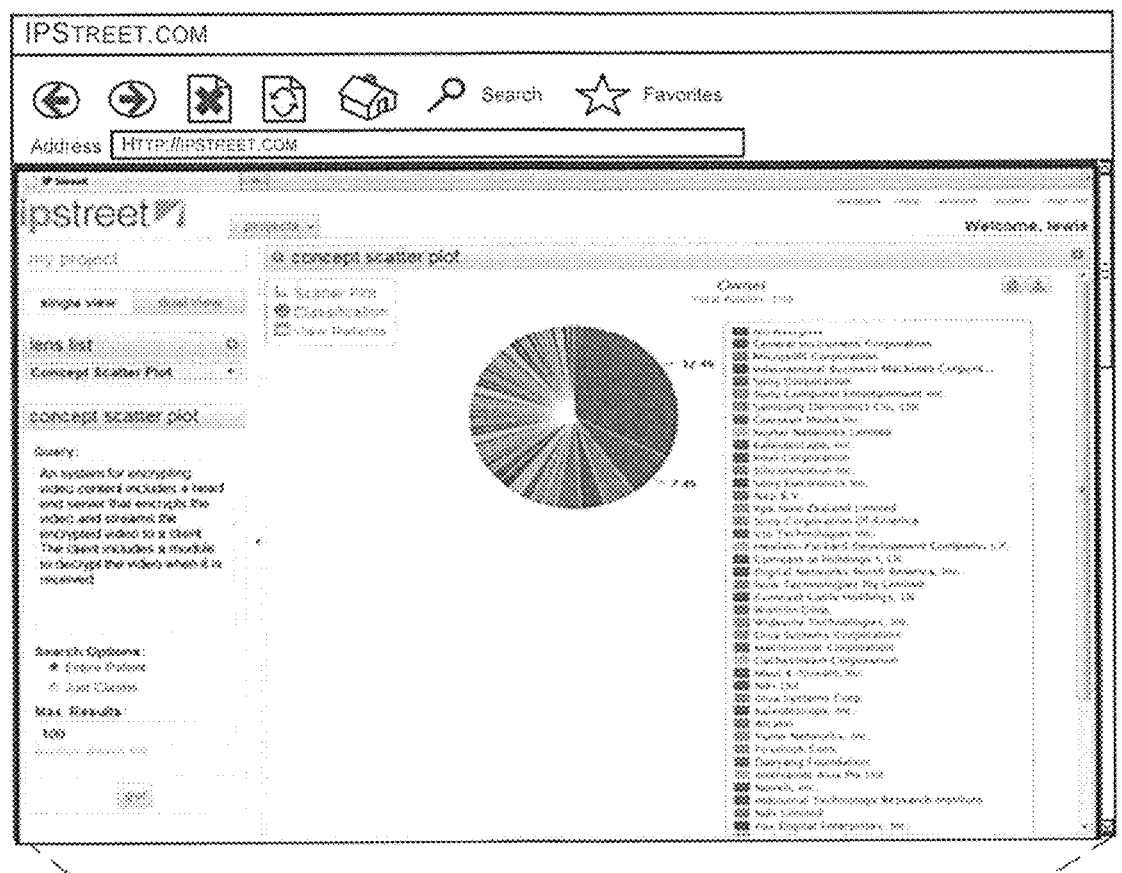
FIG. 17 illustrates a pivot screen that is achieved by choosing an option on a localized menu of the concept search result screen of FIG. 16. In this example, a distribution of owners of the results is shown as a pie graph.
Figure 17:
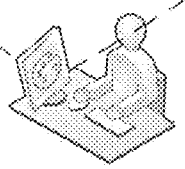

FIG. 17 shows a screen rendering 1700 that is presented in response to the user 106 selection of the ownership link in the concept search results panel wherein a list of owners is presented in a graphical form (e.g., a pie chart image, a bar chart image, etc.) to identify the top owners of the assets returned in this concept search.

Returning to FIG. 16, the user 106 may elect to view any number of these items by selecting the particular symbol or graphics. Upon selection of that symbol or graphics, the underlying asset will be presented.

Figure 18:
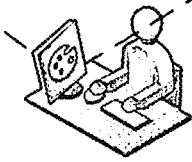
FIG. 18 illustrates a view patent screen in which individual patents or applications may be viewed.

FIG. 18 shows a screen rendering 1800 which is presented in response to user 106 selection of a particular symbol or graphics in the concept plot of FIG. 16. In this illustration, the application number, date of patent, title, abstract, and inventors are shown. The user can scroll down to see the entire patent application. In addition, a "view patent image" user interface button is provided that enables the user 106 to view the patent as issued and printed by the U.S. Patent and Trademark Office or the patent application. Also, a "View Patent DNA" user interface button is also provided to enable a user 106 to view quality assessments of the illustrated patent or the patent application. Suppose, for example, the user selects the "view patent DNA" user interface button.

Figure 19:
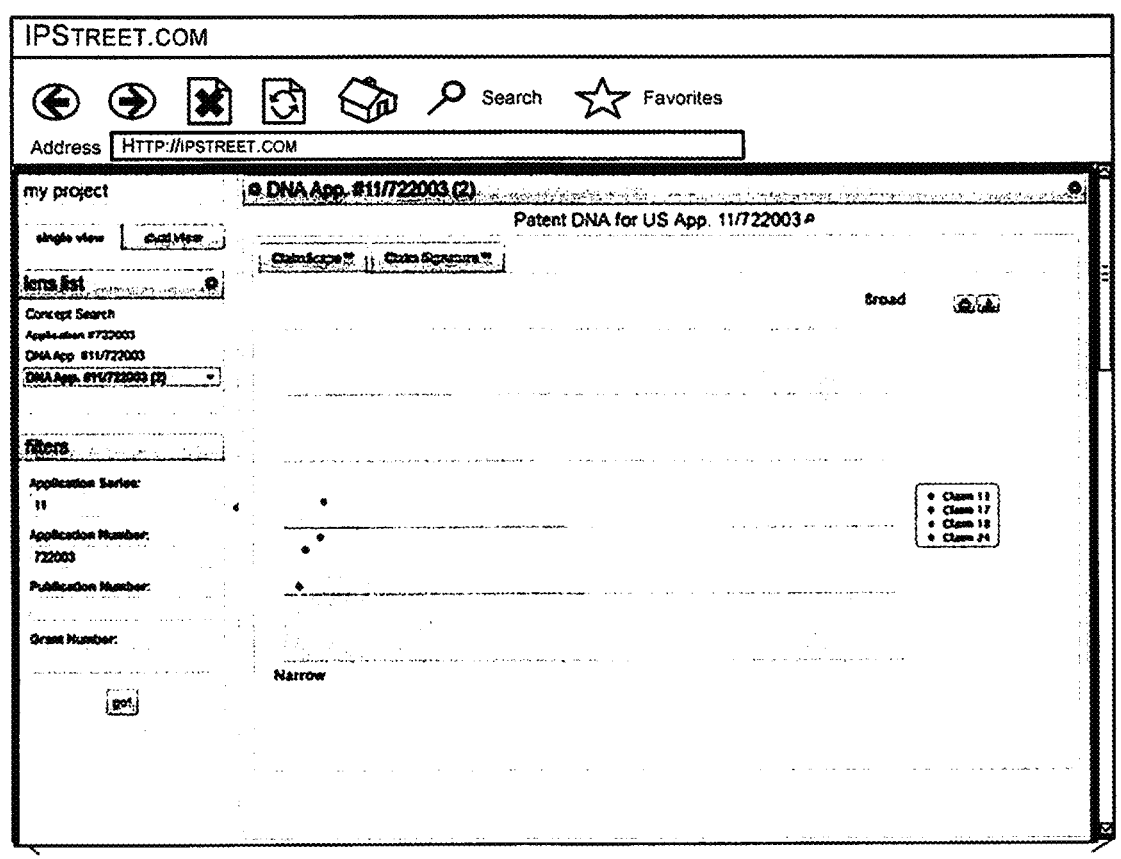
FIG. 19 illustrates a patent DNA screen in which graphical depictions of individual claim signatures and claim landscapes may be presented.

FIG. 19 shows a screen rendering 1900 which is presented in response to user selection of the "view patent DNA" user interface button of FIG. 18. This screen includes a graphical depiction of individual claims of the patent or patent application as selected relative to other claims in a collection (e.g., a common technology area, classification, set of search results, etc.). The screen rendering 1900 shows a two dimensional graphic that is referred to as the ClaimScape™. In this view, the four independent claims of the patent application Ser. No. 11/722,003 are plotted in a two dimensional graph in which claims that are comparatively narrower than other claims would align closer towards the lower left corner or origin and claims which are comparatively broader than its peers, and their peers are shown in the upper right hand corner of the chart. The ClaimScape™ view of rendering 1900 is plotted based on values returned by the claim scope engine shown above in FIG. 2. Namely, each individual independent claim is assessed using statistical analysis and algorithms that examine and ascertain the relative scope of the individual independent claims relative to all other claims against which they are being assessed. In one particular implementation, these four claims are being assessed relative to all the other claims that show up in the primary class to which the patent application is classified. In this example, the application Ser. No. 11/722,003 is assigned to the U.S. Class 380 (Cryptography). Accordingly, the four claims, as represented by four dots in the chart, are assessed relative to all other independent claims of all other patents in Class 380. In other implementations, the grouping of patents against which these claims are compared may be based upon international codes, such as IPC classification codes, or subclasses, or essentially any collection of patent documents. More relevant results are obtained when the patents to which the claims are being compared are generally within the same technology areas.

The ClaimScape™ image plots claims according to two vectors along the x and y axes. These vectors are based on assumptions that are generally accepted by the patent community. The first assumption is that, generally speaking, claims that use fewer unique words tend to be broader than claims that use more unique words. More plainly, shorter claims tend to be broader than longer claims. The second vector is based on the assumption that claims that use more commonly used words in a particular class or collection of technology tend to be broader than claims that use less commonly used words. By mapping based on these two underlying assumptions, even shorter claims may be ranked not quite as broad if they use terms that are considered limiting or distinctive within a class in which the ontology is well developed. The claim scope engine computes values for each of the independent claims based on the number of unique words found in each claim, and how frequently those words happen to appear in all the claims in all the collection of patents to which they are being assessed (e.g., a single class). More specifically, the architecture stores all of the patents claims in every patent throughout the database 204 and computes for each of those patents a total word count for each claim, a total count of unique words used in each claim, the number of times each of those words appears in the collection of patents to which the claims are being assessed (e.g., a class of patents), and may use word stems or bigrams or trigrams or other ways to evaluate individual words or phrases of the claims. The claim scope engine 220 computes these vectors based on functions of unique words and frequencies of those words found across all claims and within individual claims to develop coordinate values in which to plot these dots on the ClaimScape™ view.

Various bands are added to graphically show how the individual claims compare across the entire collection of claims. In one example, the bands may be color coded. In one implementation, each band might represent a particular quartile of scope in which claims lying closer to the origin or the narrower part tend to be in the lower (labeled "Low" in the figure) quartile and claims falling in the outer band closer to broad category label are in the upper (labeled "Top" in the figure) quartile. Claims falling between the lower and upper quartiles are illustrated in the band labeled "Mid" in the figure. There are many other ways to graphically illustrate this, however.

Each point on the ClaimScape™ graph may also have an associated distance from the origin. This distance value is based on the x and y components using a conventional Pythagorean theorem for right triangle computation. In this manner, each independent claim in every patent within a collection of patents such as all patents in a particular class, have an associated distance value. This enables the system to rank order patents relative to one another in terms of claim scope or breadth. Hence, other user interface representations previously discussed may use this distance value to alter the appearances or to provide another factor in which to sort or rank the patents and applications according to claim breadth.

As noted above, each point on the ClaimScape™ graph of rendering 1900 represents an associated independent claim. A legend is shown to the right of the plot to identify which independent claims are being depicted. The user can select (e.g., hover over) any individual claim point to see part or all of the claim.

Figure 20:
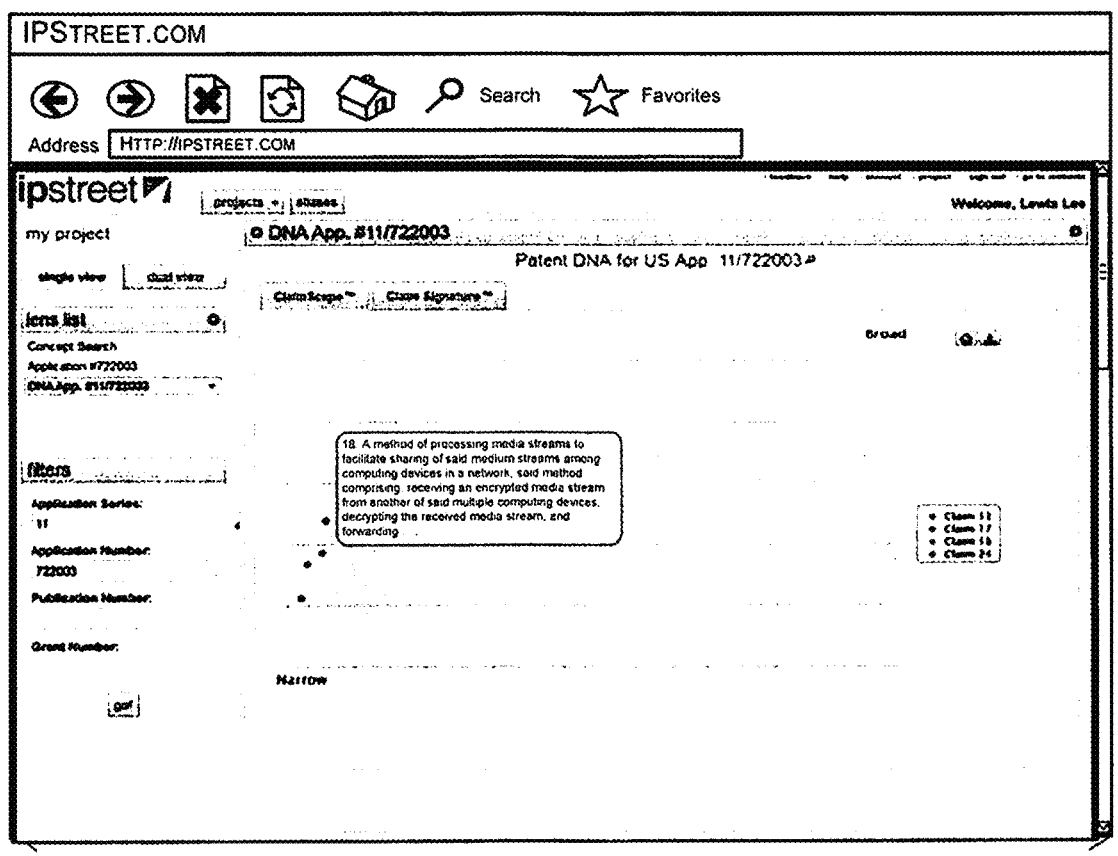
FIG. 20 illustrates the claim landscape pane of FIG. 19, with an additional information (e.g., pop-up box, window, etc.) that appears when a user soft-selects (e.g., hovers a pointer over) a mark identifying a claim. The additional information contains all or part of the claim represented by the mark on the graph.
Figure 20:
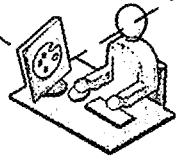

FIG. 20 shows a screen rendering 2000 in which the user has selected (e.g., hovered a pointer above) a particular dot on the ClaimScape™. In response, a graphical pane appears on the screen and contains all or part of the claim language for that claim.

Figure 21:
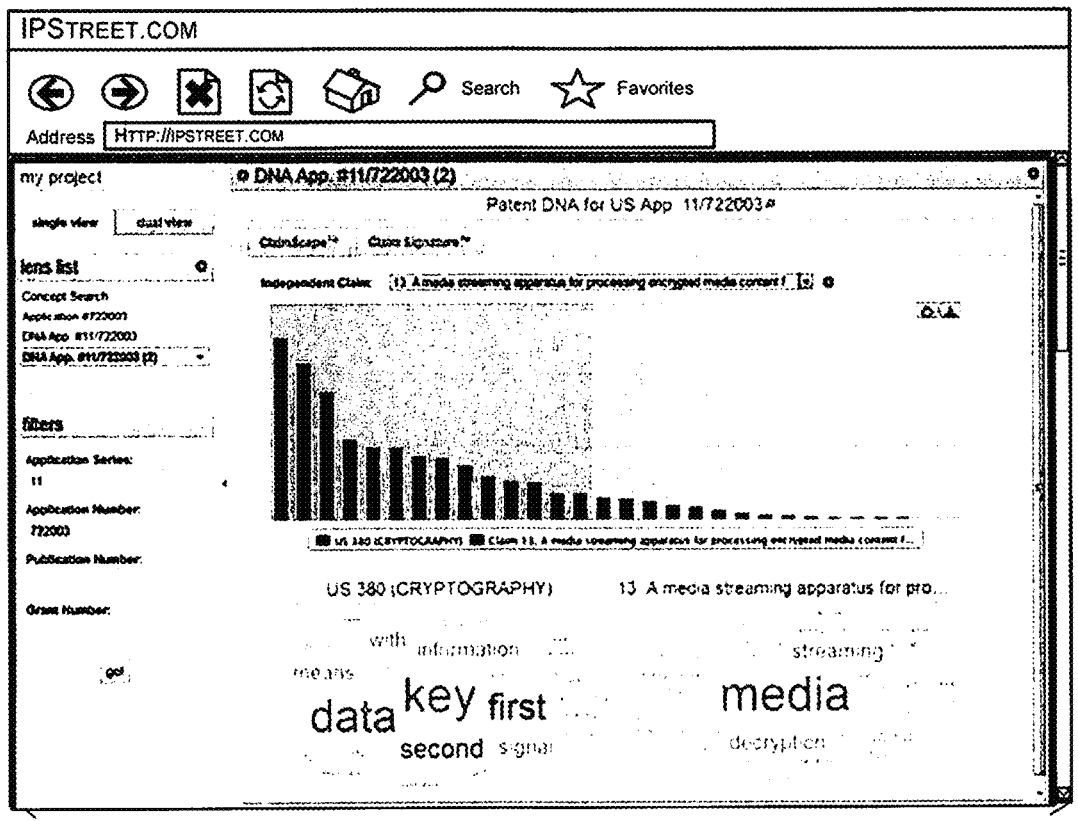
FIG. 21 shows a claim signature pane of the patent DNA screen, in which words and/or phrases that are unique to individual claims of a patent or application are graphically represented.
Figure 21:

FIG. 21 shows a screen rendering 2100 which is presented in response to user selection of the Claim Signature" tab in FIGS. 19 and 20. In this screen rendering, there are three panels or areas of the display area that show various metric features used in deriving a claim signature. The graphical outputs shown in screen rendering 2100 are provided or generated by the claim signature engine 222 of FIG. 2. The first pane in this Claim Signature™ view is a histogram or distribution of words found in the claim itself. In this example each word in the claim is represented by a bar, where each bar is scaled or sized according to the number of times the word appears in the entire set of claims, such as all the claims in a particular U.S. Classification. In this manner, the more commonly found words in a particular class or collection of patents is shown to the left and less commonly used words in that particular technology class are shown to the right. In one example, color coding, pattern coding or other visual coding may be used to show different sectors. For example, darker color codes along the left may be used to imply that those words are found in the most common quartile of words in that class, whereas a lighter color quartile out towards the right may be used to represent the least commonly found words. The particular claim to which those words pertain is shown above the graph. A pull-down menu or other control allows the user to select any one of the independent claims within that particular patent or application.

Figure 22:
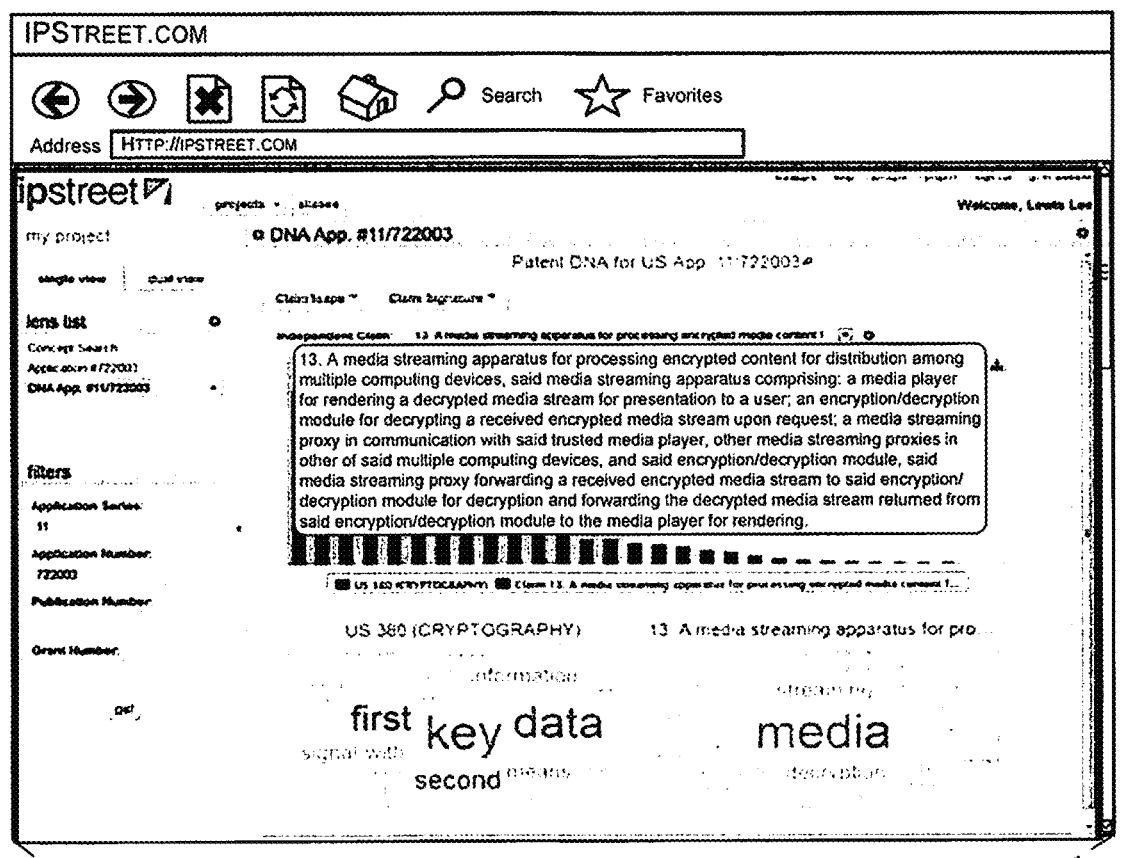
FIG. 22 illustrates the claim signature pane of FIG. 21, with additional information (e.g., pop-up box, window, etc.) that contains all or part of the represented claim.
Figure 22:
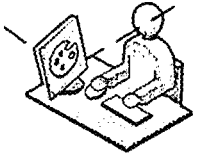

FIG. 22 illustrates an example screen rendering 2200 in which the user has selected (e.g., hovered over) an icon adjacent to the pull-down menu to illustrate the claim that is being considered in this graph. This allows the user to see specifically what words are in the claim and how the words are arranged. The user may select any one of the independent claims from this application and identify and review each of the claim words and the claim structures that are different for each claim.

Beneath the distribution plot are two panes that include word clouds. The left hand word cloud shows words that are commonly found in the entire collection of claims, such as all the most commonly found words in a class of patents. The right hand word cloud shows the words that are most frequently used within this particular claim. In this example, the word "media" is the most frequently used word in this claim. In other implementations, the right hand word cloud may also show an inverse word cloud wherein the most uncommon word or the one found the farthest to the right in the distribution actually appears as the largest word in the word cloud.

The distribution represents a unique signature in which this collection of words from the class is uniquely assembled to form a unique claim. Searches may be performed to find other claims that are relevant to this claim by looking at slight variations in the words used. This is yet a separate form of search across patent documents independent of keyword search and concept search. The less commonly used words out toward the right hand side of the distribution tend to be correlated to words that give each claim its distinctiveness and hence its novelty or patentability. Accordingly, understanding which words those are provides some meaning to the practitioner or user who is interested in better understanding why this particular claim may have been allowed.

Figure 23:
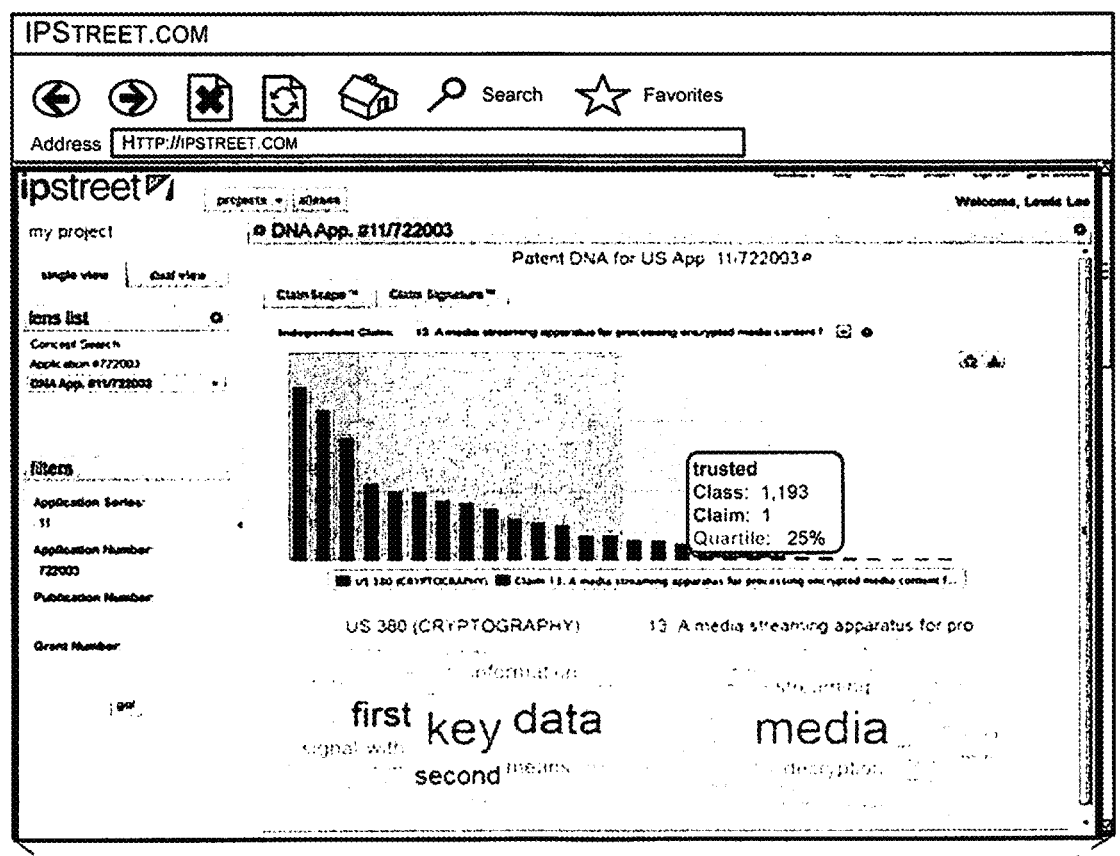
FIG. 23 illustrates the claim signature pane of FIG. 21, with additional information (e.g., pop-up box, window, etc.) that shows word/phrase statistics for the word/phrase used in the represented claim.
Figure 23:
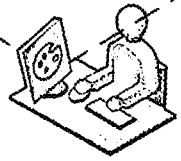

FIG. 23 shows a screen rendering 2300 in which the user has selected (e.g., hovered or pointed over) one of the bars on the distribution curve to look at a unique word. In this particular case, the user has hovered over the first bar in the first quartile to reveal that the word "trusted" is found in this particular claim 13. Upon hovering the associated bar in the bar graph chart, a pane is presented to show that the word "trusted" occurs 1,193 times in the class and one time in this particular claim. The user may move along the claim signature identifying an associated word with each bar and how frequently that word is found in the class and in the particular claim.

Figure 24:
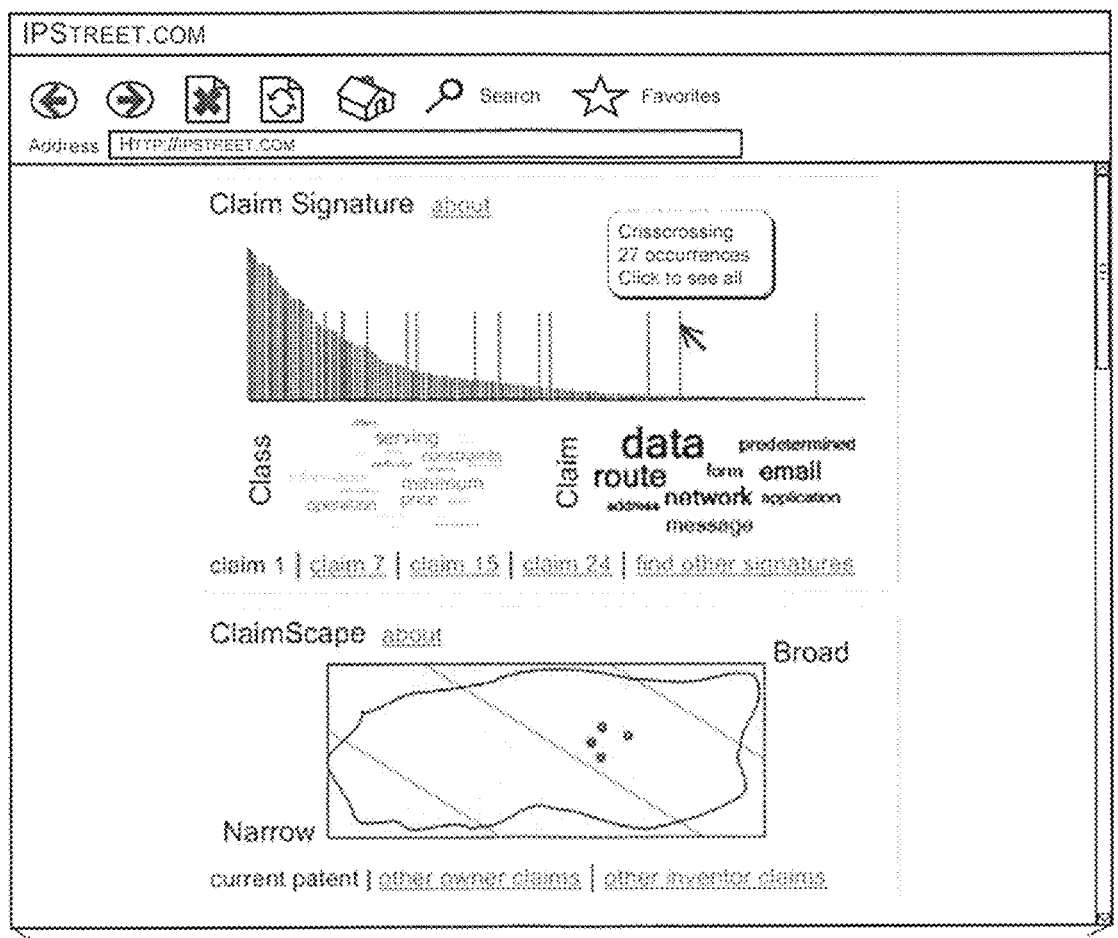
FIG. 24 illustrates another implementation of the patent DNA screen having graphical depictions of individual claim signatures and claim landscapes.
Figure 24:
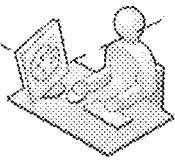

FIG. 24 shows a screen rendering 2400 of another illustration of the ClaimScape™ and Claim Signature™. Of particular interest, Claim Signature™ shows a word distribution of a class where each individual vertical dark line shows relative frequency of each word potentially appearing in that class. This type of word distribution of a particular class (such as a classification of a taxonomy, for example) is determined based on a corpus of patents and/or patent applications selected for that particular class, for example, claims of patents and/or patent applications that are classified to belong to that class. Additionally, this corpus of patents and/or patent applications may be collected or found using any selection method as described in the foregoing implementations, such as selecting patents and/or patent applications that are filed or published within a predetermined period of time (e.g., between Jan. 1, 1990 and Jan. 1, 2010, etc.) in that particular class, selecting patents and/or patent applications that are owned by one or more intellectual property owners in that particular class, and/or selecting patents and/or patent applications that are returned by the search engines 110 based on one or more keywords or concepts, etc. In some implementations, the selected corpus of patents and/or patent applications for the class may be fixed, regularly updated after a predetermined time interval, or continuously evolved as new patents and/or patent applications are found. Furthermore, the word distribution of a particular class may be determined in advance or on the fly when the user wants to determine a claim signature of a claim that is within the particular class. A second vertical mark, shown in red (the vertical lines having uniform height in FIG. 24) for example, identifies each word used in a particular claim. Alternatively, the second vertical mark may have a height depending on a respective occurrence frequency of the word in that particular claim. In this way, the claim word marks of the particular claim appear to be similar to a barcode (having a uniform height or varying heights for its vertical marks) in which the claim word marks are spaced according to how the actual words are used in the claims of the corpus of patents and/or patent applications used or collected for that class. In this example implementation, relevancy of a first claim with respect to a second claim is computed or determined based on correlation between respective barcodes of these two claims in this example representation of claim signature. This is a slightly different representation than the one in FIG. 21 in which only the bars for the words which are commonly in the class and in the claim are shown, and the difference of the red marks (i.e., those having uniform height).

Figure 25:
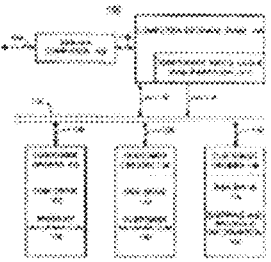
Figure 25:
Figure 25:
Figure 25:
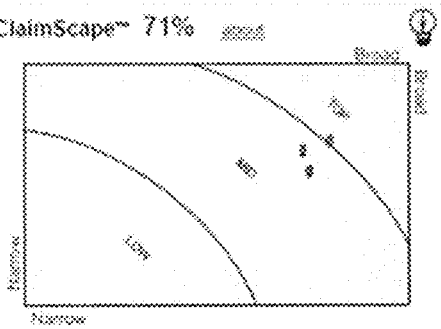
Figure 25:
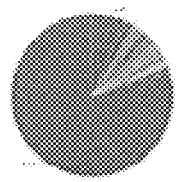
Figure 25:
Figure 25:
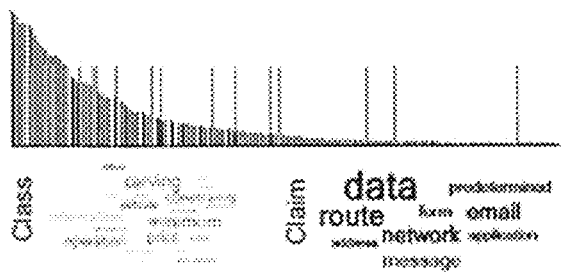
Figure 25:
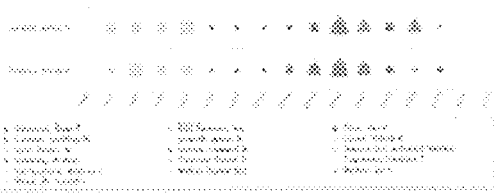
Figure 25:
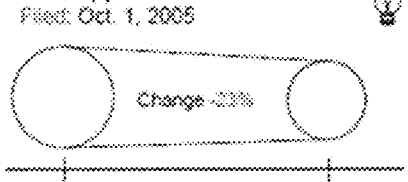

FIG. 25 shows a graphical sheet presented on a computer display or perhaps printed on paper that contains several of the images and graphs discussed in this document. This output, identified by the name IP Street Sheet™, shows a collection of analysis tools pertaining to common input, such as an individual patent or application. In other implementations, the common input might be an owner, inventor, examiner, law firm, or the like.

When presented on a graphical display, each component shown in this display is fully interactive, allowing the user 106 to select, move and pursue other links therein. A title is shown at the top of the output. Adjacent to the title is a metric indicator consisting of five "light bulbs". Each light bulb is associated with a quality metric somewhere on the output. Each light bulb may be on, half on, or off, thereby enabling 125 grading variations. The patent is deemed of increasingly higher value as more light bulbs are turned "on". On the left hand side is a space for the abstract of the associated patent or application. Along with that abstract is a potential figure that provides a high level summary of the asset. Within that space, there is also a window for statistics of the patent or application. These statistics are any number of metrics that can be found and generated by the statistics engine described and discussed above. Beneath the light bulbs metric is a freshness indicator which identifies when the data was first output and when it should be refreshed. Since new patents are granted and new applications are filed every week, the metrics become stale over time. The freshness indicator is based, on filing rates within a particular class. Beneath the abstract is a portfolio view of the owner of this patent and where this patent lies in that portfolio. The owner of the asset, if known, is shown and the full or relevant portion of the owner's portfolio is shown. The position of the asset (patent or application) within the owner's portfolio is also provided. Beneath the owner portfolio is a technology sector output that provides the relative placement of the patent or application within the class or subclass. It also provides the top ten owners of patents/applications in that relevant class. At the bottom left of the output is the inventor information where the inventors identified on the particular patent or application are listed and a visual graph of all of the inventor's patents/applications are plotted along a timeline with identification of the owners of those patents/applications. Along the right hand side are three outputs including the ClaimScape™, the Claim Signature™, and the file wrapper delta. The ClaimScape™ and Claim Signature™ have been described above. The file wrapper delta is another output which measures the change in claim scope as a result of prosecuting the patent from the time it was filed to the time it was issued. The scope change is a function of the ClaimScape™ metric. That is, the claims of the application, if available, are processed by the claim scope engine 220 with the broadest claim being identified. The independent claims of the granted patent are also processed by the claim scope engine 222 to identify the broadest claim. The variation from the broadest published claim to the broadest granted claim is then calculated and visually depicted to show a change in scope. The filing dates and issue dates are also provided to give the user 106 an idea of how long it took to prosecute that case.

Illustrative Scenarios

With reference again to FIG. 2, the IP-based business intelligence service 102 also supports various scenario wizards that allow users 106 with little or no IP experience to glean business intelligence from the underlying patent documents. A variety of scenario wizards are illustrated in FIG. 2 along with a brief description of each of those.

The claim language evolution wizard 228 allows a user 106 to identify how claim language has evolved over time. If a user 106 is interested in identifying when the phrase "online shopping cart" was first used in a claim, the user 106 can enter that query into the keyword search 122 and then view the results according to the keyword relevance plot. This will show when the phrase was first introduced and all subsequent uses of that phrase over time. It is noted that other views may be used, but one advantage to the relevance scatter plot is that the user 106 can quickly see whether that phrase became more commonplace over time. For instance, the phrase "online shopping cart" was first introduced in 1998 and was used sparingly in the first several years. Thereafter, as that phrase became more commonplace, more and more claims were shown to have that.

The taxonomy-based landscape scenarios 230 leverages the patent portfolio lens to enable users 106 to see multi-level views of a patent landscape, For instance, with this scenario wizard 230, a user 106 can enter a company name and be able to see multiple levels of its landscape. As shown above with respect to FIGS. 13 and 14, a user 106 can enter the corporate name "Cree" and be presented with multiple levels of landscape analysis in and around the portfolio assigned to Cree™.

The freedom to operate scenario wizard 230 leverages the power of the concept search engine 120 to evaluate whether or not a product idea would be at some risk of infringing other people's rights. The user 106 opens a concept search lens (FIG. 3), and enters a description of the product that is to be released. The description may be as general or detailed as the user 106 desires. Once entered, the concept search engine 120 evaluates the concept contained in that product description against the claims of all the patents in the entire patent database 204. The user 106 may then view the patents returned in this result to determine whether or not there is some exposure to infringement if this product were to release. In other implementations, the user 106 may choose to refine their description of the product in an effort to continue to design the product in ways that might avoid infringement in the future.

A validity analysis scenario wizard 234 is also provided to enable users 106 to perform validity screening by leveraging the concept search 120 to examine all patents that may be relevant to the validity of one or more claims. With this wizard 234, the user 106 is prompted to enter a claim of a particular patent or patent application. The wizard 234 then extracts the full claim language, enters it into the concept search 120, and conducts a search across the entire patent document of all documents in the database that predate the earliest priority date associated with the subject patent. As a proxy, the priority date is assigned to the filing date, but the user 106 may adjust that. The results returned are all patents that predate the priority date and are deemed relevant to the concept cited in the particular claim of interest. From this, the user 106 may determine whether or not that claim is likely to be held valid or invalid.

The find a licensee wizard 236 leverages the keyword 122 or concept 120 search engines to identify other companies or people who are interested in the particular technology space of interest. Upon conducting a search, the results are pivoted according to ownership to identify potential candidates that may have interest. Both concept 120 and keyword 122 searches may be used to provide more robust results in order to get a short list of potential inventors and/or companies that are participating in this particular space.

Results are also be compared to results from the growth rate analysis 216 to see whether or not any of these companies are recently accelerating their filings in a particular space. Upon finding owners or assignees that (1) have bona fide interest in this area, and (2) tend to be accelerating filings in this area, this provides a good list of potential licensees who may be interested in the user's 106 patent or patent application.

Exemplary Methods

Figure 26:
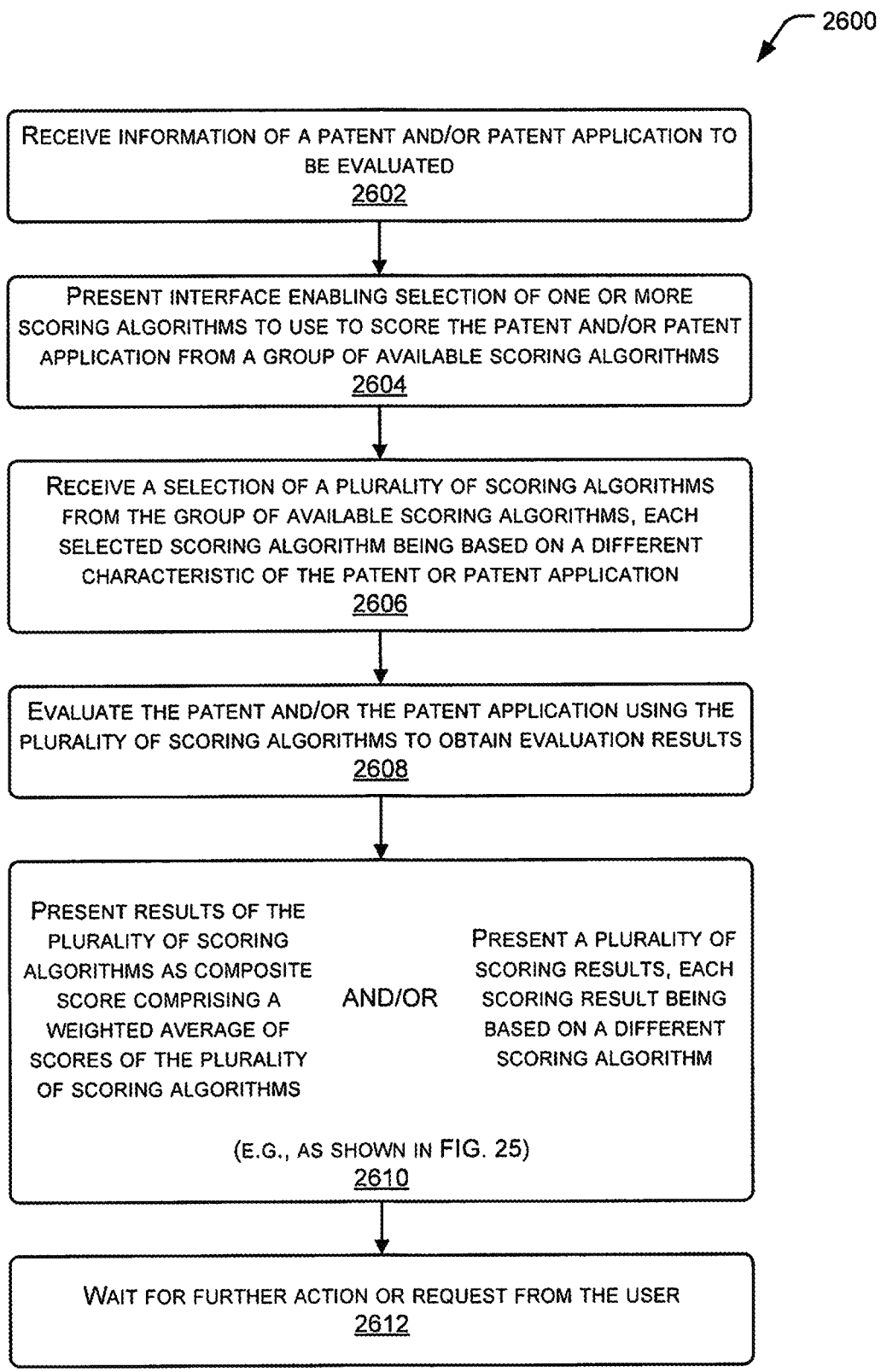
FIG. 26 is a flowchart showing an example method of evaluating a patent and/or a patent application using a plurality of scoring algorithms.
Figure 27:
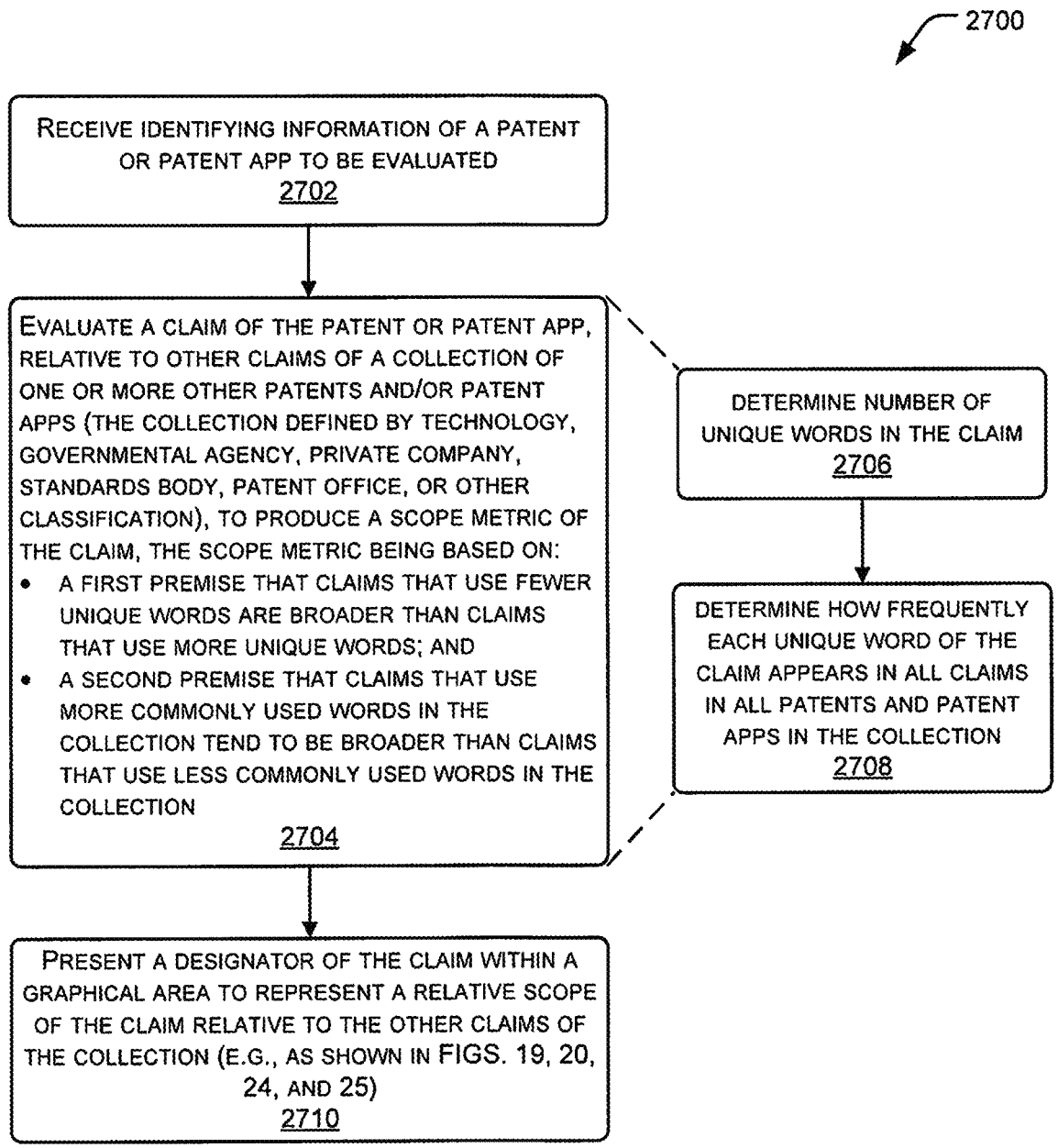
FIG. 27 is a flowchart showing an example method of determining a scope metric of a claim of a patent or a patent application.
Figure 28:
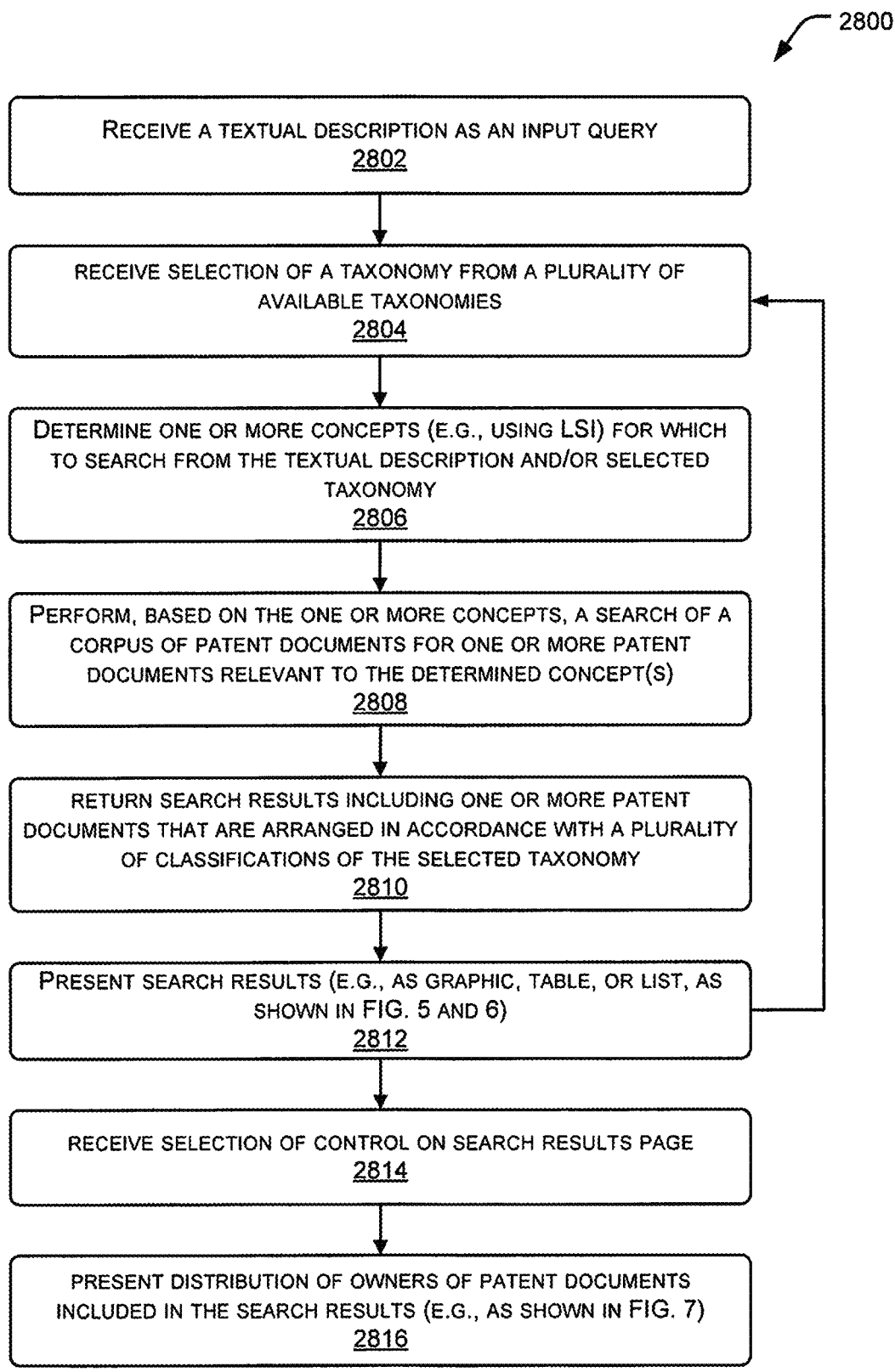
FIG. 28 is a flowchart showing an example method of performing a concept search for patents and/or patent applications based on a taxonomy selected from multiple available taxonomies.
Figure 29:
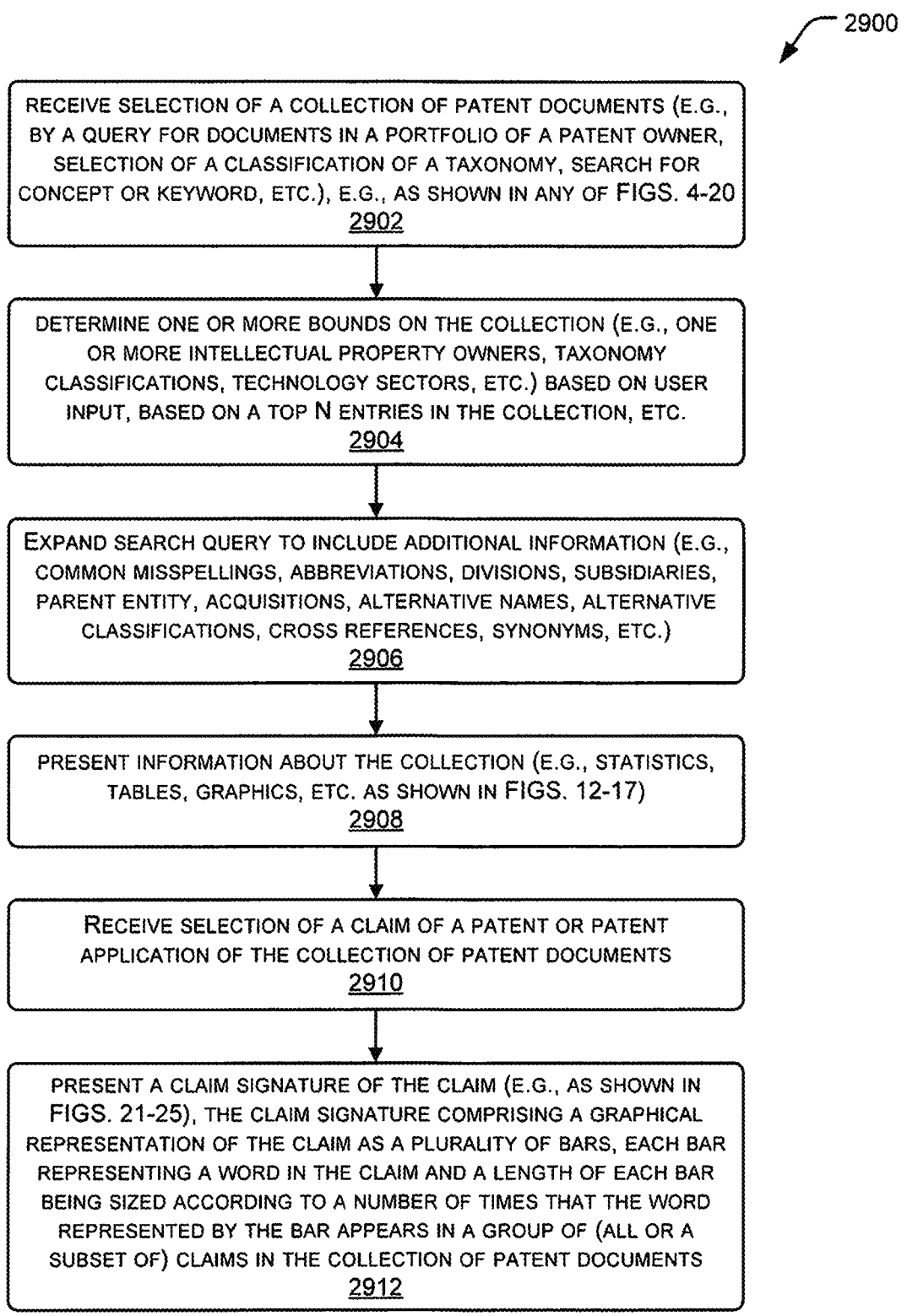
FIG. 29 is a flowchart showing an example method of determining and analyzing a patent portfolio of a patent owner or assignee.

FIG. 26 is a flowchart depicting an example method 2600 of evaluating a patent and/or a patent application or other IP asset, using a plurality of scoring algorithms. FIG. 27 is a flowchart depicting an example method 2700 of determining a scope metric of a claim of a patent or a patent application. FIG. 28 is a flowchart depicting an example method 2800 of performing a concept search 120 for patents and/or patent applications based on a taxonomy selected from multiple available taxonomies. FIG. 29 is a flowchart depicting an example method 2900 of determining and analyzing a patent portfolio of a patent owner or assignee. The methods of FIGS. 26-29 are, but need not, be implemented in the architecture of FIG. 1, using the system of FIG. 2, and represented in illustrative user interfaces and scenarios of FIGS. 3-25. For ease of explanation, methods 2600-2900 are described with reference to FIGS. 1-25. However, the methods 2600-2900 may also or alternatively be implemented in other environments and/or using other systems.

Methods 2600-2900 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices, 204.

The exemplary methods are illustrated as a collection of blocks in a logical flow graph representing a sequence of operations that can be implemented in hardware, software, firmware, or a combination thereof. The order in which the method blocks are described and claimed is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

In FIG. 26, at block 2602, the IP-based business intelligence service 102 receives information of a patent and/or a patent application from a user 106 for evaluating the patent and/or the patent application. The user 106 provides information about the patent and/or the patent application to the IP-based business intelligence service 102 through the patent DNA lens, for example. (FIG. 3). The user 106 provides identifying information such as an application number, a publication number or a patent number to the IP-based business intelligence service 102 for identifying the patent or patent application. Alternatively, the user 106 can select the patent or patent application to be evaluated from a list of one or more such documents presented to the user (e.g., as search results, as a portfolio of a patent owner, as documents in a classification of a taxonomy, etc.).

At block 2604, the IP-based business intelligence service 102 presents a user interface enabling the user to select one or more scoring algorithms to score the patent and/or patent application from a group of available scoring algorithms. The group of scoring algorithms includes, but is not limited to, a claim scope algorithm (as provided through the claim scope engine 220), a claim signature algorithm, a forward citation algorithm, a backward citation algorithm, a combination of forward and backward citation algorithm, a maintenance fee payment algorithm, a file wrapper history algorithm, etc. The user 106 selects one or more scoring algorithms to evaluate the patent and/or the patent application that are of interest to the user 106. Additionally or alternatively, the IP-based business intelligence service 102 selects at least two scoring algorithms as a default for evaluating the quality of any patent and/or patent application.

At block 2606, the IP-based business intelligence service 102 receives a selection of a plurality of scoring algorithms from the group of available scoring algorithms that are each based on a different characteristic of the patent or patent application.

At block 2608, the IP-based business intelligence service 102 evaluates the patent and/or the patent application using the selected scoring algorithms. At block 2610, the IP-based business intelligence service 102 presents the evaluation results of the selected scoring algorithms to the user 106 via a user interface, such as one of the illustrative user interfaces as described above. In further implementations, the IP-based business intelligence service 102 presents results of the plurality of scoring algorithms as composite score by, for example, taking a weighted average of scores of the plurality of scoring algorithms. The IP-based business intelligence service 102 may also present a plurality of scoring results, each scoring result being based on a different scoring algorithm (i.e., present four scoring results if four scoring algorithms were selected). FIG. 25 illustrates an example in which both a composite score as well as individual scores are presented.

At block 2612, the IP-based business intelligence service 102 allows the user 106 to select other scoring algorithms from the group of scoring algorithms. In response to receiving a user selection of a new set of scoring algorithms, the IP-based business intelligence service 102 will perform the evaluation of the quality of the patent or the patent application using the new set of scoring algorithms, and update or display the evaluation results (and/or the combined evaluation score) of the patent or the patent application via the user interface.

FIG. 27 is a flowchart depicting an example method 2700 of determining a scope metric of a claim of a patent or a patent application. At block 2702, the IP-based business intelligence service 102 receives identifying information of a patent and/or a patent application from a user 106 for which the user desires to evaluate a claim scope of the patent or patent application. For example, the user 106 may want to know the claim scope of a claim of the patent or the patent application as compared to other patents and/or patent applications of the same technological field. The IP-based business intelligence service 102 may receive identifying information (such as an application number, a publication number or a patent number) of the patent or patent application of interest to the user 106. The user 106 provides information of the patent and/or the patent application to the IP-based business intelligence service 102 through the patent DNA lens. (See FIG. 3). Alternatively, the user 106 may select the patent or patent application to be evaluated from a list of one or more such documents presented to the user (e.g., as search results, as a portfolio of a patent owner, as documents in a classification of a taxonomy, etc.).

At block 2704, upon receiving the identifying information of the patent or the patent application, the IP-based business intelligence service 102 evaluates the claim relative to other claims of a collection of one or more other patents and/or patent applications to produce a scope metric of the claim, such as the ClaimScape™ metrics shown in FIGS. 19, 20, 24, and 25. The collection of patents or patent applications may be defined by, for example, a portfolio of a patent owner, a classification of a taxonomy (e.g., public taxonomy such as a classification system of a patent office or governmental agency, a private taxonomy such as a taxonomy for a private company, a taxonomy set by a standards body or an industry, etc.), results of a search, or any other collection of patent documents. The scope metric may be based on a first premise that claims that use fewer unique words are broader than claims that use more unique words, and a second premise that claims that use more commonly used words in the collection tend to be broader than claims that use less commonly used words in the collection. More specifically, the IP-based business intelligence service 102 may evaluate the claim of the patent or patent application by, at block 2706, determining a number of unique words in the claim, and at block 2708, determining how frequently each unique word of the claim appears in all claims in all patents and patent applications in the collection.

At block 2710, upon determining the scope metric of the claim, the IP-based business intelligence service 102 presents the scope metric of the claim to the user 106 via a user interface. For example, the IP-based business intelligence service 102 presents a designator of the claim within a graphical area to represent the scope metric of the claim relative to scope metrics of the other claims as illustrated in FIGS. 19, 20, 24, and 25. For example, the IP-based business intelligence service 102 presents the designator of the claim within the graphical area on a two dimensional graph in which a first axis of the graph represents the first premise of the scoring algorithm and a second axis of the graph represents the second premise of the scoring algorithm.

FIG. 28 is a flowchart depicting an example method 2800 of performing a concept search for patents and/or patent applications based on a taxonomy selected from multiple available taxonomies. At block 2802, the IP-based business intelligence service 102 receives a textual description as an input query from the user 106. The input query may include textual description (e.g., a complete or incomplete sentence, a complete or incomplete paragraph, text of a claim, a product description, a document, etc.) of one or more concepts.

The IP-based business intelligence service 102, at block 2804, receives the selection of a taxonomy from a plurality of available taxonomies. The taxonomy may comprise a public taxonomy such as a classification system of a patent office or governmental agency, a private taxonomy such as a taxonomy for a private company, a taxonomy set by a standards body or an industry, or the like.

Upon receiving the textual description and/or selection of the taxonomy, at block 2806, the IP-based business intelligence service 102 determines one or more concepts for which to search based on the textual description and/or the selected taxonomy. In one implementation, the IP-based business intelligence service 102 may employ LSI technology to determine or identify the one or more concepts for which to search from the textual description.

At block 2808, the IP-based business intelligence service 102 performs a search of a corpus of patent documents, based on the one or more concepts, for one or more patent documents relevant to the determined concept(s). For example, the IP-based business intelligence service 102 may employ the concept search engine 120 to identify one or more patent documents (e.g., issued patents and/or published patent applications) that include the same or substantially similar concepts as determined in the textual description or are relevant to the one or more determined concepts of the textual description.

At block 2810, the IP-based business intelligence service 102 returns search results including one or more patents or patent applications arranged in accordance with a plurality of classifications of the selected taxonomy. At block 2812, the IP-based business intelligence service 102 presents the search results to the user 106 via a user interface (such as the illustrative user interfaces as shown in FIG. 5 and FIG. 6). In one implementation, the IP-based business intelligence service 102 presents search results via the user interface in a graphical form, a tabular form and/or a list form. Additionally or alternatively, the IP-based business intelligence service 102 presents a search results page in which results from the search are presented on a scatter plot having relevance of results plotted along one axis and time plotted along a second axis. In some implementations, each of the search results includes a visual indication of whether the respective search result is an issued patent or a published patent application.

Depending on the type of search, different patent documents may be found and presented in the user interface. For example, the user 106 may return to block 2804 to select another taxonomy dividing the corpus of documents differently, potentially according to different concepts or criteria. In that case, the IP-based business intelligence service 102 will re-run the search and provide different results to the user 106 and/or provide the results in a different format or order.

At block 2814, the IP-based business intelligence service 102 receives a selection of a control on a menu of the search results page. In response to receiving a selection of the control, the IP-based business intelligence service 102 may present a different view or information related to the patent documents found in this search based on the type of the selected control on the menu. In one example, at block 2816, the IP-based business intelligence service 102 may present a distribution of owners of patent documents included in the search results (e.g., as shown in FIG. 7). For another example, upon receiving a selection of a control for displaying classifications for the found patent documents, the IP-based business intelligence service 102 may present the found patent documents under separate classifications based on a predetermined or user-selected taxonomy including system, a patent classification, a publicly available taxonomy, or a private taxonomy for a company.

FIG. 29 is a flowchart depicting an example method 2900 of determining and analyzing a patent portfolio of a patent owner or assignee. At block 2902, the IP-based business intelligence service 102 receives a selection of a collection of patent documents. For example, the IP-based business intelligence service 102 receives information of a patent owner indicating selection of a collection of patent documents in a portfolio of the patent owner. As another example, the IP-based business intelligence service 102 receives selection of a classification of a taxonomy defining the collection of patent documents. The taxonomy selected from among a plurality of available taxonomies presented to the user 106 includes one or more taxonomies used by patent offices of one or more countries, one or more taxonomies used by one or more international or national organizations, one or more taxonomies customized for one or more companies, one or more technologies, and/or one or more industries, etc. In still another example, the selection of the collection of patent documents amount to performing a concept and/or keyword search selecting the search results as the collection of patent documents. In some examples, the IP-based business intelligence service 102 receives multiple inputs defining the collection of patent documents (e.g., information of a patent owner, as well as selection of a taxonomy classification).

At block 2904, the IP-based business intelligence service 102 determines one or more bounds on the collection of patent documents (e.g., one or more intellectual property owners, taxonomy classifications, technology sectors, etc.) based on user 106 input (e.g., a search query), based on user selection of a taxonomy classification, based on a top N entries in the collection, etc.

At block 2906, the IP-based business intelligence service 102 can expand the search query to include additional information (e.g., common misspellings, abbreviations, divisions, subsidiaries, parent entity, acquisitions, alternative names, alternative classifications, cross references, synonyms, etc.). In this way, the IP-based business intelligence service 102 captures relevant documents that otherwise might be missed.

At block 2908, the system 102 presents information about the collection (e.g., statistics, tables, graphics, etc.). Several example user interfaces that are used to present such information to a user 106 are as shown in FIGS. 12-17. From this information about the collection (e.g., from an interface such as those shown in FIGS. 12-17) or from a search results page, a user 106 can select one or more claims of a patent or patent application of the collection of patent documents.

At block 2910, the IP-based business intelligence service 102 receives a selection of the claim of the patent or patent application of the collection of patent documents and, at block 2912, presents a claim signature of the claim. In one example, the claim signature comprises a graphical representation of the claim as a plurality of bars, each bar representing a word in the claim and a length of each bar being sized according to a number of times that the word represented by the bar appears in a group of claims in the collection of patent documents. For example, the group of claims in the collection of patent documents can comprise all claims that appear in the collection of patent documents, all independent claims that appear in the collection of patent documents, all claims that appear in the collection of patent documents and belong to a same statutory class of the claim associated with the claim signature, or all independent claims that appear in the collection of patent documents and belong to a same statutory class of the claim associated with the claim signature. FIGS. 21-25 illustrate several examples of how the claim signature may be presented on a user interface.

Figure 30:
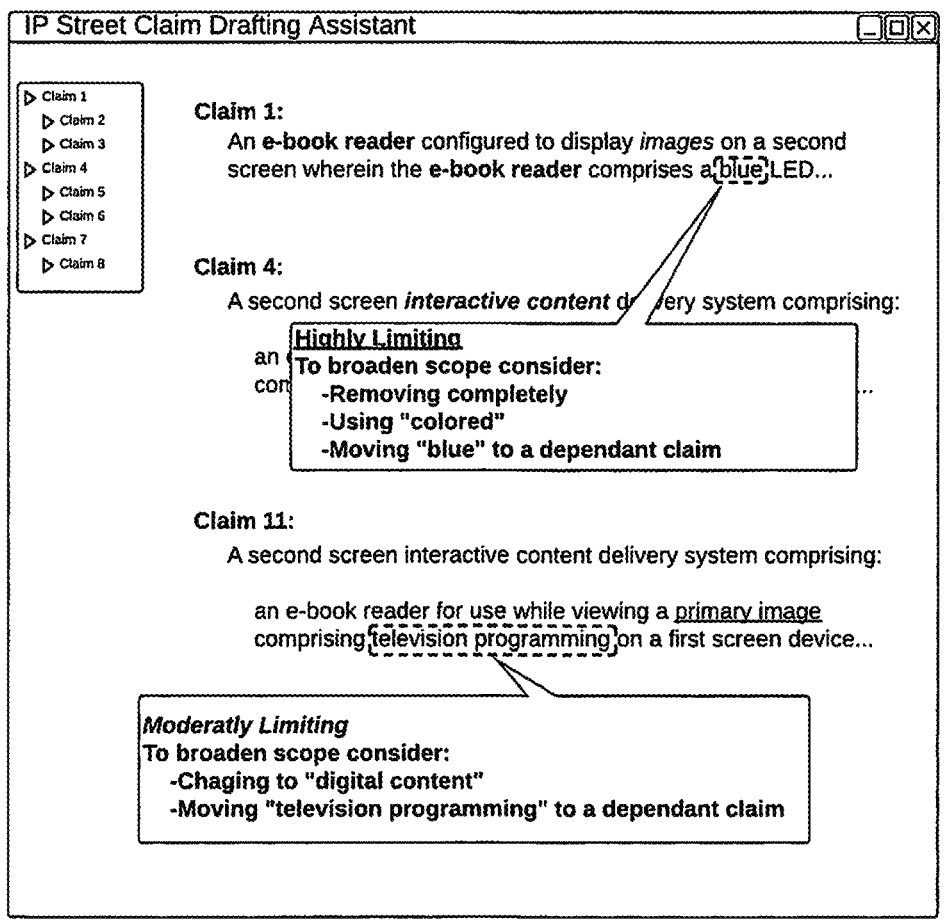
FIG. 30 is an illustration of a screenshot of the claim drafting assistant showing user inputted text of proposed claims for a patent and processor generated claim drafting assistant fields (in the form of bubbles) providing suggestions of how to modify the proposed claim language to broaden the claim scope.

As shown in FIG. 30 the IP-Based Business Intelligence Service 102 is configured to assist users 106 in the drafting of patent claims. In such an embodiment, a user 106 may in input text of potential/proposed patent claims into a graphical user interface. The claim scope engine 220 performs a claim scope analysis of the proposed text and a claim scope score is computed for each term in the proposed text. Claim scope scores may be assigned to each term in the proposed claim sets. For example a score 12% may be assigned to the term "blue" and a score 48% may be assigned to the term "ebook reader".

After a claim scope score has been calculated for the terms in the proposed claim text, the scores may be converted by the presentation user interface module 114 into graphical a representation. In some embodiments, the scores maybe converted to a color spectrum, for example, a heat spectrum color scheme from blue to red or from green to red.

In further embodiments, the claim drafting assistant may also make suggestions about how to increase the scope of the proposed patent claim. These suggestions may include modifications such as replacing a word with a synonym or near synonym which has a broader scope score. Another example of a modification may be to remove highly limiting term or terms to a dependent claim or to delete the term completely.

The claim drafting assistant suggestions may be surfaced (presented/communicated) to the user 106 in many different ways. In one embodiment, a dialog box may "popup" within the graphical user interface if the user hovers over or clicks on a target term. (See FIG. 30). In another embodiment, the suggestions may be surfaced as a table in a report or in a spread sheet. The user 106 may interact with the suggestions within the graphical user interface but may also export one or more of the suggestions to be used later in a different context.

In embodiments in which the user 106 interacts with the claim drafting assistant by way of a graphical user interface, the claim drafting assistant may allow the user 106 to modify the proposed text from within the graphical user interface. Claim scope scores can then be recalculated to give the user 106 an updated claim scope analysis. Updating may occur with each character changed, incident to a user 106 clicking a button within the graphical user interface, or a predefined period of time (e.g. every 20 seconds).

It is contemplated the above described process need not occur within the confines of a graphical user interface. Proposed claim text may also be submitted as a batch, the claim scope scores and term modification suggestions being returned in a similar fashion.

The present invention is a method and system for evaluating intellectual property, under control of one or more computer processors, and the computer processors are configured with executable instructions that direct the system to employ a user 106 input to identify a patent or patent application from a database of patents and patent applications using the user 106 input. The computer processors identify unique words in a claim, or claims of the patent or patent application or proposed claim text within the database, and analyze the identified patents and patent applications using the user 106 input. Based at least in part on the analysis the processors determine a frequency value for each of the unique words in the claims, and each frequency value is representative of how frequently the respective unique word appears in the collection of patents and patent applications. The processors use the frequency value to compute an inverse of the frequency value for each unique word and also to compute an inverse of the inverse of the frequency values of the unique words. The processors thereafter generate and output a first score that is representative of a scope of the patent claim, and the first score is based at least in part on the frequency values and the inverse frequency values of the unique words. The processors present of visual graphical representation to the user 106 which represents the scope of the patent claim or proposed claim text relative to the claims of the collection of patents and patent applications within the database The present invention is further a method and system for evaluating intellectual property wherein the computer processors count the unique words of the claims to determine the number of the unique words, and wherein the score that is representative of the scope of the claim is based at least in part on the number of the counted unique words.

The present invention is further a method and system for evaluating intellectual property wherein the collection of patents and patent applications includes all patents and all patent applications that are associated with a technology classification that is defined by a governmental agency, a private company, or a standards setting organization.

The present invention is further a method and system for evaluating intellectual property wherein the computer processors determine a second score based at least in part upon the analyzed patents and patent applications in the database which reference the patent and a duration of time that the analyzed patents and patent applications have been maintained by a patent owner or assignee; and an extent to which the claim of the patent and patent application has changed during prosecution of the patent/patent application as recorded in the database.

The present invention is further a method and system for evaluating intellectual property wherein the computer processors weight the first score and also weight the second score, and the computer processors determine a composite score for the claims based at least in part on the first and second weighted scores.

The present invention is further a method and system for evaluating intellectual property wherein the computer processors generate a graphical display that includes a first axis that represents a number of unique words found in the claim, and a second axis that represents how frequently each of the unique words of the claim appears in the claims of the collection of patents and patent applications in the database.

The present invention is further a method and system for evaluating intellectual property comprising one or more computer processors; and memory storing one or more modules that are executable by the one or more computer processors to perform computer processor controlled acts comprising: identifying a patent or patent application; identifying unique words in a claim of the patent or patent application; determining a frequency value for each of the unique words in the claim wherein each frequency value indicates how frequently the respective unique word of the claim appears in claims in a collection of patents or patent applications maintained in a database; computing an inverse of the frequency value for each unique word; computing a sum of the inverse of the frequency values of the unique words; computing an inverse of the sum of the inverse frequency values of the unique words; determining a score representative of the scope of the claim wherein the score is based at least in part on the inverse of the sum of the inverse frequency values of the unique words; and presenting a user 106 visual graphical element on a graph in the form of a score to represent the scope of the claim relative to the claims of the collection of patents and patent applications within the database.

The present invention is further a method and system for evaluating intellectual property wherein the computer processors count the unique words in the claims to determine a number of the unique words in the claims, and wherein a generated score that is representative of the scope of the claim is based at least in part on the number of the unique words in the claims.

A method and system for evaluating intellectual property having computer readable storage media storing computer executable instructions that, when executed, instruct one or more computer processors to perform operations comprising: identifying a patent or patent application employing user 106 input data; identifying unique words in a claim of the patent or patent application; determining a frequency value for each of the unique words in the claim wherein each frequency value indicates how frequently the respective unique word of the claim appears in claims in a collection of patents or patent applications within a database; and determining a scope of the claim based at least in part on the following equation $$\frac{1}{(1/wd_1) + (1/wd_2) + \ldots (1/wd_n))}$$

where $wd_1 \ldots wd_n$ represent the frequency values of the unique words, and n represents a number of the unique words.

A method and system for evaluating intellectual property wherein the computer executable instructions further comprise determining a number of unique words in the claims, and wherein the scope of the claim is determined based at least in part on the number of the unique words in the claims.

A method and system for evaluating intellectual property wherein the collection of patents or patent applications includes all patents and patent applications that are associated with a technology classification or a technology sub-classification that is associated with the patent or patent application, and the technology classification or technology sub-classification is defined by a governmental agency, a private company, or a standards setting organization.

A method and system for evaluating intellectual property wherein the computer executable operations further comprise determining a score for a patent or patent application that represents at least one of: a number of documents that reference the patent or patent application; a number of documents that are referenced by the patent or patent application; a duration of time that the patent or patent application has been maintained by its owner or assignee; or an extent to which the claim of the patent or patent application has changed during prosecution as recorded in the database.

A method and system for evaluating intellectual property comprising a computer-based patent claim drafting assistant wherein the claim drafting assistant receives a user 106 proposed patent claim text that is input by the user 106 into a user interface, the claim drafting assistant runs a claim scope engine against the input proposed claim text and the claim drafting assistant returns a claim scope score for at least one word from the user 106 input proposed claim text. Surfacing the claim scope score associated with the at least one word from the user 106 input proposed claim text as a user 106 visual output on a graphical screen for interpretation by a user 106.

A method and system for evaluating intellectual property comprising a computer-based claim drafting assistant wherein the claim drafting assistant receives a proposed patent claim text that is input by the user 106 into a user interface, the claim drafting assistant runs a claim scope algorithm against the user 106 inputted proposed claim text, and returns a claim scope score for every significant n-gram identified by the user 106 or the processor, and for the n-grams deemed to be more narrowing than a predetermined threshold, the claim drafting assistant provides the user with a suggestion about how to broaden the proposed patent claim text.

A method and system for evaluating intellectual property further comprising a method for assuring patent drafting quality, the method having an administrative user setting sending a predetermined minimum quality standard parameter to a patent quality assessment service wherein the minimum quality standard parameter is a numerical score derived by at least one of; a patent claim scope scoring algorithm; a likelihood of grant estimation based on statistical analysis of office action data from publicly available websites; a likely number of office actions estimation based on statistical analysis of office action data from publicly available websites; a claim uniqueness score determined by how conceptually similar/different the claim is to the most closely related patent claim; a specification support score that is determined by evaluating whether every significant word is defined in the original specification; a heuristic test that evaluates whether the date of the patent precedes or postdates the date of the located patent references; a user submitting a proposed patent application to a patent quality assessment service using an HTTP rest protocol via email; the patent quality assessment service determining a quality standard parameter that is applied to the proposed patent application; if the quality standard parameter for the proposed patent application is greater than the minimum quality standard parameter, the patent quality assessment service electronically submits the proposed patent application to a governmental patent office via an electronic filing system; and if the quality standard parameters of the proposed patent application is lower than the minimum quality standard parameter, the proposed patent claims are rejected and returned to the submitter.

A method and system for evaluating intellectual property further comprising a computer-based marketplace surveillance system for intellectual property wherein the computer-based marketplace surveillance system receives from a user input a figure, shape, design and/or surface ornamentation comprising a design patent or trademark registration; downloading one or more image files from a target website, wherein the one or more figures, shapes, designs and/or surface ornamentation's image files describe a product or service; comparing the images from the design patent or trademark registration to the images downloaded from the target website to derive a first similarity score that is derived using at least one of an edge detection parameter, a recognition by components analysis, optical character recognition, scale invariant image transform, and to speeded up robust features; if a first similarity score is above a defined threshold established by a web crawler to identify other websites where the product or service is offered for sale, reviewed or otherwise discussed; download additional images from one or more other target websites which describe the product and/or service; compare the images from the design patent or trademark registration to the images downloaded from the other websites to derive a second similarity score; and if the second similarity score is above a defined second threshold, surface to the user the design patent or trademark registration, the images and Internet addresses where the images were downloaded and the first and second similarity scores.

A method and system for evaluating intellectual property further comprising a computer-based marketplace surveillance system for intellectual property further comprising creating an aggregate image of a physical specimen to be evaluated using a three-dimensional model that is created using three-dimensional scanning and imaging.

A method and system for evaluating intellectual property further comprising a computer-based marketplace surveillance system for intellectual property wherein, the occurrence of data points (Geon's) occurring both on the physical item and three-dimensional scan and the compiled located images from the target websites are compared for similarity to generate the similarity scores and to generate the user 106 report.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method of operating a system for evaluating intellectual property comprising: under control of one or more computer processors configured with executable instructions:
   identifying a patent or patent application from a database of patents and patent applications;
   identifying unique words in a claim of the identified patent or patent application, wherein the unique words in the claim exclude at least one of adjectives, adverbs, conjunctions, pronouns, articles, determiners, and prepositions;
   computer analyzing a collection of identified patents or patent applications;
   based at least in part on the computer analysis, determining a frequency value for each of the unique words in the claim, each frequency value indicating how frequently the respective unique word of the claim appears in the collection of patents or identified patent applications;
   computing an inverse of the frequency value for each unique word;
   outputting a score representative of a scope of the claim, the score comprising:
     the inverse of the sum of the inverse frequency values of the unique words;
     the number of unique words in the claim; and
     a distance value calculated from a two dimensional coordinate set based on the inverse of the sum of the inverse frequency values of the unique words and the number of unique words in the claim; and
   presenting a graphical element to a user that represents the scope of the claim relative to the claims of the collection of identified patents or patent applications, wherein the distance value alters appearance of graphical assets to convey quality or breadth of the claims relative to the claims in the collection of identified patents or patent applications generating, on a user interface, a graphical element that represents the scope of the claim relative to the claims of the collection of identified patents or patent applications, the distance value alters appearance of graphical assets to convey the quality or breadth of the claims relative to the claims in the collection of identified patents or patent applications, wherein the user interface further contains selectable icons representing claims of the present application and distinct collections of identified patents or patent applications that when selected, alter the graphical element to correspond with the selected claim or collection of identified patents or patent applications.

2. The method of operating a system for evaluating intellectual property of claim 1, wherein the computer processor identifies unique words in the claim to determine the number of the unique words; and
the score that is representative of the scope of the claim is based at least in part on the number of the unique words in the claim.

3. The method of operating a system for evaluating intellectual property of claim 1, wherein the collection of identified patents and patent applications includes all patents and patent applications that are associated with a technology classification that is associated with the patent or patent application.

4. The method of operating a system for evaluating intellectual property of claim 3, wherein the technology classification that is associated with the patent or patent application is defined by at least one of a governmental agency, a private company, or a standards setting organization.

5. The method of operating a system for evaluating intellectual property of claim 1, further comprising the steps:
the computer processor determines a second score based on at least one of:
a number of documents that reference the patent or patent application;
a number of documents that are referenced by the patent or patent application;
a duration of time that the patent or patent application has been maintained; or
an extent to which a claim of the patent or patent application has changed during prosecution.

6. The method of operating a system for evaluating intellectual property of claim 5, further comprising:
weighting the score and the other score; and
determining a composite score for the patent or patent application based at least in part on the weighted score and of the weighted other score.

7. The method of operating a system for evaluating intellectual property of claim 1, wherein the graphical element includes a first axis that represents a number of the unique words are found in the claim and a second axis that represents how frequently each unique word of the claim appears in the claims of the collection of the identified patent or patent applications.

8. A method of operating a system for evaluating intellectual property comprising:
one or more processors; and
memory storing one or more modules executable by the one or more processors to perform acts comprising:
identifying a patent or a patent application from a database of patents and patent application;
identifying unique words in a claim of the patent or patent application, wherein the unique words in the claim exclude at least one of adjectives, adverbs, conjunctions, pronouns, articles, determiners, and prepositions;
determining a frequency value for each of the identified unique words in the claim, each frequency value indicating how frequently the respective identified unique word of the claim appears in claims in a collection of patents and patent applications;
computing an inverse of the frequency value for each unique word;
computing a sum of the inverse of the frequency values of the unique words;

outputting a score representative of a scope of the claim, the score comprising:
the inverse of the sum of the inverse frequency values of the unique words;
the number of unique words in the claim; and
a distance value calculated from a two dimensional coordinate set based on the inverse of the sum of the inverse frequency values of the unique words and the number of unique words in the claim; and
presenting a graphical element to a user that represents the scope of the claim relative to the claims of the collection of identified patents or patent applications, wherein the distance value alters appearance of graphical assets to convey quality or breadth of the claims relative to the claims in the collection of identified patents or patent applications generating, on a user interface, a graphical element that represents the scope of the claim relative to the claims of the collection of identified patents or patent applications, the distance value alters appearance of graphical assets to convey the quality or breadth of the claims relative to the claims in the collection of identified patents or patent applications, wherein the user interface further contains selectable icons representing claims of the present application and distinct collections of identified patents or patent applications that when selected, alter the graphical element to correspond with the selected claim or collection of identified patents or patent applications.

9. The method of operating a system for evaluating intellectual property of claim 8, wherein the acts further compromise:
counting the identified unique words to determine a number of the unique words; and
the score that is representative of the scope of the claim is based at least in part on the number of the unique words.

10. The method of operating a system for evaluating intellectual property of claim 8, wherein the collection of patents and patent applications includes all patents and patent applications associated with a technology classification that is associated with the patent or patent application.

11. The method of operating a system for evaluating intellectual property of claim 10, wherein the technology classification is defined by at least one of a governmental agency, a private company, or a standards setting organization.

12. The method of operating a system for evaluating intellectual property of claim 8, wherein the acts further compromise:
the computer processor determines another score that represents at least one of;
a number of documents that reference the patent or patent application;
a number of documents that are referenced by the patent or patent application;
a duration of time that the patent or patent application has been maintained; or
an extent to which the claim of the patent or patent application has changed during prosecution.

13. The method of operating a system for evaluating intellectual property of claim 8, wherein the acts further comprise:
weighting the score and the other score; and
determining a composite score for the patent or patent application based at least in part on the weighted score and the weighted other score.

14. The method of operating a system for evaluating intellectual property of claim 8, wherein the graphical element includes a first axis that represent a number of the identified unique words found in the claim and a second axis that represents how frequently each identified unique word of the claim appears in the claims of the collection of the patent and patent applications.

15. A method of operating a system for evaluating intellectual property comprising: computer readable storage media storing computer executable instructions that, when executed, instruct one or more processors to perform operations comprising:
- identifying a patent or patent application from a database of parents and patent applications;
- identifying unique words in a claim of the identified patent or patent application, wherein the unique words in the claim exclude at least one of adjectives, adverbs, conjunctions, pronouns, articles, determiners, and prepositions;
- determining a frequency value for each of the unique words in the claim, each
- frequency value representing how frequently the respective unique word of the claim appears in claims in a collection of patents and patent applications;
- determining a scope of the claim comprising following equation:

$$\frac{1}{\left(\frac{1}{wd_1}\right)+\left(\frac{1}{wd_2}\right)+\ldots\left(\frac{1}{wd_n}\right)}$$

where $wd_1 \ldots wd_n$ represent the frequency values of the unique words, respectively, and n represents a number of the unique words; and
- a distance value calculated from a two dimensional coordinate set based on the inverse of the sum of the inverse frequency values of the unique words and the number of unique words in the claim generating, on a user interface, a graphical element that represents the scope of the claim relative to the claims of the collection of identified patents or patent applications, the distance value alters appearance of graphical assets to convey the quality or breadth of the claims relative to the claims in the collection of identified patents or patent applications, wherein the user interface further contains selectable icons representing claims of the present application and distinct collections of identified patents or patent applications that when selected, alter the graphical element to correspond with the selected claim or collection of identified patents or patent applications.

16. The method of operating a system for evaluating intellectual property of claim 15, wherein the operations further comprise:
- determining the number of unique words in the claim; and
- wherein the scope of the claim is determined based at least in part on the number of identified unique words.

17. The method of operating a system for evaluating intellectual property of claim 15, wherein the collection of patents and patent applications includes all patents and patent applications that are associated with a technology classification that is associated with the patent or patent application.

18. The method of operating a system for evaluating intellectual property of claim 15, wherein at least one of the technology classification is defined by at least one of a governmental agency, a private company, or a standards setting organization.

19. The method of operating a system for evaluating intellectual property of claim 15, wherein the operations further comprise:
- determining a score for a patent or patent application that represents at least one of;
- a number of documents that reference the patent or patent application;
- a number of documents that are referenced by the patent or patent application;
- a duration of time that the patent or patent application has been maintained; or
- an extent to which the claim or another claim of the patent or patent application has changed during prosecution.

* * * * *